United States Patent
Igarashi et al.

(10) Patent No.: US 11,665,460 B2
(45) Date of Patent: May 30, 2023

(54) INFORMATION PROCESSING DEVICE AND INFORMATION PROCESSING METHOD

(71) Applicant: Sony Group Corporation, Tokyo (JP)

(72) Inventors: Go Igarashi, Tokyo (JP); Junya Suzuki, Kanagawa (JP); Chisato Numaoka, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/544,730

(22) Filed: Dec. 7, 2021

(65) Prior Publication Data

US 2022/0095035 A1 Mar. 24, 2022

Related U.S. Application Data

(63) Continuation of application No. 16/766,449, filed as application No. PCT/JP2019/015710 on Apr. 10, 2019, now Pat. No. 11,259,108.

(30) Foreign Application Priority Data

May 24, 2018 (JP) .............................. JP2018-099553

(51) Int. Cl.
  *H04R 1/10* (2006.01)
  *G01S 15/06* (2006.01)
(52) U.S. Cl.
  CPC ............ *H04R 1/1016* (2013.01); *G01S 15/06* (2013.01); *H04R 2420/07* (2013.01)
(58) Field of Classification Search
  None
  See application file for complete search history.

(56) References Cited

U.S. PATENT DOCUMENTS

| 9,443,192 B1 | 9/2016 | Cosic |
| 2002/0154179 A1 | 10/2002 | Wilcock et al. |

(Continued)

FOREIGN PATENT DOCUMENTS

| EP | 0421681 A2 | 4/1991 |
| EP | 3361755 A1 | 8/2018 |

(Continued)

OTHER PUBLICATIONS

International Search Report and English translation thereof dated Jun. 4, 2019 in connection with International Application No. PCT/JP2019/015710.

(Continued)

*Primary Examiner* — Paul W Huber
(74) *Attorney, Agent, or Firm* — Wolf, Greenfield & Sacks, P.C.

(57) ABSTRACT

Provided is an information processing device that controls and presents sound information in an appropriate form to a user who acts in an environment on the basis of situation recognition including recognition of the environment and recognition of the actions of the user. The information processing device includes: a sensor that detects an object; an open ear style earpiece that is worn on an ear of a listener, and includes an acoustics generation unit, and a sound guide portion that transmits a sound generated by the acoustics generation unit into an earhole; and a processing unit that processes sound information of a sound source, the sound information being generated by the acoustics generation unit, the processing unit acquiring the sound information of the sound source corresponding to the object detected by the sensor, and a process of localizing a sound image of the acquired sound source while varying a position of the sound image in accordance with a position in a three-dimensional (Continued)

acoustic space, the position in the three-dimensional acoustic space corresponding to a position of the detected object.

27 Claims, 53 Drawing Sheets

(56) References Cited

U.S. PATENT DOCUMENTS

| | | |
|---|---|---|
| 2012/0314871 A1 | 12/2012 | Koga |
| 2017/0213478 A1 | 7/2017 | Kohn |
| 2017/0359467 A1 | 12/2017 | Norris et al. |
| 2018/0020312 A1 | 1/2018 | Visser |
| 2018/0139565 A1 | 5/2018 | Norris et al. |
| 2018/0367937 A1 | 12/2018 | Asada et al. |
| 2021/0160605 A1 | 5/2021 | Igarashi et al. |

FOREIGN PATENT DOCUMENTS

| | | |
|---|---|---|
| JP | 2005165778 A | 6/2005 |
| JP | 2006-163175 A | 6/2006 |
| JP | 2013-005021 A | 1/2013 |
| JP | 2013-017555 A | 1/2013 |
| JP | 2017-513535 A | 6/2017 |
| JP | 2018-502360 A | 1/2018 |
| JP | 2018-078444 A | 5/2018 |
| WO | WO 2017/061218 A1 | 4/2017 |

OTHER PUBLICATIONS

International Written Opinion and English translation thereof dated Jun. 4, 2019 in connection with International Application No. PCT/JP2019/015710.

International Preliminary Report on Patentability and English translation thereof dated Dec. 3, 2020 in connection with International Application No. PCT/JP2019/015710.

Extended European Search Report dated Dec. 23, 2020 in connection with European Application No. 19807568.1.

(Definition of elevator switch object acquired from database)

Elevator switch object:
- ID: EVSW0340                                                    //identifier of elevator switch is "EVSW0340."  ⎫ 3401
- Reference position                                              //physical position of elevator switch           ⎬ 3402
  · Localization absolute coordinate (latitude)  : 35.617272
  · Localization absolute coordinate (longitude) : 139.728395
  · Localization absolute coordinate (altitude)  : 35.1061m
- Reference direction
  · Directional absolute coordinate (north component):1           //(1,0,0) represents northward front direction
  · Directional absolute coordinate (east component): 0
  · Directional absolute coordinate (vertical component): 0

- API-TYPE: SELECTION_A_OR_B                                      //API of elevator (that is, command that allows operation to be selected from two alternatives)
  · Sound source ID: OS9470                                       //identifier of basic sound source of elevator is "OS9470"
  · Assist message: "Select UP or DOWN"                           //text information to be read out.
  · Assist voice: "Select UP or DOWN"                             //voice information for inquiry.
    · UP: Sound source ID: OS0030                                 //UP: Sound source identifier "OS0030"
      · Localization position                                     //polar coordinate system centered on center of head
        · Azimuth: 45 degrees                                     //rotational coordinates in horizontal plane with respect to 0 degrees corresponding to front direction, positive clockwise
        · Elevation angle: 10 degrees                             //rotational coordinates in vertical plane with respect to 0 degrees corresponding to front direction, positive upward
        · Distance: 40 cm                                         //distance from center of head
    · DOWN: Sound source ID: OS7401                               //DOWN: Sound source "OS7401"                                                                                  ⎬ 3403
      · Localization position                                     //polar coordinate system centered on center of head
        · Azimuth: -45 degrees                                    //rotational coordinates in horizontal plane with respect to 0 degrees corresponding to front direction, positive clockwise
        · Elevation angle: 10 degrees                             //rotational coordinates in vertical plane with respect to 0 degrees corresponding to front direction, positive upward
        · Distance: 40 cm                                         //distance from center of head

- API-TYPE: LOCATION_PRESENTATION
  · Sound source ID: OS9471                                       //identifier of basic sound source of elevator is "OS9471"
  · Assist message: "Elevator switch is here"                     //text information to be read out.
  · Assist voice: "Elevator switch is here"                       //voice information for inquiry.
    · UP: Sound source ID: OS0031                                 //UP: Sound source identifier "OS0031"
      · Localization position                                     //polar coordinate system centered on "reference position"※
        · Azimuth: 0 degrees                                      //rotational coordinates in horizontal plane with respect to 0 degrees corresponding to front direction, positive clockwise
        · Elevation angle: 90 degrees                             //rotational coordinates in vertical plane with respect to 0 degrees corresponding to front direction, positive upward  ⎬ 3404
        · Distance: 20 cm                                         //distance from "reference position"
    · Down: Sound source ID: OS7402                               //DOWN: Sound source "OS7402"
      · Localization position                                     //polar coordinate system centered on "reference position"
        · Azimuth: 0 degrees                                      //rotational coordinates in horizontal plane with respect to 0 degrees corresponding to front direction, positive clockwise
        · Elevation angle: -90 degrees                            //rotational coordinates in vertical plane with respect to 0 degrees corresponding to front direction, positive upward
        · Distance: 20 cm                                         //distance from "reference position"

FIG.34

```
UUID: EVSW0340                              //identifier of elevator switch is "EVSW0340"
TYPE: elevator subclass of object           //elevator is subclass of "object"
Sound source ID: OS9470                     //identifier of basic sound source of elevator is "OS9470"

UUID: OS9470                                //identifier of basic sound source of elevator is "OS9470"
TYPE: PCM sound source subclass of sound source   //PCM sound source is subclass of "sound source"
Data size: ···                              //data size
Data block: ···                             //PCM sound-source data
```

FIG.55

INFORMATION PROCESSING DEVICE AND INFORMATION PROCESSING METHOD

CROSS-REFERENCE TO RELATED APPLICATIONS

The present application claims the benefit under 35 U.S.C. § 120 as a continuation application of U.S. application Ser. No. 16/766,449, filed on May 22, 2020, now U.S. Pat. No. 11,259,108, which claims the benefit under 35 U.S.C. § 371 as a U.S. National Stage Entry of International Application No. PCT/JP2019/015710, filed in the Japanese Patent Office as a Receiving Office on Apr. 10, 2019, which claims priority to Japanese Patent Application Number JP2018-099553, filed in the Japanese Patent Office on May 24, 2018, each of which applications is hereby incorporated by reference in its entirety.

TECHNICAL FIELD

The technology disclosed herein relates to an information processing device and an information processing method that control and present sound information in an appropriate form to a user who acts in an environment on the basis of situation recognition including recognition of the environment and recognition of the actions of the user.

BACKGROUND ART

For assisting actions of visually impaired persons, systems that provide acoustic information from a three-dimensional acoustic space have been developed. For example, a walking-training-environment generation system that generates a virtual acoustic space by arbitrarily setting a walking training environment including, for example, movable sound sources or walls (refer, for example, to Patent Literature 1), a headset that includes a set of input mechanisms that receives, from a user, respective commands for calling spatial-interaction related functions to be implemented by a spatial interaction module, and that presents audio information to the user when the user interacts with a space (refer, for example, to Patent Literature 2), a head-mounted computing device that provides navigation assistance in an environment through audio output (refer, for example, to Patent Literature 3), and the like have been proposed.

CITATION LIST

Patent Literature

Patent Literature 1: Japanese Patent Application Laid-open No. 2006-163175
Patent Literature 2: Japanese Translation of PCT International Application No. 2018-502360
Patent Literature 3: Japanese Translation of PCT International Application No. 2017-513535

DISCLOSURE OF INVENTION

Technical Problem

The system disclosed in Patent Literature 1 is capable of providing a virtual training environment to a user by generating acoustic data in a three-dimensional space on the basis of road environment elements, sound elements, and wall elements that are predefined.

Further, the headset disclosed in Patent Literature 2 provides the audio information by bone conduction, and hence does not close ear canals of the user. This headset is capable of generating a route while the user wearing this headset is moving between two places, and capable of providing, while the user is moving along the route, navigation guidance to the user by giving a series of prompts to him/her via voice information or the like on the basis of determination based on absolute position/relative position information grasped via various sensors and obstacle information grasped from a map, or on the basis of information transmitted from beacons arranged in the space. In addition, methods for the interaction with tools such as gesture input are provided to the user by this headset, which allows the guidance that can be provided by this headset to be user-friendly and unobtrusive.

Still further, the head-mounted computing device disclosed in Patent Literature 3 is capable of providing the navigation assistance to a hearing impaired user, for example, by giving a distance information to the user, the giving of the distance information including grasping a physical feature of an object by grasping an environment with use of depth-image data and a visible-light sensor system, and generating sound information called an audio navigation cue from a specific position in a three-dimensional acoustic space on the basis of a head-related transfer function of the user, or by changing sound volume.

However, when voice information is provided to the user wearing the headset disclosed in Patent Literature 2 on the basis of the information transmitted from the beacons, since the headset does not close the ear canals of the user, the user may fail to distinguish the provided voice-information and an ambient voice to be transmitted from a real environment directly to the ears. In addition, as disclosed in Patent Literature 2 and Patent Literature 3, even when the beacons and the like are arranged, if an excessive amount of information is transmitted, there is a risk that the user may be confused by the excessive amount of information in using navigation guidance in a real space without depending on visual information.

Disclosed herein in view of such circumstances are an information processing device and an information processing method that allow acoustic information to be presented to a user who acts in a real environment, the acoustic information allowing the user to advantageously distinguish a virtual sound or a voice to be artificially reproduced in a three-dimensional acoustic space and the ambient sound (including voice) in the real environment from each other on the basis of recognition of an environment with use of sensor information, and recognition of a situation in consideration of, for example, a condition and actions of the user in the environment. The information processing device and the information processing method also allow the amount of virtual-sound information or voice information that is reproduced in the three-dimensional acoustic space to be properly controlled in accordance with needs of the user or conditions (such as an environment and a situation).

Solution to Problem

The technology disclosed herein has been made to solve the above-described problems. According to the first aspect, there is provided an information processing device including:
a sensor that detects an object;
an open ear style earpiece that is worn on an ear of a listener, and includes an acoustics generation unit, and
a sound guide portion that transmits a sound generated by the acoustics generation unit into an earhole; and
a processing unit that processes sound information of a sound source, the sound information being generated by the acoustics generation unit,
the processing unit
acquiring the sound information of the sound source corresponding to the object detected by the sensor, and
a process of localizing a sound image of the acquired sound source while varying a position of the sound image in accordance with a position in a three-dimensional acoustic space, the position in the three-dimensional acoustic space corresponding to a position of the detected object.

The information processing device according to the first aspect has two or more sensing modes including
a normal mode in which the sensor performs the detection in a normal detection area of the sensor,
a white-cane mode in which the sensor performs the detection in a detection area smaller than the normal detection area in the normal mode.

In the white-cane mode, the processing unit executes the process of localizing the sound image of the sound source while varying the position of the sound image when the sensor detects the object in a region in a predetermined range around the listener.

Further, according to a second aspect of the technology disclosed herein, there is provided an information processing device including:
a sensor that detects an object;
an open ear style earpiece that is worn on an ear of a listener, and includes
an acoustics generation unit, and
a sound guide portion that transmits a sound generated by the acoustics generation unit into an earhole; and
a processing unit that processes sound information of a sound source, the sound information being generated by the acoustics generation unit,
the processing unit
acquiring the sound information of the sound source corresponding to information that relate to the object detected by the sensor and that are provided by an information providing unit, and
a process of localizing a sound image of the acquired sound source while selecting a type of the sound information and while controlling an amount of the sound information.

Still further, according to a third aspect of the technology disclosed herein, there is provided an information processing device including
an open ear style earpiece including:
an acoustics generation unit that is arranged in a rear of an ear of a listener, and
a sound guide portion
that has a structure folded back from a rear of an auricle of the ear to a front of the auricle of the ear via a vicinity of an earlobe, and
that transmits a sound generated by the acoustics generation unit into an earhole;
a sensor that acquires external information; and
a processor, the information processing device being operated under a state in which any of a plurality of modes has been selected,
the processor
reproducing an external three-dimensional space on a basis of the external information acquired via the sensor,
generating virtual-sound information for causing the acoustics generation unit to generate the sound in accordance with the mode selected from the plurality of modes, and
localizing a sound image of a sound source that varies in position over time in the three-dimensional space.

Yet further, according to a fourth aspect of the technology disclosed herein, there is provided an information processing method including:
a step of detecting an object;
a step of acquiring sound information of a sound source corresponding to the detected object;
a step of executing a process of localizing a sound image of the acquired sound source while varying a position of the sound image in accordance with a position in a three-dimensional acoustic space, the position in the three-dimensional acoustic space corresponding to a position of the detected object; and
a step of outputting a sound of the sound image from an open ear style earpiece including
an acoustics generation unit, and
a sound guide portion that transmits a sound generated by the acoustics generation unit into an earhole.

Yet further, according to a fifth aspect of the technology disclosed herein, there is provided an information processing method including:
a step of detecting an object;
a step of acquiring sound information of a sound source corresponding to information that is provided in relation to the detected object;
a step of executing a process of localizing a sound image of the acquired sound source while selecting a type of the sound information and while controlling an amount of the sound information; and
a step of outputting a sound of the sound image from an open ear style earpiece including
an acoustics generation unit, and
a sound guide portion that transmits a sound generated by the acoustics generation unit into an earhole.

ADVANTAGEOUS EFFECTS OF INVENTION

According to the technology disclosed herein, the information processing device and the information processing method that allow acoustics to be presented to a listener, who acts in the real environment, by causing the listener to put on an open ear style earpiece can be provided, the acoustics allowing the user to advantageously distinguish the virtual sound to be artificially reproduced in the three-dimensional acoustic space and the sound in the real environment from each other.

The information processing devices disclosed herein are capable of controlling a level of presenting sound information (information to be acoustically configured, such as virtual-sound information) to be provided in the three-dimensional acoustic space, by means of controlling a presentation method of sound information (the method is not limited to the above-mentioned method for distinguishing the virtual sound and the ambient sound from each other) and controlling an amount of the information, not only on the basis of a recognition of an environment with use of sensor information and a recognition of a situation in consideration of, for example, user's actions in the environment, but also by a selection by a user or an automatic selection. In this way, the information processing devices disclosed herein are capable of contributing to enhancement (or expansion) of an audible ability of the listener.

In addition, the information processing devices disclosed herein not only have the capability to contribute to the enhancement of the audible ability, but also have a function of a device or a system that controls and presents a presentation method of sound information to be artificially provided in the three-dimensional acoustic space and the amount of the information not only on the basis of a recognition of an environment with use of sensor information, and a recognition of a situation in consideration of, for example, user's actions in the environment, but also by a selection by a user or an automatic selection. Further, the information processing devices disclosed herein also have a function of an information processing device or an information processing system that generates virtual-sound information to be presented to the listener by acquiring external information via a microphone or various sensors, and by executing information processes alone or in cooperation with a server device. Still further, the information processing devices disclosed herein have a function of a hearing aid.

Note that, the advantages described herein are merely examples, and hence the advantages of the present invention are not limited thereto. Further, in addition to these advantages, the present invention may provide other advantages.

Other objects, features, and advantages of the technology disclosed herein will become apparent from the following embodiment and more detailed description based on the accompanying drawings.

BRIEF DESCRIPTION OF DRAWINGS

FIG. 34 is a list showing a configuration example of virtual-sound information (elevator switch object).

FIG. 55 is a list showing a definition of an object of an elevator.

MODE(S) FOR CARRYING OUT THE INVENTION

Figure 1:
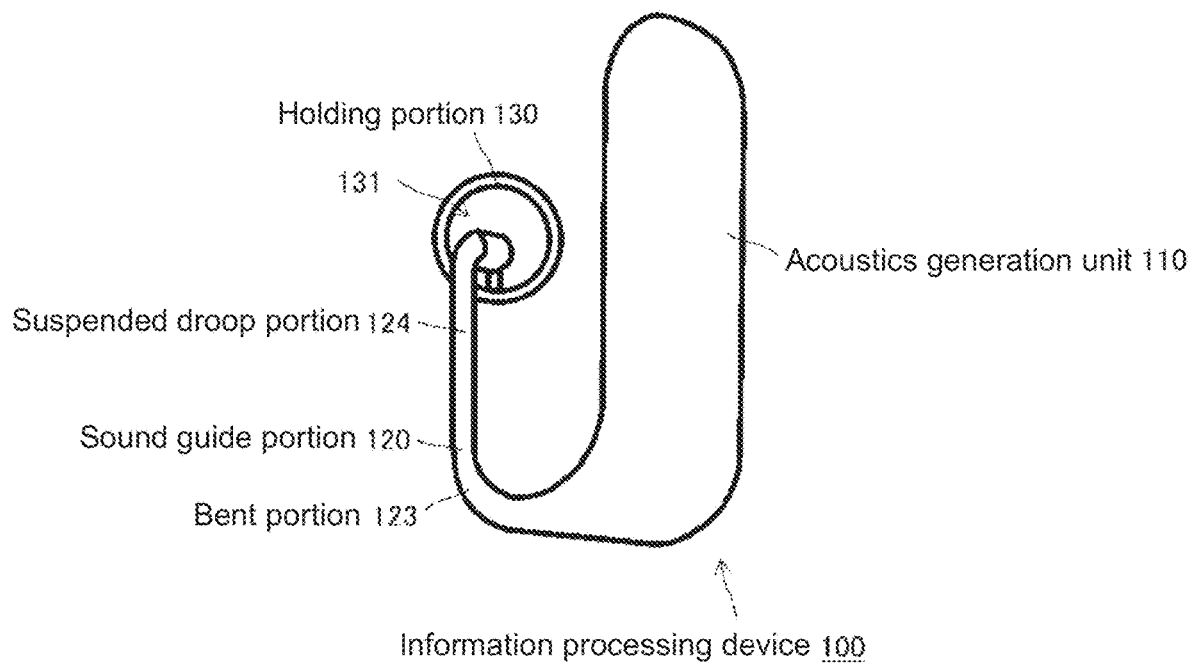
FIG. 1 is a front view of an information processing device 100.

Hereinafter, an embodiment of the technology disclosed herein is described in detail with reference to the drawings. First, brief definitions of the terms used herein are given below.

Unless otherwise noted, the phrase "sound (including voice)" herein encompasses the following three types of sounds.

(A) Natural Ambient Sound (Including Voice) to Enter Ears as It Is from the Surroundings (B) Processed Sound (Including Voice) Obtained by Signal Processes (Including Noise Process, Amplification, Attenuation, And the Like) on Audio Data (Such as Data of Recorded Natural Voice and Data of Music Stream) Obtained by Temporarily Recording or Storing (Including Buffering) Ambient Sound (C) Virtual Sound (Including Voice) Artificially Processed or Synthesized on the Basis of Basic Sound-Source Data (Such as Standard Voice Data and PCM (Pulse Code Modulation) Data)

Note that, specifically, the phrase "virtual sound (including voice)" or "virtual sound" represents (B) and (C), and the phrase "natural sounds (including voices)" represents (A). Further, unless otherwise noted, the "ambient sound" includes "ambient voice."

Still further, unless otherwise noted, the "earpiece" herein refers to a device in which an acoustics generation unit for providing sounds to the ears is housed in its housing in forms of, for example, a headphone, a headset, an earphone, and a hearing aid that can be worn on a human ear, more specifically, in these forms of, for example, an overhead type, an on-ear type, and a canal type.

Yet further, the cloud herein refers to general cloud computing. The cloud provides computing services via networks such as the Internet. When the computing is performed at a position closer to an information processing device to be served on the network, this computing is also referred to as edge computing, fog computing, or the like. The cloud herein may be interpreted as a network environment or a network system for the cloud computing (computing resources (such as processor, memory, and wireless or wired network connection facility). Alternatively, the cloud may be interpreted also as a service to be provided in a form of the cloud or as a provider.

The "server device" refers to at least one computer (or aggregate of computers) that mainly provides the computing services in the computing. In other words, the "server device" may herein refer to an independent computer, or the aggregate (group) of the computers.

Unless otherwise noted, processes by the "server device" may be processed by a single computer that performs communication for information (data and control) directly with the information processing device disclosed herein, or may be processed by a collection of computers more than one in a distributed manner on the basis of information provided from the information processing device. In this case, the one or more computers may be provided as virtualization to be managed by the provider. Alternatively, as in the fog computing of IoT (Internet of Things), the one or more computers may be installed all over the world. Some of the computers may serve as sensor nodes and execute required information-collection processes, other ones of the computers may execute processes of relaying data communication on the network, still other ones of the computers may manage information in databases, and yet other ones of the computers may execute processes relating to artificial intelligence, such as learning and estimation (inference).

Note that, the description is made in the following order.
1. First Embodiment
1.1 Open Ear Style Earpiece
1.2 Functional Configuration Example
1.3 Configuration Example of Enhancement-Function-Separation-Type Device
1.4 Audible-Ability-Enhancement Space-Recognition Function
1.5 Function to Control Level of Information to Be Provided
2. Network System
3. Programs
4. Modifications 1. First Embodiment First, an embodiment of the information processing device that achieves audible ability (or hearing) enhancement is described hereinbelow. The information processing device disclosed herein is not limited to this embodiment, and may have a configuration of an open ear style earpiece (in the forms of, for example, the headphone, the headset, the earphone, and the hearing aid that can be worn on a human ear, more specifically, in these forms of, for example, the overhead type, the on-ear type, and the canal type.) The information processing devices disclosed herein are capable of controlling a method of presenting the virtual-sound information to be provided and the amount of the information by setting a sound-information providing level of sounds (including voices) to be provided via the earpiece in a three-dimensional acoustic space artificially or virtually through, for example, signal processes not only on the basis of recognition of an environment with use of sensor information, and recognition of a situation in consideration of, for example, a condition and actions of a user in the environment, but also by a selection by a listener or an automatic selection. With this, an audible ability of the listener can be enhanced (or expanded). Note that, herein, the user who enjoys the audible-ability enhancement function by wearing the earpiece part of the information processing device on his/her ear is referred to as the "listener."

1.1 Open Ear Style Earpiece (1) Outline of Open Ear Style Earpiece

The earpiece called the canal type basically has a sealing structure that closes an ear canal. Thus, there arises awkwardness that a voice and a chewing sound of the listener himself/herself (hereinafter, collectively referred to as an "own sound") are heard differently from those under a state in which the ear canal is open, which frequently causes sense of discomfort to the listener. This is probably because the own sound is emitted through bones and the flesh into the sealed ear canal, and then transmitted to an eardrum with its bass range intensified. In contrast, the open ear style earpiece does not have the sealing structure that closes the ear canal, and hence such phenomena do not occur. Thus, the awkwardness and the discomfort to the listener can be alleviated.

In addition, near an entrance of the earhole, the open ear style earpiece does not close an entirety of the earhole with a structure for reproduction (such as earplug of the canal-type earphone) (opens at least a part of the earhole). This structure allows the listener to directly hear the ambient sound. (Acoustic transmittance is achieved.) Thus, the listener wearing the open ear style earpiece can listen to voice information to be reproduced by an audio device (such as music, and an information voice from a radio or a network, which are collectively referred to as a "reproduced sound" hereinafter), and at the same time, can naturally hear the ambient sound. Even with the open ear style earpiece, the user is allowed to normally use human functions dependent on audible characteristics, such as space recognition, risk sensing, conversations, and grasping of subtle nuances during the conversations, to immediately respond to a call from a person in the surroundings, and to enjoy talking as usual.

Meanwhile, at the time of listening to the real ambient sound and the sound reproduced from the open ear style earpiece at the same time, the user may be confused by failing to distinguish the ambient sound and the reproduced sound from each other. As a matter of course, the ambient sound is the same as "sounds to be normally heard," and in a human brain, respective sound images of a plurality of sound sources in the surroundings are localized with appropriate sense of distance from respective positions of these sound sources. Meanwhile, with regard to the reproduced sound, when the voice or the music is reproduced near the ear canal, a sound image of the reproduced sound is localized to a position near the listener. Similarly, also at a time when the listener listens to the reproduced sound such as the voice or the music in a stereo mode, the sound image is lateralized at the position near the listener. Since the ambient sound and the reproduced sound are different from each other in sense of distance and way of being heard in such ways, "listening fatigue" and the like occur when the listener has listened to both the sounds at the same time. As a result, it takes time until the listener recognizes the sound information. For example, when an alarm starts to ring in the ambient sound while the listener is listening to the music, switching to a target to audibly focus on may be delayed.

In order to solve the problems to be caused by the differences in sense of distance and way of being heard between the ambient sound and, for example, the reproduced sound, the open ear style earpiece according to this embodiment virtually localizes the sound image of the reproduced sound from the open ear style earpiece, such as the voice and the music, at a desired position by the signal process, and then reproduces the reproduced sound near the ear canal (that is, reproduces virtual sound). In addition, this open ear style earpiece provides the sound source of the virtual sound in harmony with an environment of the ambient sound, or controls how the virtual sound is heard exactly as its sound source is present in a natural space. With this, the listening fatigue to the listener can be alleviated. This allows the listener to selectively listen to both the ambient sound and the virtual sound (including voice) with reference to a sound image map that the listener grasps within his/her brain. Also with this, the listening fatigue to the listener can be alleviated.

Such artificial sound-image localization can be referred to as "acoustic AR" as an acoustic version of AR (Augmented Reality) that has been generally known in the field of video. In addition, such artificial sound-image localization can be regarded as overlaying of the virtual sound (including voice) on the ambient sound. Note that, sounds to be overlaid with use of the open ear style earpiece are of the following three types.

(A) Natural Ambient Sound (Including Voice) to Enter Ears as It Is from the Surroundings (B) Processed Sound (Including Voice) Obtained by Signal Processing (Such as Noise Processing, Amplification, Attenuation, And the Like) on Audio Data (Such as Data of Recorded Natural Voice and Data of Music Stream) Obtained by Temporarily Recording or Storing (Including Buffering) Ambient Sound (C) Virtual Sound (Including Voice) Artificially Processed or Synthesized on the Basis of Basic Sound-Source Data (Such as Standard Voice Data and PCM (Pulse Code Modulation) Data)

Note that, specifically, the phrase "virtual sound (including voice)" represents (B) and (C), and the phrase "natural sound (including voice)" represents (A).

(2) Embodiment of Information Processing Device Capable of Enhancing Audible Ability A basic structure of the information processing device capable of enhancing the audible ability is described. The information processing device is a voice-information processing device or a voice-information processing system mainly having a function to present voice information. However, from a viewpoint of having a function to enhance the audible ability of the listener in a three-dimensional acoustic space as described below, in another aspect, the information processing device is also an "audible-ability enhancement device." In addition, from a viewpoint of compensating the "sound" necessary for the listener by information processes, in still another aspect, the information processing device has a function of the hearing aid.

Figure 2:
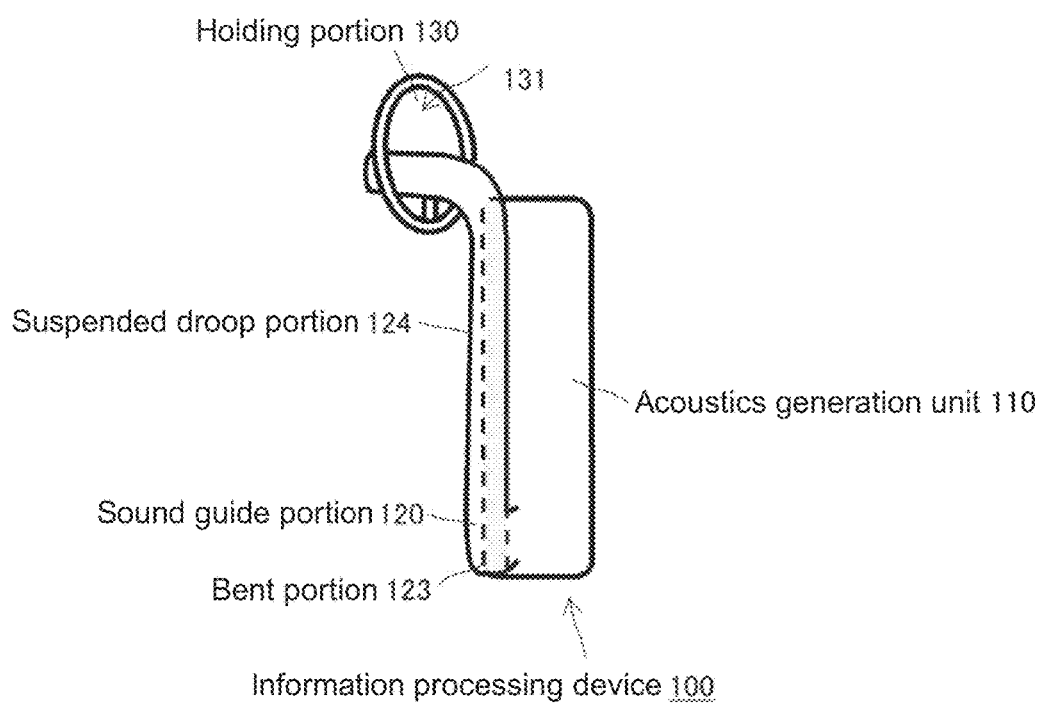
FIG. 2 is a perspective view of the information processing device 100 as viewed from its left-hand side.
Figure 3:
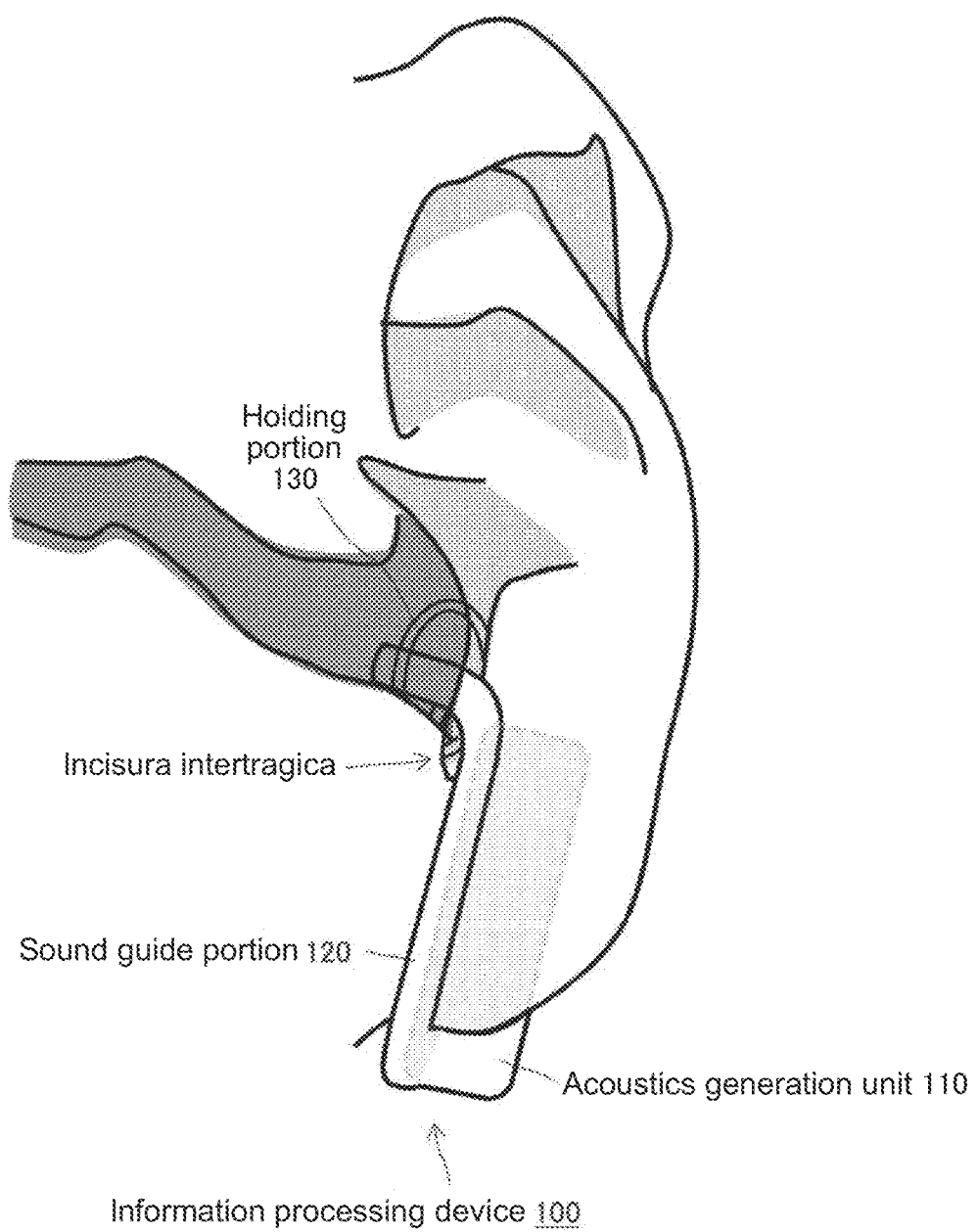
FIG. 3 is a view illustrating a state in which the information processing device 100 is worn on the left ear of a listener.

FIG. 1 to FIG. 3 illustrate an example of an information processing device 100 to which the technology disclosed herein is applied. As illustrated in FIG. 1 to FIG. 3, this information processing device 100 uses the open ear style earpiece, and presents the reproduced sound to the listener who wears this open ear style earpiece. As described below, the information processing device 100 is capable of enhancing the audible ability of the listener by localizing the sound image of the reproduced sound at an artificial position via the open ear style earpiece.

FIG. 1 is a front view of the information processing device 100. FIG. 2 is a perspective view of the information processing device 100 as viewed from its left-hand side. FIG. 3 is a view illustrating a state in which the information processing device 100 is worn on the left ear of the listener. Note that, although the open ear style earpiece of the information processing device 100 exemplified in FIG. 1 to FIG. 3 is configured to be worn on the left ear of the listener, the open ear style earpiece may be configured in right-left symmetry to this so as to be worn on the right ear (not shown). In addition, although the information processing device 100 illustrated in FIG. 1 to FIG. 3 does not include a cable to be connected to external devices (not shown), the information processing device 100 may include the cable to be connected to the external devices (not shown) via a plug.

The information processing device 100 illustrated in FIG. 1 to FIG. 3 includes an acoustics generation unit 110 that generates acoustics, a sound guide portion 120 that takes in the acoustics to be generated from the acoustics generation unit 110 from its one end, and a holding portion 130 that holds the sound guide portion 120 near its another end. The sound guide portion 120 is formed of a hollow tube with an inner diameter of 1 mm to 5 mm, and both the ends thereof are open ends. The one end of the sound guide portion 120 is an acoustics input hole for the sound generated from the acoustics generation unit 110, and the other end of the same is an acoustics output hole as a counterpart. Note that, it is desirable that the information processing device 100 be not so heavy as to place burden on the ear.

As illustrated in FIG. 3, the holding portion 130 that supports the sound guide portion 120 at the other end is attached near an entrance of the ear canal desirably in abutment against a bottom surface of a cavum conchae and in engagement with an incisura intertragica. In addition, the acoustics generation unit 110 to be coupled to the one end of the sound guide portion 120 is arranged in a rear of an auricle.

The holding portion 130 supports the sound guide portion 120 at the other end thereof by being engaged with a vicinity of the entrance of the ear canal (specifically, incisura intertragica) such that the acoustics output hole at the other end of the sound guide portion 120 is oriented to a depth side of the ear canal. The holding portion 130 is desirably a rubber-like elastic member and is joined to an outer shape of the sound guide portion 120 such that the sound guide portion 120 is easily supported. The holding portion 130 and the sound guide portion 120 may be formed integrally with each other, or the holding portion 130 may be formed as a separate member (also called "tip") that is separable from the sound guide portion 120 so as to be fitted and connected to the other end of the sound guide portion 120. In order that the holding portion 130 and the sound guide portion 120 are firmly coupled to each other, it is desirable, for example, that cutouts be provided to an inner side of the holding portion 130 and that protrusions be provided to an outer side of the sound guide portion 120 such that the holding portion 130 does not turn around the sound guide portion 120 under a state in which the separable holding portion 130 is set as the separate member around the sound guide portion 120. A material of the member to be the holding portion 130 may be plastic or a metal. The sound guide portion 120 is formed such that at least an outer diameter near the other end is smaller than an inner diameter of the ear canal. Thus, even under a state in which the other end of the sound guide portion 120 is held by the holding portion 130 near the entrance of the ear canal, the earhole of the listener is not closed. In other words, the earhole is allowed to be open, and hence the information processing device 100 can maintain the feature of the "open ear style." The sound guide portion 120 may further include, at the other end thereof, an earwax-entry preventing portion (not shown) that prevents contamination by earwax. The holding portion 130 may be detachable and prepared in a plurality of sizes so as to be adaptable to various ear shapes. Further, the holding portion 130 may be repeatedly used by cleaning or may be used by being replaced with new one each time contaminated.

Still further, the holding portion 130 includes an opening portion 131 that allows the entrance of the ear canal (earhole) to open to the outside world even while holding the sound guide portion 120. The holding portion 130 in the example illustrated in FIG. 1 and FIG. 2 has a hollow structure with a lower rim in a curved-surface shape so as to be capable of being held in abutment against the bottom surface of the cavum conchae and in engagement with the incisura intertragica. Specifically, the holding portion 130 is coupled to a part of an outer surface of the tubular sound-guide portion 120 only at a part of a hollow portion of the hollow structure. Alternatively, the holding portion 130, which is formed as the separate member, is coupled to the part of the outer surface by having a hollow structure that allows the tubular sound-guide portion 120 to be inserted therethrough, specifically, through a part of a hollow portion of this hollow structure. All other parts of the hollow structure than this part correspond to the opening portion 131. Note that, the holding portion 130 need not necessarily have the hollow structure and may be formed into arbitrary shapes capable of holding the other end of the sound guide portion 120 as long as the hollow structure is provided.

The tubular sound-guide portion 120 takes in the acoustics to be generated by the acoustics generation unit 110 from its one end, propagates and emits aerial vibration of the acoustics into the ear canal from the other end held near the entrance of the ear canal by the holding portion 130. In this way, the acoustics are transmitted to the eardrum.

As described above, the holding portion 130 that holds the vicinity of the other end of the sound guide portion 120 includes the opening portion 131 that allows the entrance of the ear canal (earhole) to open to the outside world. The ambient sound that has passed through the opening portion 131 is transmitted to the eardrum through the entrance of the ear canal that is not closed with the sound guide portion 120. Thus, even under the state in which the listener wears the information processing device 100, the listener is allowed to sufficiently hear the ambient sound through the opening portion 131 while listening to the acoustics to be output from the acoustics generation unit 110 with his/her earhole being not closed.

Further, the information processing device 100 is also capable of suppressing leakage of the generated sound (reproduced sound) to the outside despite allowing the earhole to open. This is because, since the other end of the sound guide portion 120 is worn near the entrance of the ear canal so as to be oriented to the depth side, and the aerial vibration of the generated sound is emitted near the eardrum, the eardrum can be sufficiently vibrated even by a sound in low volume. This is also because a reflected sound of the sound in the low volume is also small, and hence the sound to leak to the outside through the ear canal also can be reduced. As a result, even when output from the information processing device 100 is reduced, sufficient sound quality can be obtained.

Figure 4:
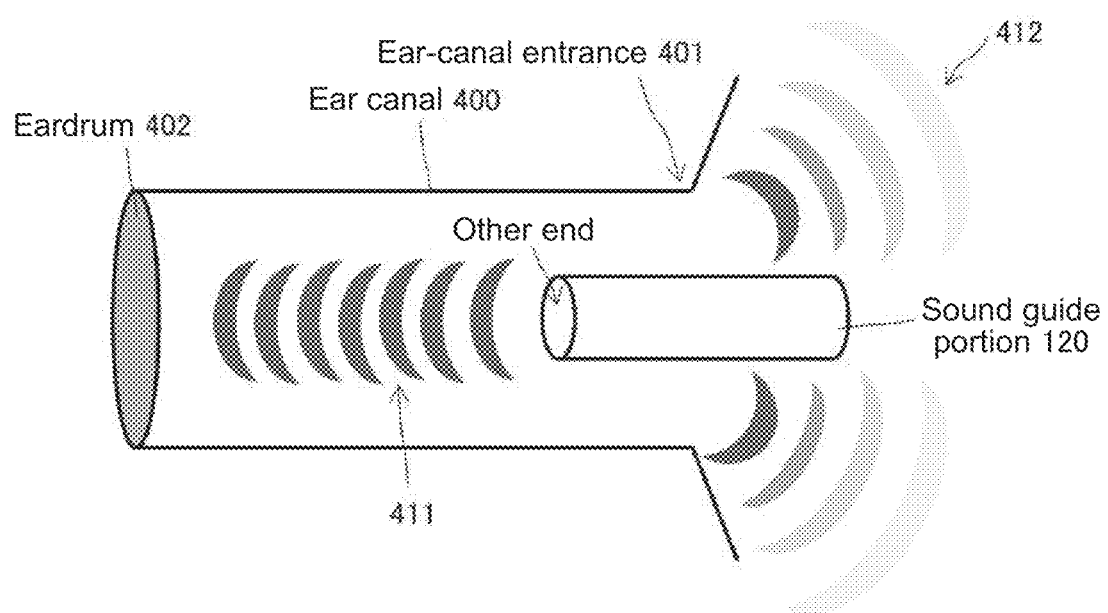
FIG. 4 is a view illustrating how the information processing device 100 outputs sound waves into the ear of the listener.

Still further, directionality of the aerial vibration by the sound emitted from the other end of the sound guide portion 120 also contributes to the prevention of the sound leakage. FIG. 4 illustrates how the information processing device 100 outputs sound waves into the ear of the listener. By emitting the aerial vibration from the other end of the sound guide portion 120 toward an inside of the ear canal, an ear canal 400, which is a hole that extends from an ear-canal entrance 401 to an eardrum 402, normally has a length of approximately 25 mm to 30 mm. The ear canal 300 is a cylindrical closed space. Thus, as denoted by a reference numeral 411, the aerial vibration emitted from the other end of the sound guide portion 120 toward the depth of the ear canal 300 propagates up to the eardrum 402 with directionality. Yet further, sound pressure of the aerial vibration increases in the ear canal 400, and hence sensitivity (gain) increases particularly in the bass range. Meanwhile, an outside of the ear canal 400, that is, the outside world, is an open space. Thus, as denoted by a reference numeral 412, the aerial vibration emitted from the other end of the sound guide portion 120 to the outside of the ear canal 400 does not have directionality, and hence abruptly attenuates.

Referring back to FIG. 1 and FIG. 3, the tubular sound-guide portion 120 has a bent shape folded back at a bent portion 123 from the rear side of the earhole to the front side of the same. Note that, although the information processing device 100 is worn on the ear in a manner that the sound guide portion 120 is folded back near an earlobe or a lower end the auricle in the example illustrated in FIG. 3, the open ear style earpiece may be configured to have a structure that allows the information processing device 100 to be worn on the ear in a manner of being folded back near an upper end of the auricle.

In addition, the sound guide portion 120 further includes a suspended droop portion 124 between the other end to be arranged near the entrance of the ear canal and the bent portion 123. The suspended droop portion 124 is configured to allow the other end of the sound guide portion 120 to transmit the acoustic signal toward the depth of the ear canal, to allow the sound guide portion 120 to droop downward from the holding portion 130, and to allow the acoustics generation unit 110 to be arranged in the rear of the ear with respect to the bent portion 123. In this way, the suspended droop portion 124 as a whole is configured to allow the information processing device 100 to be stably worn on the ear.

In other words, features of the basic structure of the information processing device 100 illustrated in FIG. 1 to FIG. 3 can be summarized as follows.

The information processing device 100 is a small and lightweight device to be worn on the ear of the listener.

The information processing device 100 is also an acoustics output device like an earphone or a headphone having the fold-back structure (bent portion 123) that allows the acoustics generation unit 110 to be arranged in the rear of the ear, and allows the sound guide portion 120 to be folded back from the rear of the auricle to the front of the same. In the example illustrated in FIG. 1 to FIG. 3, the information processing device 100 is worn on the ear of the listener in a manner that the fold-back structure of the sound guide portion 120 reaches a vicinity of the earhole via a vicinity of the earlobe of the ear. The folded-back part of the sound guide portion 120 may extend via the other end of the earlobe or another part of the earlobe. Alternatively, the fold-back structure of the sound guide portion 120 may be a U-shape structure.

The one end of the sound guide portion 120 is coupled to the acoustics generation unit 110 to be arranged in the rear of the ear, and the other end of the sound guide portion 120, which is an acoustics output unit formed of the opening end portion, is held near the earhole by the holding portion 130. At a part to be held in abutment against an ear rear-profile surface of the ear, the acoustics generation unit 110 may include a contact portion that at least has a part in a curved-surface shape to be fitted to the ear rear-profile surface. It is desirable that the holding portion 130 to be arranged at the entrance of the ear canal be formed of a rubber-like elastic member such that burden is not placed under the state in which the 130 is engaged with the vicinity of the entrance of the ear canal (specifically, with incisura intertragica), or may be formed as the separate member.

The other end of the sound guide portion 120 may be configured to have the outer diameter smaller than the inner diameter of the ear canal of the ear. In the configuration example illustrated in FIG. 1 to FIG. 3, the other end of the sound guide portion 120 is held near the entrance of the ear canal of the ear by the holding portion 130.

The holding portion 130 has not only a function to prevent the other end of the sound guide portion 120 from being inserted deeply into the ear canal by being engaged with the vicinity of the ear canal of the ear (incisura intertragica) and by fixing the vicinity of the other end of the sound guide portion 120, but also the function to support and orient the other end of the sound guide portion 120 (acoustics output portion formed of an opening) to the depth of the ear canal from the holding portion 130 by being engaged with the incisura intertragica of the ear. The holding portion 130 has the opening portion 131 that allows the entrance of the ear canal to open to the outside world, and maintains the state in which the earhole is open even while supporting the other end with the outer diameter smaller than the inner diameter of the ear canal of the ear. It is desirable that the holding portion 130 be held in contact with the bottom surface of the cavum conchae at the time of being engaged with the incisura intertragica of the ear. The holding portion 130 may include a contact portion to be held in surface contact (or in contact over a large area) with the bottom surface of the cavum conchae, or may include a contact portion that is curved in conformity with a shape of the bottom surface of the cavum conchae. Note that, although the holding portion 130 in the configuration example illustrated in FIG. 1 to FIG. 3 has a circular shape to support the other end of the sound guide portion 120 near a center of the opening, the holding portion 130 may be formed into an arbitrary shape.

Note that, as long as the acoustics generation unit 110 has a size to be housed in the housing, the acoustics generation unit 110 may be any one of a dynamic speaker, a balanced armature speaker, a piezoelectric speaker, and a capacitive speaker, or a combination of two or more of these types.

1.2 Functional Configuration Example

Figure 5:
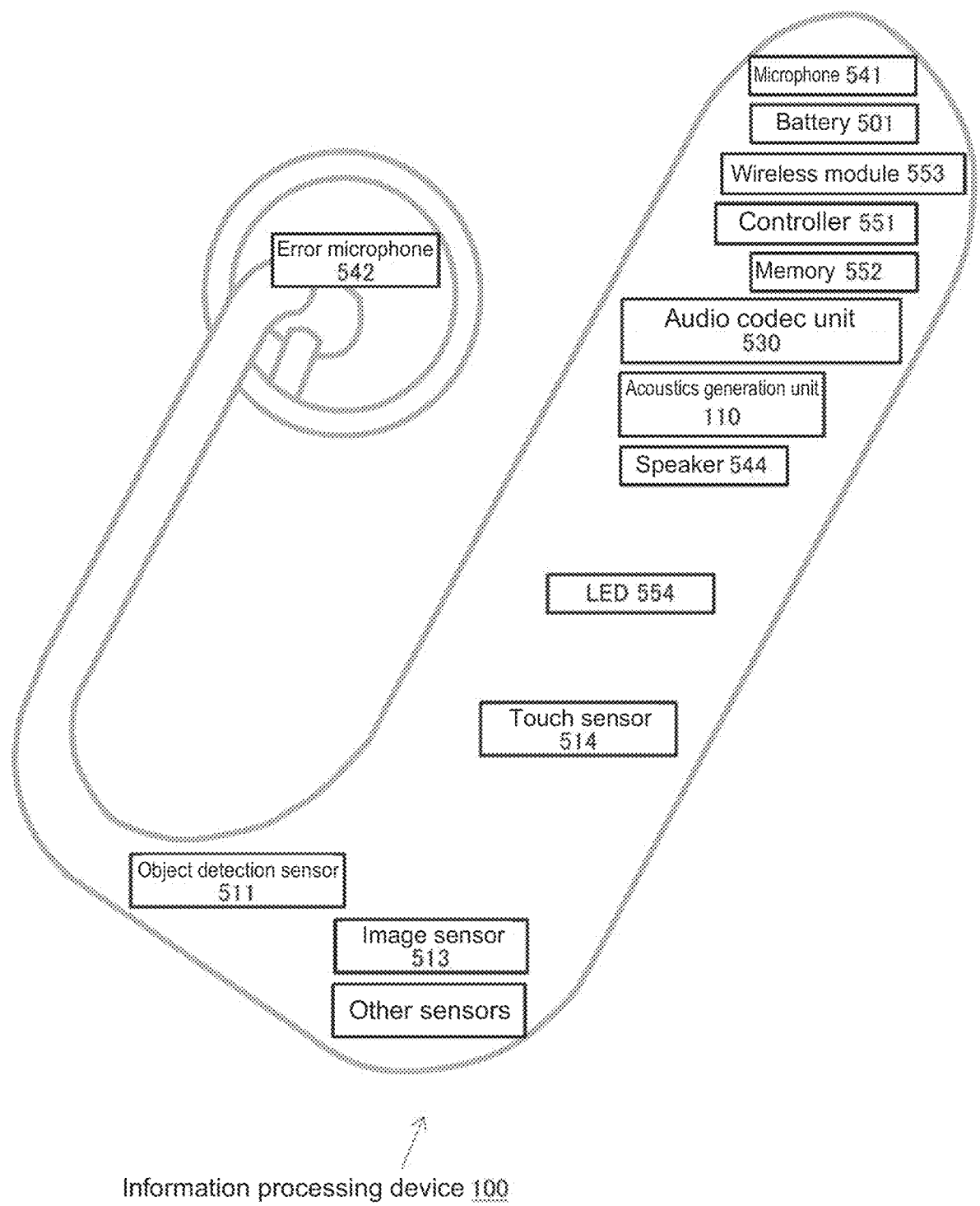
FIG. 5 is a diagram showing an arrangement example of respective functional modules in a body of the information processing device 100.
Figure 6:
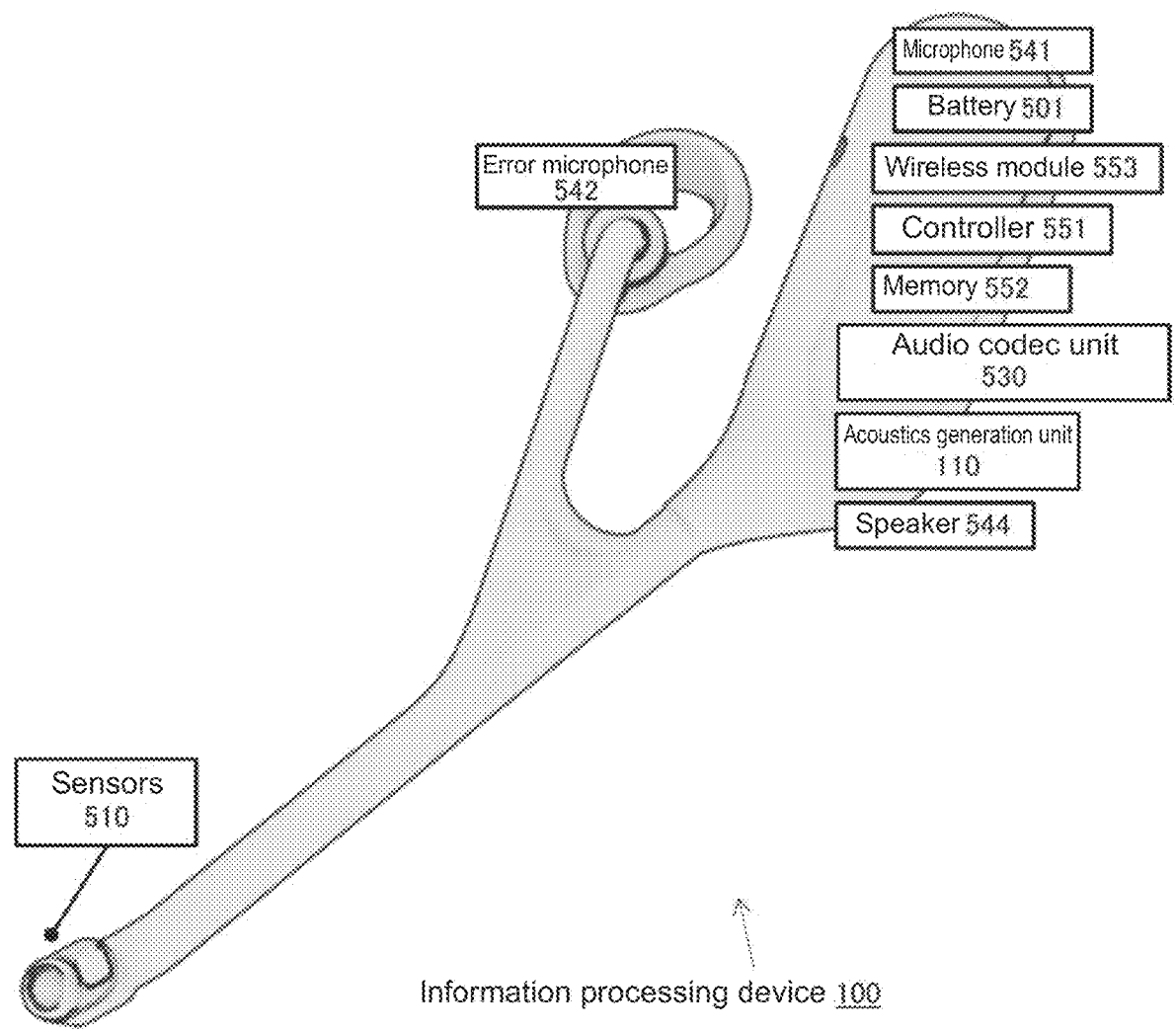
FIG. 6 is a diagram showing another arrangement example of the respective functional modules in another body of the information processing device 100.
Figure 7:
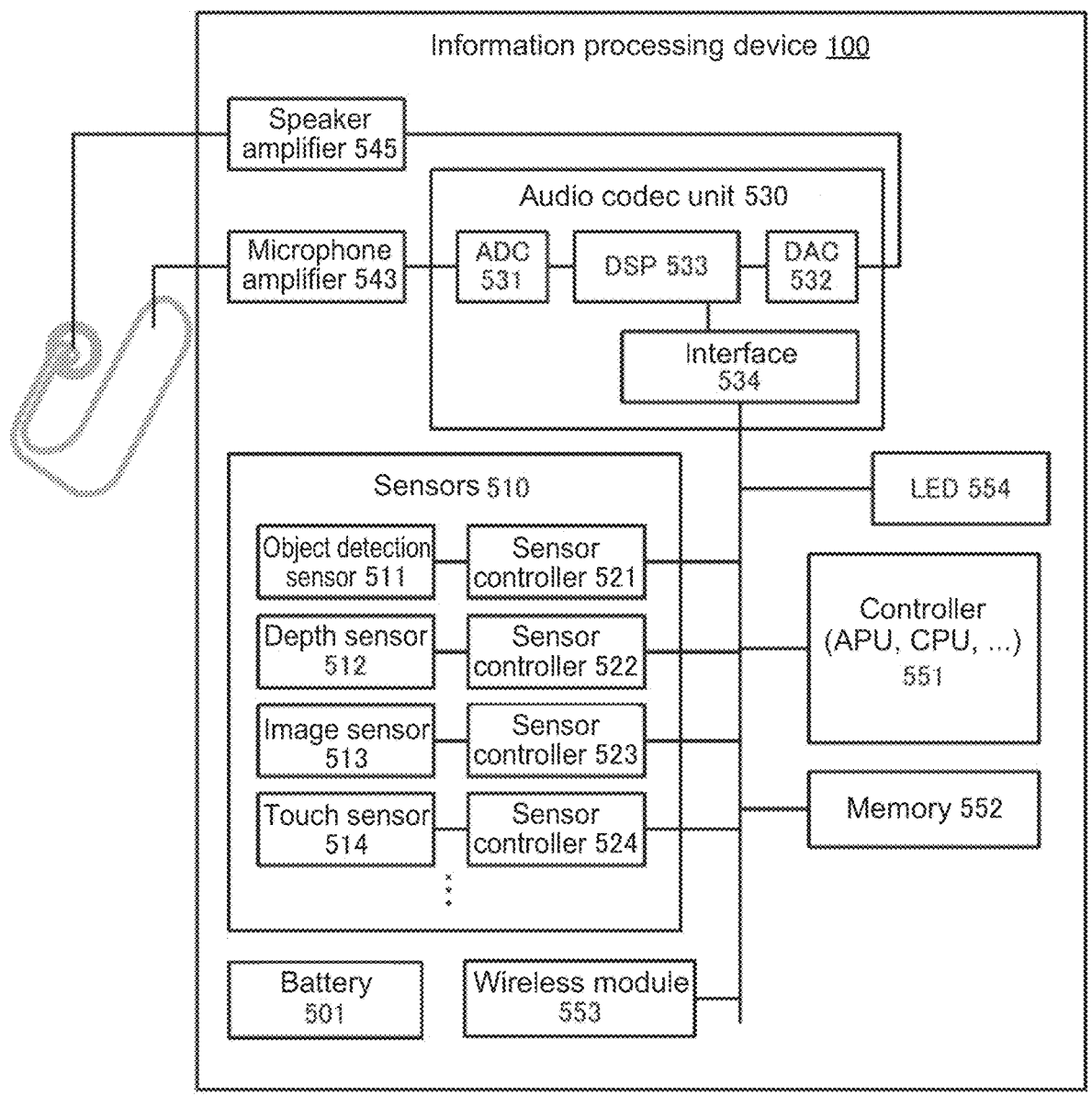
FIG. 7 is a diagram showing a functional configuration example of the information processing device 100.

FIG. 5 and FIG. 6 show arrangement examples of respective functional modules in bodies of the information processing device 100. Further, FIG. 7 shows a functional configuration example of the information processing device 100. Note that, each of the drawings shows an independent configuration example, and hence types and the numbers of the functional modules to be provided do not perfectly the same as each other. Still further, in each of the drawings, due to limitations of space, some of the functional modules are not shown. The same functional modules are denoted by the same reference numerals in all the drawings.

A controller 551, which is a processor to execute computer programs, collectively controls operations of an entirety of the information processing device 100.

A battery 501, which is controlled by a battery controller (not shown), supplies power to all hardware modules in the information processing device 100.

A wireless module 553, which includes a communication RF (Radio Frequency) circuit according to communication standards such as Bluetooth (trademark) and Wi-Fi (trademark), is connectable, in accordance with such communication standards, to the external devices (for example, an information terminal such as a smartwatch that cooperates (or is paired) with the information processing device 100, a wireless access point, and the like).

A memory 552 includes a ROM (Read Only Memory), a SRAM (Static Random-Access Memory), a DRAM (Dynamic Random-Access Memory), a flash memory, a SSD (Solid State Drive), and the like. The memory 552 stores therein computer programs (software) to be executed by the controller 551, and various data to be used at the time of the execution of the programs.

For example, the memory 552 stores therein not only information necessary for wireless connection (address information for making accesses to connection devices, such as a MAC (Media Access Control) address), information about pairing with Bluetooth (trademark) connection devices, information necessary for connection relating to the server device connected on the networks such as the Internet (or cloud) (address information for making an access to the server device, such as an IP (Internet Protocol) address and a MAC address), ID information of personal agents that run on the server device, and the like, but also the computer programs (software) for assisting these connections. The information processing device 100 is capable of connecting to the server device with use of the information, and exchanging information and data with the server device. In this way, the information processing device 100 can request the computer programs that run on the server device, such as the personal agent, to execute necessary information processes, and can receive data as results of the processes necessary for the information processing device 100. The data received from the server device include information about objects recognized in the surroundings (characteristics and shapes), voice data (such as sound information of sound sources), and the like.

Further, the memory 552 is capable of storing therein data such as information about various modes of the information processing device 100, the sound information of the sound sources (sound data), types of the sound information, and the amount (data size) of the sound information as parameters to be utilized by various hardware modules or software modules, or as temporary buffer-data. Still further, the memory 552 is capable of storing therein parameters of acoustic processing filters and sensor processing filters. Note that, in this embodiment, the information processing device 100 has the various modes such as a noise cancelling mode, a sound mode (voice mode or virtual-sound mode), and a sensing mode (normal mode or white-cane mode), details of which are described below.

Sensors 510 include various sensor elements such as an object detection sensor 511, a depth sensor 512, an image sensor 513, and a touch sensor 514. Although not shown, the sensors 510 may also include at least one of a GPS (Global Positioning System) or a GNSS (Global Navigation Satelite System) that acquires position information, an acceleration sensor or a gyroscopic sensor that detects movements of the head of the listener wearing the information processing device 100, a temperature sensor that detects an ambient temperature around the information processing device 100, a biometric sensor that acquires biological information (such as a body temperature, a blood pressure, and a pulse) of the user wearing the information processing device 100, a barometric sensor, a direction sensor, a proximity sensor, or the like. For example, as shown in FIG. 5, the sensors 510 may be arranged in a distributed manner in the body of the information processing device 100 having a shape of an integrally formed headphone (or earphone). Alternatively, as shown in FIG. 6, the sensors 510 may be intensively arranged at a particular part such as a lower end portion that serves also as a signal-cable duct. Respective detection signals from the sensors 511, 512, . . . are subjected to signal processes respectively by corresponding ones of sensor controllers 521, 522, . . . and then output as digital detection signals.

(A) Audio-Signal Processing Function

In order to provide a basic voice-service function for the audible ability enhancement, the information processing device 100 further includes, for example, an audio codec unit 530, a microphone 541, an error microphone 542, a microphone amplifier 543, a speaker 544, and a speaker amplifier 545, which are circuit components that general audio headphones need for implementing an audio-signal processing function.

Note that, the audio codec unit 530 includes, for example, an ADC (Analog-to-Digital Converter) 531, a DAC (Digital-to-Analog Converter) 532, a DSP (Digital Signal Processor) 533, and an interface controller 534, and is constituted, for example, by a single semiconductor chip.

Further, the error microphone 542 is a sound collecting microphone for noise cancelling. These circuit components are linked to each other via a data bus, an instruction bus, and the like. Although the microphone 541 and the error microphone 542 shown in FIG. 5 and FIG. 6 are each one, the microphone 541 and the error microphone 542 may each be a microphone array including two or more microphones. Still further, the error microphone 542 need not necessarily be regarded as a microphone dedicated to error-signal acquisition and may be a microphone for acquiring noise cancelling signals.

Still further, audio signals to be output from the speaker amplifier 545 are basically input to the speaker 544 and converted to acoustics (physical vibration) by the speaker 544. The acoustics generation unit 110 may serve also as the speaker 544. The acoustics generated from the acoustics generation unit 110 are transmitted to the ear of the listener via the sound guide portion 120.

As described below, the DSP 533 is capable of implementing a function to execute a beamforming process (technology for estimating a position of a predetermined sound source (arrival angle) on the basis of gaps between periods of voice arrival from the predetermined sound source to a plurality of microphones and on the basis of distances between the microphones) on signals acquired from the microphone arrays, and capable of executing a filtering process based on HRTFs (Head-Related Transfer Functions) for localizing a sound image of the sound source. Details of the sound-image localization with use of the HRTFs are described below.

The DSP 533 may be used also as a filter for generating the noise cancelling signals. Alternatively, some of hardware blocks of the DSP 533 may generate the noise cancelling signals, or the noise cancelling signals may be generated by adjusting parameters of the filter through software processes. Still alternatively, operations of the hardware blocks that generate the noise cancelling signals may be controlled by the software.

Yet alternatively, the DSP 533 may preset a plurality of noise cancelling modes. In this case, parameter sets for a plurality of filters are stored in the memory 552, and the DSP 533 may set coefficients for the filters by reading out the parameter sets in accordance with selected ones of the modes from the memory 552, thereby varying characteristics of the noise cancellation.

The noise cancelling modes may be automatically switched. For example, the noise cancelling modes can be automatically switches in accordance, for example, with variation in environment or actions of the listener (such as running, walking, sitting, taking a train, taking a bus, and driving an automobile), the variation and the actions being recognized via the microphone 541, the object detection sensor 511, the depth sensor 512, the image sensor 513, and other sensors (such as the GPS or the GNSS that acquires the position information, the acceleration sensor or the gyroscopic sensor that detects the movements of the head of the listener wearing the information processing device 100, the temperature sensor that detects the ambient temperature around the information processing device 100, the biometric sensor that acquires the biological information (such as body temperature, blood pressure, and pulse) of the user wearing the information processing device 100, the barometric sensor, the direction sensor, the proximity sensor, and the like), or being recognized by input from the listener (such as mode instructions via a voice, a command, and a button).

In addition, the noise cancelling modes may be manually switched by the listener or another. For example, the modes may be manually switched via the touch sensor 514 or mechanical controllers such as the buttons (not shown), which are provided to the housing of the information processing device 100. Alternatively, the noise cancelling modes may be set by selection operations via user interfaces of the external devices that cooperate with the information processing device 100 (such as a smartphone and other information terminals to be wirelessly connected to the information processing device 100 via Bluetooth (trademark), Wi-Fi (trademark), or the like).

The noise cancelling signals are signals in phases reverse to those of the audio signals collected by the microphone and amplified by the microphone amplifier 543. These noise cancelling signals are set to be synthesized by an adder (provided, for example, in the DSP 533) with voice data to be output from the speaker 544 (such as music data, data generated by the filtering process on the ambient sound data collected by the microphone, and voice data separated from the ambient sound or transmitted via the wireless module 553), amplified by the speaker amplifier 545, and then output from the speaker 544. The parameters that determine the characteristics of the filters to perform the noise cancellation may be set by setting the parameter sets stored in advance in association with the plurality of preset noise-cancelling modes in the memory 552 through a mode selection via a user interface such as the touch sensor 514 of the information processing device 100, or may be set arbitrarily or by making a selection from the preset modes via the user interfaces of the external devices (such as smartphone) that cooperate with the information processing device 100 (described above). The mode may be set on the basis of information from a server device connected on networks such as the Internet (or cloud).

The noise cancelling signals may be generated with respect to each of the voice data collected respectively from the plurality of error microphones 542. The microphone 541 arranged near the speaker 544 may serve also as the error microphone 542. The error microphone 542, which is also referred to as a FB (Feedback) microphone, is used in a data path for generating signals for cancelling a FB noise that has leaked up to a vicinity of the speaker 544. Meanwhile, the microphone 541, which is generally arranged at a position that is away from the speaker 544 and where the sounds from an external environment are further easily collected, is also referred to as a FF (Feedforward) microphone, and is used in a data path for generating signals for cancelling a FF noise.

The DSP 533 may have a function to perform wireless voice communication (phone calls or communication with agents). The voice communication of this type may be processed by hardware or may be partially controlled by software. In order to prevent the noise collected by the microphone 541 from being transmitted to a destination during the voice communication, the DSP 533 may include a built-in noise suppression (or reduction) filter circuit that suppresses the noise in the signal. The DSP 533 may include a built-in equalizer capable of varying frequency characteristics of the voice data. Parameters of the equalizer may be set by setting the parameter sets stored in advance in association with a plurality of preset equalizer modes in the memory 552 through the mode selection via the user interface such as the touch sensor 514 of the information processing device 100, or may be set arbitrarily or by making a selection from the preset modes via the user interfaces of the external devices (such as smartphone) that cooperate with the information processing device 100. In addition, similar to the above-described setting of the noise cancelling mode, the equalizer mode may be automatically set in accordance with the recognition of the situation or the recognition of the actions of the listener based on results of detection by the sensors 510.

Although the signals of the ambient sound collected by the microphone 541 may be analyzed by the audio codec unit 530, the voice data may be transmitted not to the audio codec unit 530 but to the controller 551, and the voice data may be processed by the controller 551. The controller 551 is a processor that is called, for example, a CPU (Central Processing Unit), an MPU (Micro Processing Unit), a GPU (Graphics Processing Unit), or a GPGPU (General Purpose Graphic Processing Unit), and that reads out and executes the programs stored in the memory 552. The analysis of the voice data and other processes may be executed by the programs that run on the controller 551. At this time, the input signals may be limited within a particular frequency band by a LPF (Low-Pass Filter) or a HPF (High Pass Filter) installed in the audio codec unit 530, or their data may be modified by a sampling rate converter so as to be transmitted as side chain data for signal analysis to another external controller (not shown). The external controller may be a processor such as the MPU or may be the server device (a processing device or a storage (including memory)) on the Internet, which is connected via wireless or wired communication.

(B) Space Recognition Sensor

The information processing device 100 is also a device that enhances the audible ability of the listener wearing the device so as to aid his/her visual ability. The information processing device 100 is capable of providing a white-cane function as one type of the audible ability enhancement.

In order to provide the white-cane function, the information processing device 100 includes the built-in object detection sensor 511. As the object detection sensor 511, for example, millimeter-wave radar, LIDAR (Laser Imaging Detection and Ranging), an infrared sensor, an ultrasonic sensor, or the like may be used. Alternatively, for example, methods combined with the beamforming technology may be used as the object detection sensor 511. The object detection sensor 511 is capable of detecting an object by actively transmitting signals and analyzing reflected signals. For example, when the millimeter-wave data is used as the object detection sensor 511, even in environments such as bad weather (rain, snow, fog) and nighttime, objects that strongly reflect radar signals, such as vehicles, and objects that weakly reflect the radar signals, such as humans, can be detected at once. When signals in a wireless frequency band of 5 GHz are used as the signals to be transmitted, an object can be detected in a range of less than 10 cm when a resolution of the radar is high, an object can be detected at an azimuth of less than 1 degrees when an azimuth resolution of the radar is high. In addition, the millimeter-wave radar is adaptable to long ranges, and hence even objects at a range of several hundred meters away can be detected.

Figure 57:
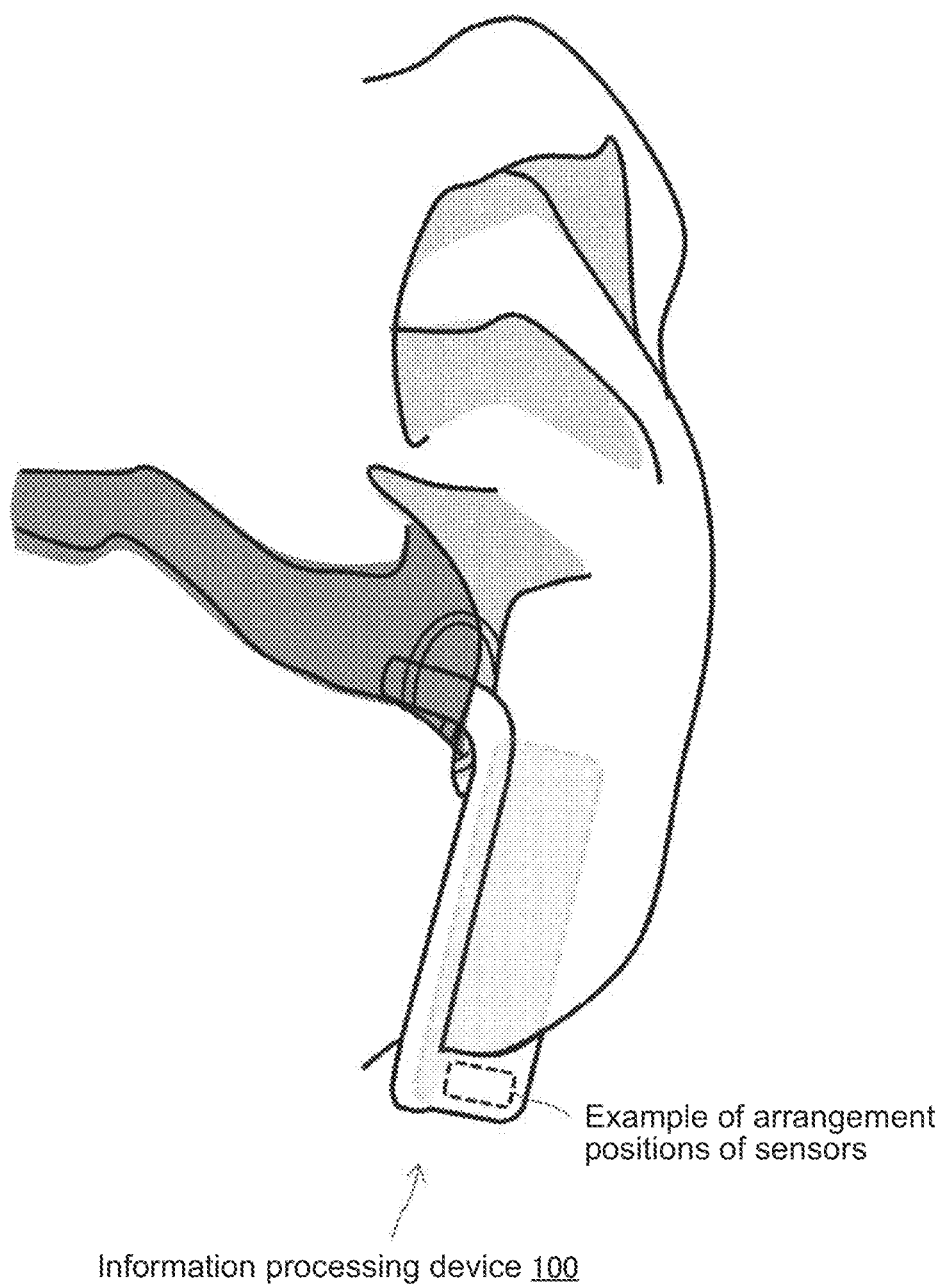
FIG. 57 is a view illustrating an example of arrangement positions of some of the sensors of the information processing device 100.

When the infrared sensor is used as the object detection sensor 511, it is desirable that the infrared sensor be arranged at a part protruding downward from the earlobe (for example, in range as exemplified by a dotted-line portion in FIG. 57) under the state in which the housing of the information processing device 100 is worn on one of the ears of the listener such that emission to a forward side as viewed from the user can be performed. When the ultrasonic sensor is used as the object detection sensor 511, the ultrasonic sensor is arranged in the housing of the information processing device 100, specifically, at the part protruding downward from the earlobe (for example, in range as exemplified by the dotted-line portion in FIG. 57) so as to be oriented to a lower side than a direction of a line-of-sight of the listener under the state in which the housing of the information processing device 100 is worn on one of the ears of the listener such that a proximate object in front of his/her feet can be detected under a state in which the listener looks forward. More specifically, the ultrasonic sensor may be arranged in a predetermined direction and at a position from which obstacles within 5 m ahead can be detected under a state in which the listener wearing the information processing device 100 on his/her right ear looks forward. In addition, the acceleration sensor and an angular velocity sensor may be utilized to estimate a posture of the head, thereby correcting an area of the detection.

Detected information about objects in the surroundings need to be immediately provided to the listener. Thus, it is desirable that a detection signal from the object detection sensor 511 be processed by the controller 551 built in the information processing device 100 such that a certain information can be provided to the listener with a short delay. Note that, for a purpose of analyzing information other than real-time information, processes such as space recognition and object recognition may be executed in a server device by transmitting the results of the detection by the object detection sensor 511 together with other sensor-information to the server device (processing device or storage (including memory)) on the Internet (or cloud), which is connected via wireless or wired communication.

The information processing device 100 is capable of performing an object recognition on the basis of the information acquired from the image sensor 513 including one or more image sensors 513. With use of the image sensors 513, information about colors and shapes (including depths) of the objects can be used. In addition, the depth sensor 512 of the information processing device 100 may be a depth sensor typified by a TOF (Time Of Flight) sensor. The TOF sensor is a sensor that includes an infrared camera to capture infrared reflected rays at a frequency from approximately 30 Hz to 60 Hz, and that calculates a distance to a reflective object on the basis of a time period in which the infrared rays travel back and forth. When the user makes a dynamic movement, data that the TOF sensor acquires may blur. In order to avoid the blurring, it is desirable that blur correction with use of an actuator or blur correction by signal processes be performed with respect to the TOF sensor. By utilizing the depth sensor 512 such as the TOF sensor, the information processing device 100 can assist the listener to recognize how the objects are present and arranged in the three-dimensional space.

It is desirable that the image sensors 513 and the depth sensor (such as TOF sensor) 512 be arranged to capture the direction of the line-of-sight of the listener wearing the information processing device 100 on his/her ear such that these sensors can function to grasp images that the listener is viewing. It is desirable that the image sensors 513 and the depth sensor 512 be arranged at the part protruding downward from the earlobe (for example, in range as exemplified by the dotted-line portion in FIG. 57) under the state in which the housing of the information processing device 100 is worn on one of the ears of the listener such that the forward side as viewed from the user can be captured.

The analysis process and the recognition process with use of the detected information from the image sensors 513 and the depth sensor 512 may be locally executed with use of the CPU, the MPU, the GPU, or the GPGPU built in the controller 551 in the information processing device 100. Alternatively, an object recognition procedure and an environment recognition process may be executed in a server device by transmitting information about the image to the server device (such as processing device or storage (including memory)) on networks such as the Internet (or cloud), which is connected via wireless or wired communication. In the latter case, the information processing device 100 can receive the information about the recognized objects and the recognized environment from the server device and present the information as the voice information to the listener.

Figure 8:
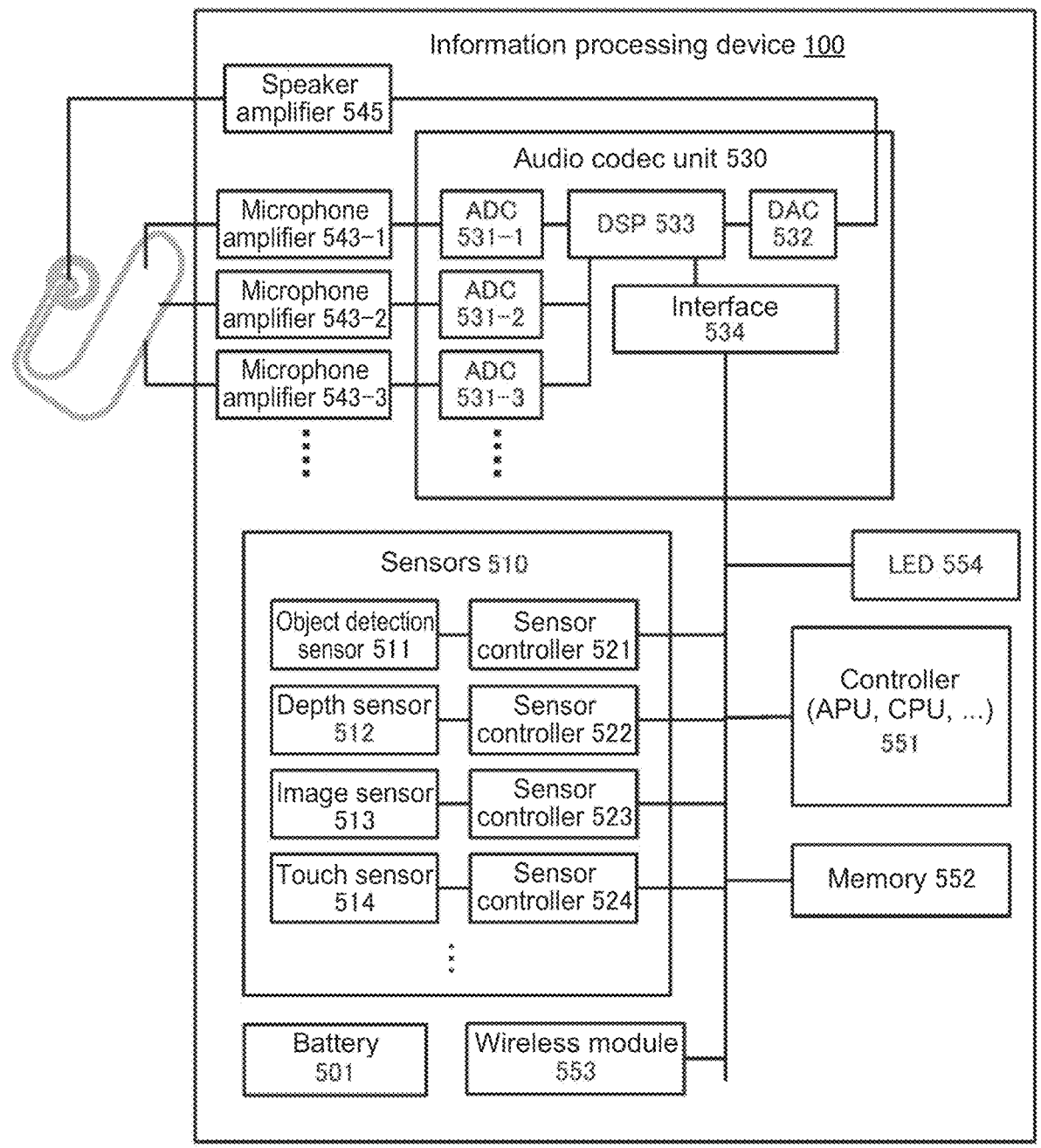
FIG. 8 is a diagram showing another functional-configuration example (configuration example in which a microphone array antenna is provided) of the information processing device 100.

In addition, the information processing device 100 may include the two or more microphones so as to implement a function of the microphone array. FIG. 8 shows a configuration example in which the information processing device 100 is configured to include the plurality of microphones. In FIG. 8, the information processing device 100 includes a plurality of microphone amplifiers 543-1, 543-2, 543-3, . . . arranged respectively for the microphones, and the audio codec unit 530 including independent ADCs 531-1, 531-2, 531-3, . . . that perform AD conversion of the signals of the ambient sound collected by the microphones (specifically, signals after amplification processes by the microphone amplifiers 543). In addition, the DSP 533 processes the digital audio signals obtained respectively by the conversion of the ambient sounds, which are collected respectively by the microphones, with the ADCs 531-1, 531-2, 531-3, . . . . By causing the plurality of microphones to function as the microphone array, and by using the beamforming technology (described above), sound-source separation for allowing recognition of directions of the sound sources is performed. The DSP 533 in the audio codec unit 530 or the controller 551 is capable of analyzing the acoustics by synthesizing microphone channels acquired respectively from the plurality of microphones, and then by performing the sound-source separation in all angular ranges (for example, ranges obtained by dividing 360 degrees into eight equal parts at 45 degrees) around the microphone channels. Such an acoustics analyzing method allows the microphone array to be used as a space recognition sensor.

By combining the sound-source separation with the above-described noise cancelling signals, or by performing both the sound source generation and reduction of noises out of predetermined bandwidths (such as voices and road noises to be generated by vehicles) with use of the filter circuit, human voices, sounds of approaching vehicles, or the like can be recognized together with their azimuth information. In addition, the information processing device 100 is capable of broadening a risk avoidance action by the intrinsic audible ability of the listener by providing the voice information to the listener on the basis of the directional information, thereby assisting the actions of the listener. Note that, the acoustics analysis need not necessarily be performed, for example, by the DSP 533 or the controller 551 in the information processing device 100, and the acoustics analysis may be performed on the server device side by transmitting respective signals on voice channels to the server device on the Internet via the wireless module 553.

By using the information acquired from the depth sensor 512, the image sensor 513, and the microphone array including the two or more microphones, own-position estimation and environment map generation can be performed at once. As a technology for performing the own-position estimation and the environment map generation at once in such a way, SLAM (Simultaneous Localization and Mapping) has been known. The above-described environment recognition process may be a SLAM process, and the information about the recognized environment may be SLAM information.

By the information about the recognized environment and the information about the recognized object, information about in which direction an empty space is left and what kind of object is present in a space are available. With this, the sound information that assists the listener to be able to move even without depending on visual information by the virtual sounds (including voices) can be provided. This is particularly advantageous in a case where the listener is visually handicapped.

Figure 19:
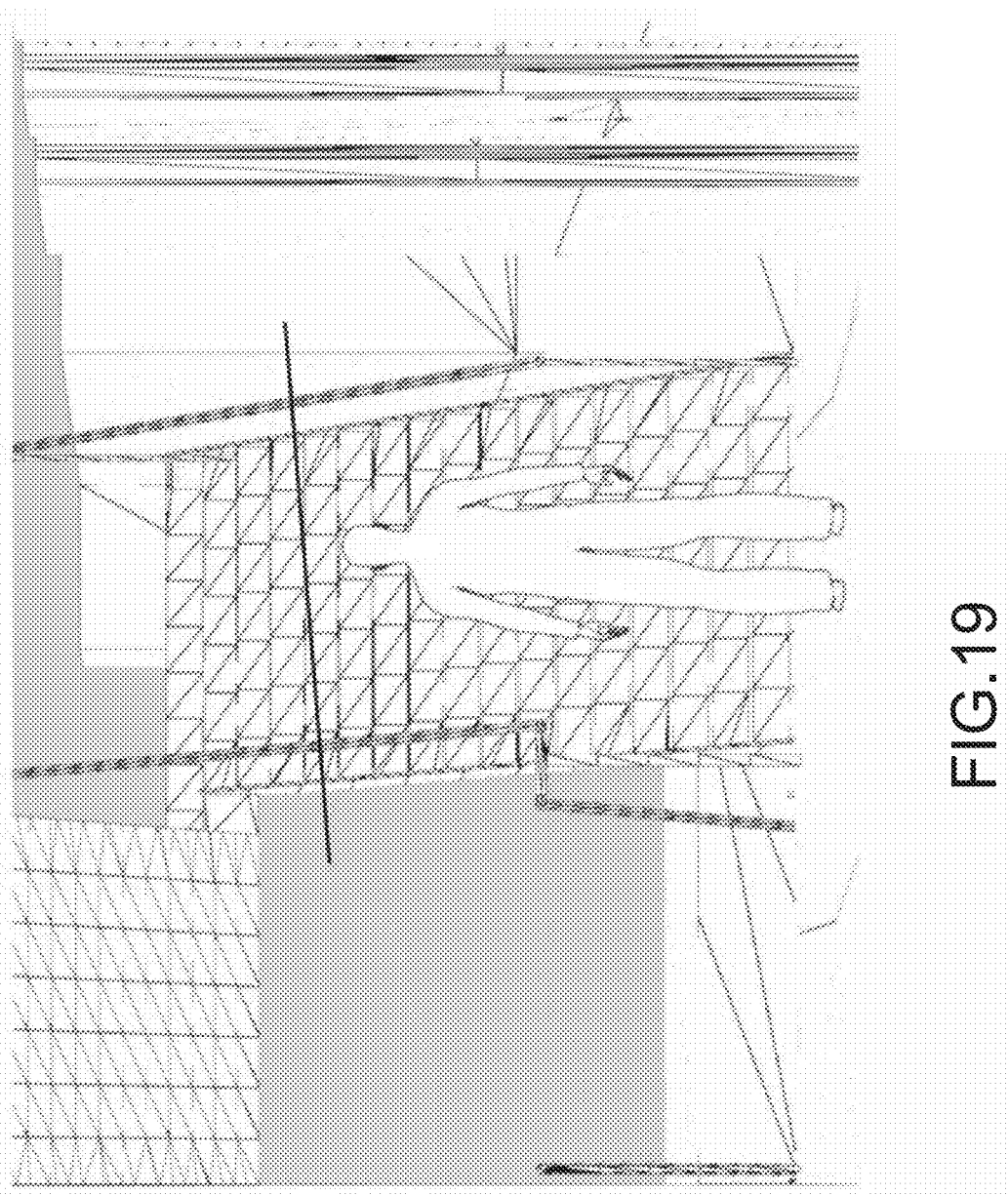
FIG. 19 is a view depicting an example of an image of a state of space recognition, which can be grasped on the basis of a result of detection by a depth sensor 512.

The depth sensor 512 allows acquisition of, for example, luminance images in which close objects are expressed in bright colors and far objects are expressed in dark colors. In addition, the amount of information at a time when point-cloud-data information extracted from the depth sensor 512 are used as they are is excessively large, and hence, for example, a filtering process such as voxel grid filtering may be executed. FIG. 19 depicts an example of an image of a state of the space recognition, which can be grasped on the basis of the result of the detection by the depth sensor 512. Note that, in FIG. 19, an image of a person (the listener wearing the information processing device 100) is mapped in the space. As understood from FIG. 19, information about, for example, edges of objects can be acquired by the depth sensor 512.

As described below, the information processing device 100 provides a three-dimensional acoustic space to the listener by subjecting the virtual sound sources to the localization in a three-dimensional space to be recognized on the basis of the results of the detection by the image sensor 513 and the depth sensor 512. In the three-dimensional acoustic space, by varying parameters for subjecting the virtual sound sources to the localization (such as start points and end points, travelling trajectories, travelling speeds, and the like for the virtual sounds to travel), various impressions can be given to the listener, which can be utilized also for assisting the actions of the listener.

In addition, when, for example, the smartphone and eyewear (called, for example, VR (Virtual Reality) glasses, AR glasses, or smart glasses) each provided with a display cooperates with the information processing device 100, the image of the space recognition acquired by the depth sensor 512 (as depicted in FIG. 19) may be subjected to an image process and displayed on the display. In this case, the listener is allowed to recognize the three-dimensional space not only as an acoustic space but also as a visual space.

(C) User Interface Function

Figure 9:
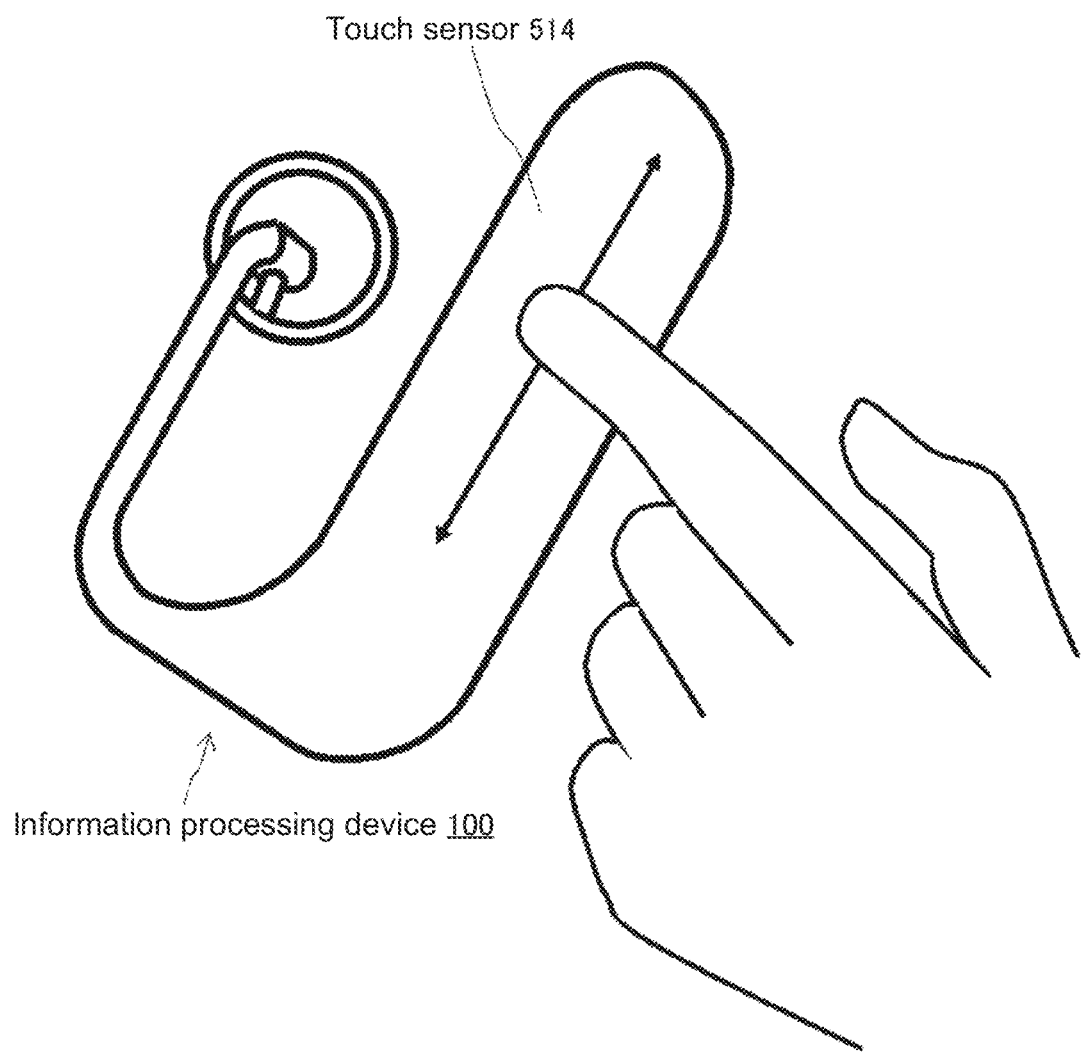
FIG. 9 is a view illustrating how the listener slides his/her finger along a touch sensor 514 on a surface of a housing of the information processing device 100.
Figure 10:
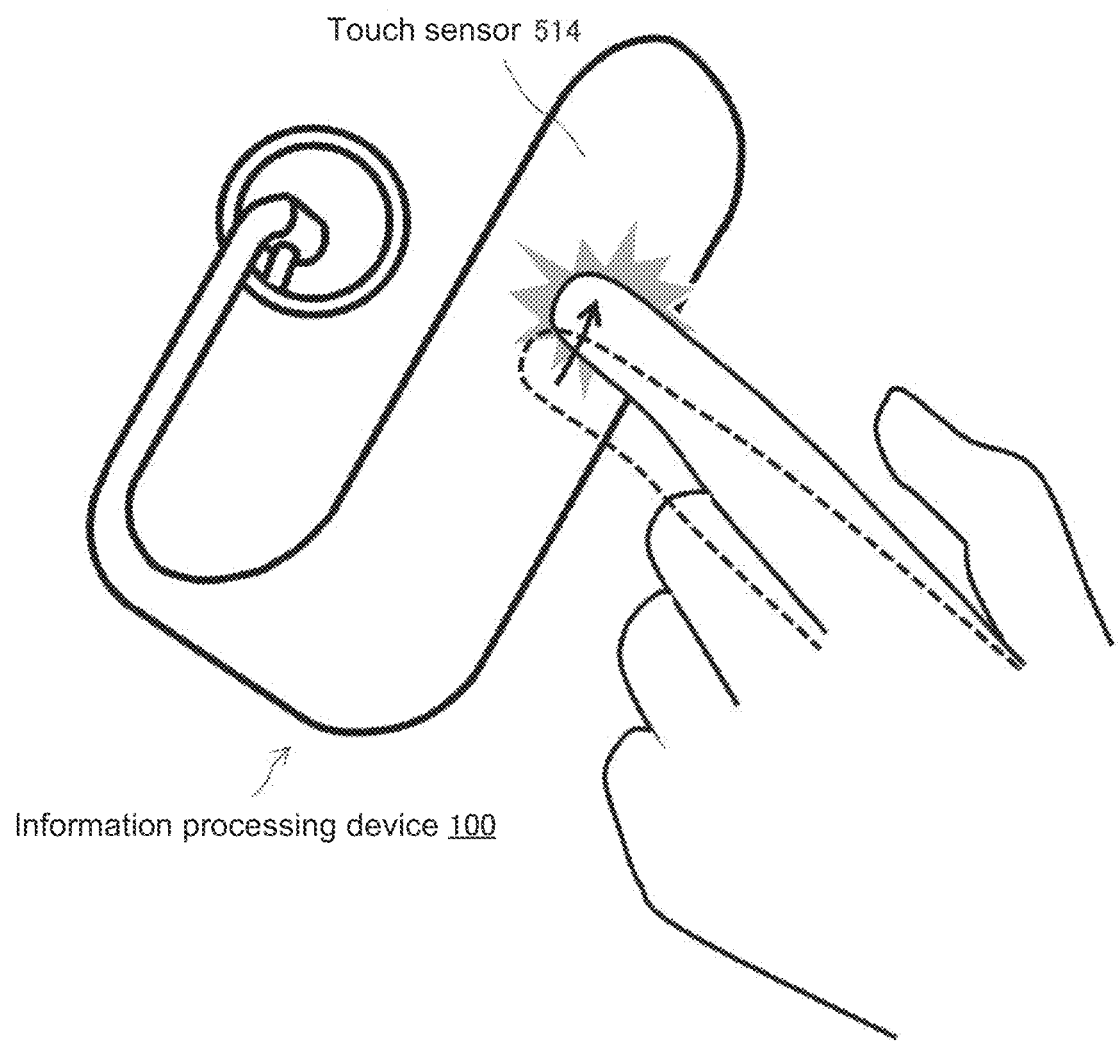
FIG. 10 is a view illustrating how the listener taps the touch sensor 514 on the surface of the housing of the information processing device 100 with his/her finger.

The information processing device 100 is capable of providing the user interface by being provided with the touch sensor 514 on a front surface or a side surface of its housing. FIG. 9 illustrates how the listener slides his/her finger along the touch sensor 514. In addition, FIG. 10 illustrates how the listener taps the touch sensor 514 with his/her finger.

The information processing device 100 is capable of controlling a level of sound volume, a level of the noise cancelling, the amount of the voice information, and the like in accordance with an amount (distance) of sliding the finger along the touch sensor 514. In addition, the listener can instruct the information processing device 100 to perform turning ON/OFF of a power source or a virtual sound service, mode switching, and the like by the operations such as tapping the touch sensor 514 with his/her finger. These operations to the user interface need not necessarily be performed via the touch sensor 514, and may be performed by voice control. The voice information from the listener, which are input via the microphone 541, may be subjected to real-time voice recognition by the controller 551 in the information processing device 100, or may be transmitted to the server device on the network via wireless or wired communication such that the amount of the voice information can be controlled as the listener wants by the server device that actually provides the service to the listener.

The user interface with use of the touch sensor 514 is advantageous also in a case of remotely operating the external devices. The devices connected to each other via the networks such as the Internet by the IoT technology each have an agent software function. With use of this agent software, the devices can be remote-controlled in response to the operations to the touch sensor 514 by the listener. For example, with regard to elevators, the elevator can be remote-controlled by issuing, to the touch sensor 514, the same instructions as instructions to be issued via an "Up Elevator Call" button and a "Down Elevator Call" button. Such remote control can be performed by using the virtual sounds, details of which are described below.

In addition, when the information processing device 100 cooperates with the external device (smartphone) provided with the touch interface, by utilizing the touch interface of the external device, selections of all the modes of the information processing device 100 (noise cancelling modes and equalizer modes) can be made, and the amount of the sound information can be controlled.

Figure 11:
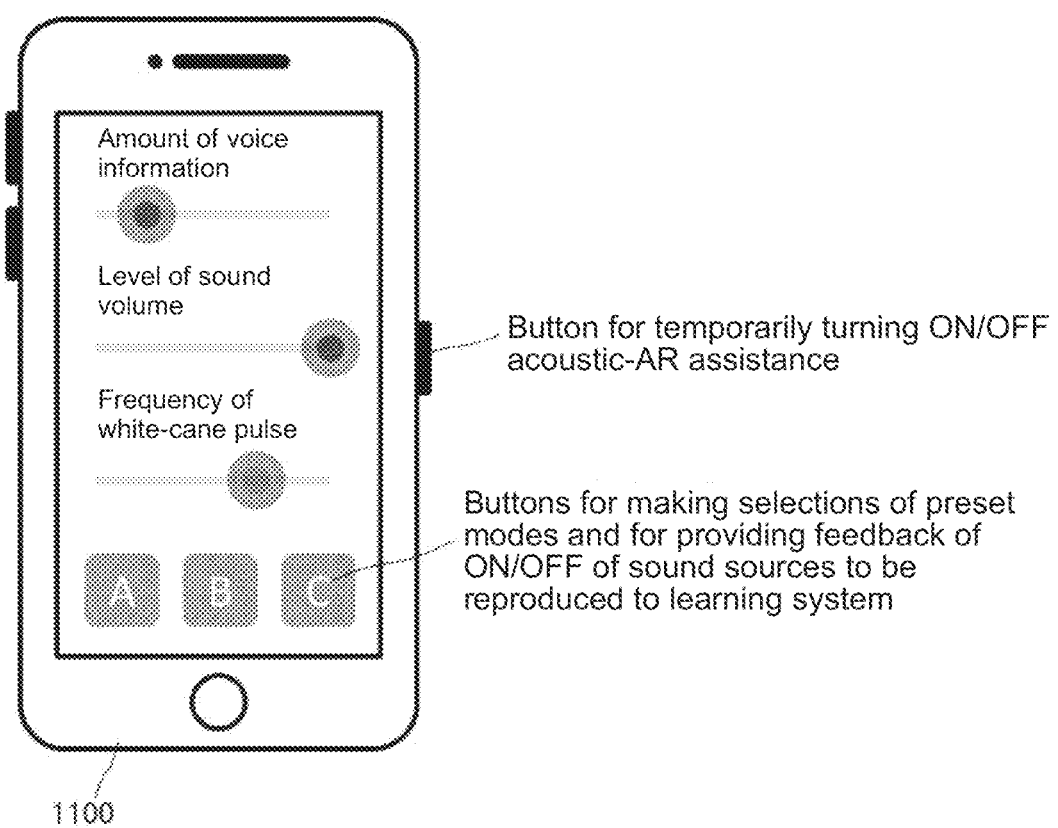
FIG. 11 is a view illustrating an example in which the information processing device 100 is controlled via a user interface provided to a smartphone 1100.

FIG. 11 illustrates an example in which the information processing device 100 is controlled via a user interface provided to a smartphone 1100. Specifically, mechanical controllers arranged on a side surface of a housing of the smartphone 1100, such as buttons, can be temporarily utilized as buttons for turning ON/OFF acoustic-AR assistance functions of the information processing device 100 (that is, various functions described in the embodiment herein). In addition, a screen of the smartphone 1100 can be utilized as an UI (User Interface) in which, for example, buttons for making selections of preset modes on the information processing device 100 side and for providing feedback of ON/OFF of the sound sources to be reproduced to a learning/estimation (inference) system are arranged.

The information processing device 100 may include an LED (Light Emitting Diode) 554 that indicating internal conditions. The LED 554 may be of a single color such as blue, red, yellow, or white, or may be capable of emitting a light beam in any one of the colors each time despite having a function to emit light beams in these plurality of colors. In addition, the LED 554 may have a shape of a manufacturer's logo or a logo indicating a product name. It is desirable that the LED 554 be arranged and installed at a position that can be easily viewed from the surroundings. For example, although an upper surface or the side surface of the housing is desirable, the LED 554 may be arranged and installed at other positions as long as the LED 554 is visible from the outside. The LED 554 is generally used for indicating processing conditions of the controller 551. For example, the LED 554 may be used for explicitly indicating a power ON state or an ON/OFF state of a specific function.

Further, the LED 554 is advantageous in indicating the modes described below of the information processing device 100. Among them, the "white cane" mode is a function suitable to a case where the visually handicapped listener utilizes the information processing device 100. Thus, the use of the indication function of the LED 554 is advantageous for a purpose of clearly notifying, by utilizing the indication function of the LED 554, persons around the listener that the listener needs the "white cane" mode. It is desirable that, when specific colors to be used by listeners who need visual ability assistance have been defined as a standard or an industry standard, such defined colors be indicated with use of the LED 554.

Still further, when the "white cane" mode is selected in the information processing device 100, for example, the forward side as viewed from the feet of the listener may be illuminated by a lamp that emits, for example, a while light beam (not shown) together with the indication by the LED 554 (or instead of indication by the LED 554). In such a way, the persons in the surroundings can see the illumination in front of the feet of the listener as well as paying attention by looking at a normal (real) "white cane," thereby understanding that the listener needs the visual assistance. This lamp may be an output device capable of projecting images, such as a projector. In that case, for example, by projecting the images exactly as a cane is present in front of the feet of the listener, the persons in the surroundings can be clearly notified of what kind of assistance is required.

(D) Learning/Estimation (Inference) Function

Figure 12:
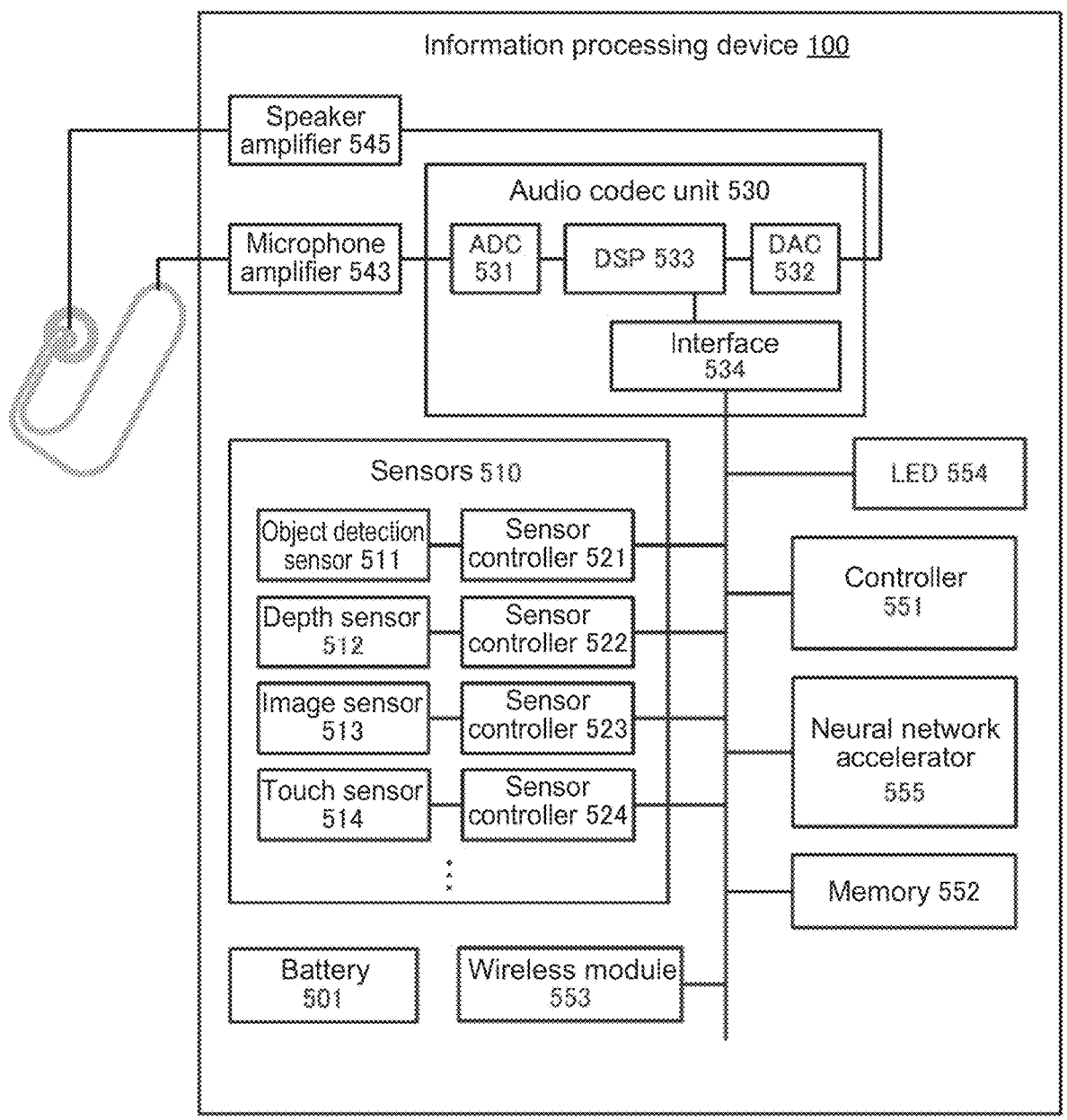
FIG. 12 is a diagram showing still another functional-configuration example (configuration example in which a learning/estimation function is enhanced) of the information processing device 100.

FIG. 12 shows a configuration example in which the information processing device 100 includes a neural network accelerator 555. By providing the neural network accelerator 555 in addition to the controller 551 including the CPU or the like, a process of the learning and the estimation based, for example, on the sensor information input via the sensors 510 and the actions of the listener can be accelerated. Note that, the neural network accelerator 555 may also be installed in a mixed manner in the single controller 551 together with the CPU and the GPU as hardware-processing functional blocks that are functionally different from each other. In addition, a process of the function of the neural network accelerator 555 may be executed by the general-purpose GPGPU. The GPGPU may be built in the controller instead of the above-mentioned GPU. However, in this case, both a function of a neural network and acoustic-space rendering described below need to be processed by the GPGPU (or GPU), and hence a processing capacity is limited in comparison with a case where the function and the rendering are implemented as units separate from each other. Meanwhile, development cost can be reduced. In addition, the neural network accelerator 555 is suitable to learning methods, particularly, to learning methods that use the neural network. Specifically, the learning methods that use the neural network include a learning method of what is called deep learning. Examples of the neural network for implementing the deep learning include combinations of various neural networks such as a convolutional neural network (CNN), a recurrent neural network, an autoencoder, a style transfer network, and a GAN (Generative Adversarial Network). In addition, the learning methods also include, for example, supervised learning and unsupervised learning.

Figure 13:
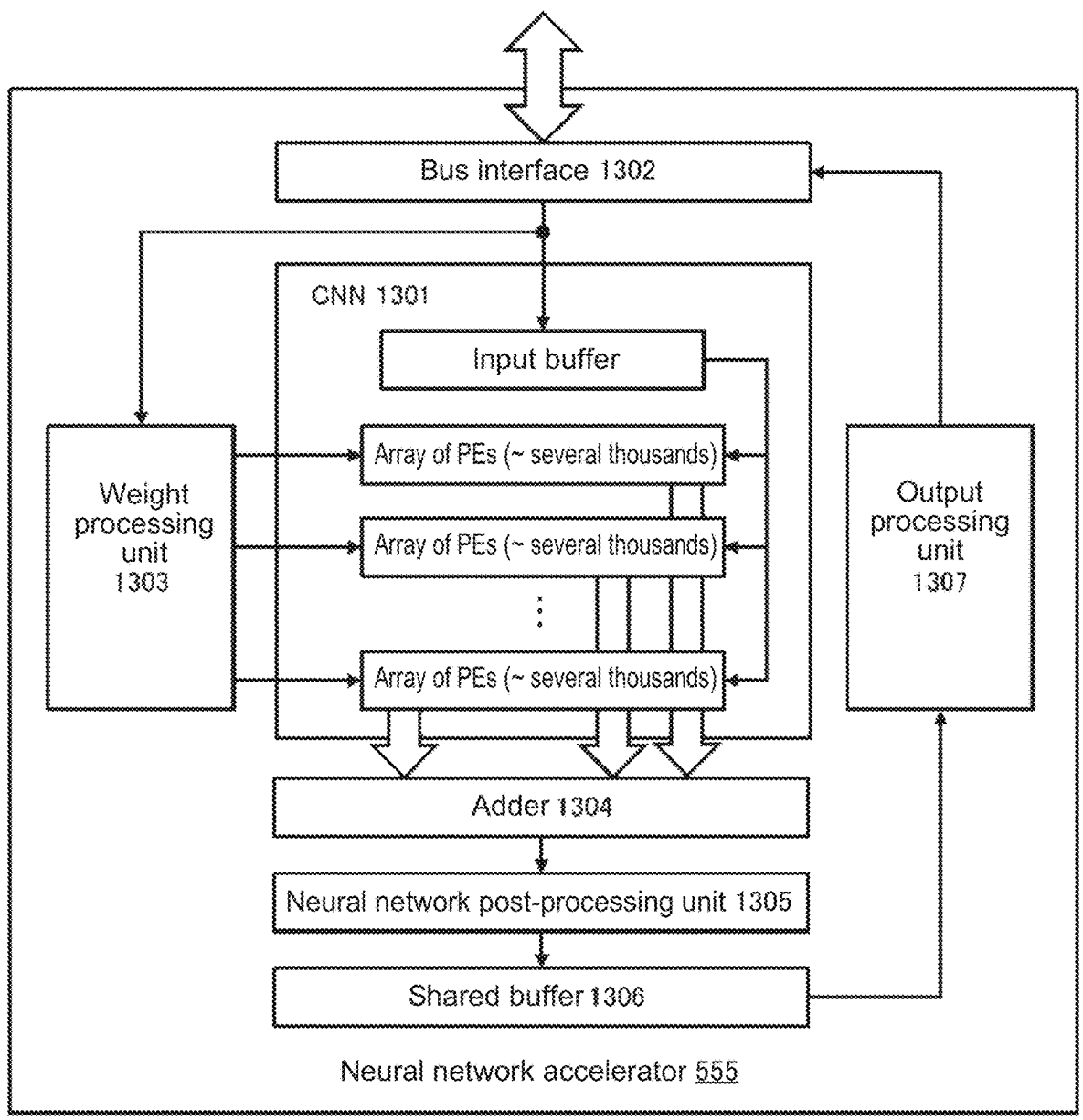
FIG. 13 is a diagram showing a configuration example of a neural network accelerator 555.

FIG. 13 shows a configuration example of the neural network accelerator 555. The neural network accelerator 555 shown in FIG. 13 is a multiprocessor. This multiprocessor includes a large number of (ideally, several hundreds to several thousands of) respective PEs (Processing Elements) that are capable of serving as respective nodes on a convolutional neural network 1301 as a whole. The respective PEs run in parallel to each other in accordance with the programs. Connection relationships between the PEs can be dynamically transformed in response to instructions from an external processor (such as the controller 551). By receiving the processing instructions from the controller 551, modules in the neural network accelerator 555 each start a process via the memory 552.

The sensor information detected via the sensors 510 and the input information about the actions of the listener are input to the neural network accelerator 555 via a bus interface 1302. The input data is temporarily maintained by an input buffer in a CNN 1301, and then distributed to each of the PEs. In accordance with the execution of the programs, the PEs each receive an input vector via the input buffer and receive a weight vector from a weight processing unit 1303. Then, the PEs calculate the CNN on a large scale as a whole, and learns a weight. The weights learnt respectively by the PEs are stored in the memory 552 as a whole and can be utilized for subsequent calculations.

Respective results of the processes by the PEs are added to each other by an adder 1304 such that post-processing calculations such as normalization can be performed by a neural network post-processing unit 1305. With this, the neural network accelerator 555 is adaptable also to a learning phase and an estimation (inference) phase. Results of the process by the neural network post-processing unit 1305 are temporarily maintained in a shared buffer 1306. Then, an output processing unit 1307 outputs the processed data in the shared buffer 1306 to an outside of the neural network accelerator 555 (to controller 551) via the bus interface 1302.

Use of a dedicated module such as the neural network post-processing unit 1305 shown in FIG. 13 allows operations corresponding to learning calculations or estimation (inference) calculations for necessary ones of the neural networks to be implemented at high speed by the programs to be executed by the CPU, such as the personal agent.

The learning in the information processing device 100 is suitable to learning for voice personalization that understands the voices uttered by the listener. The listener may start initial use of the information processing device 100 in a learning mode. Alternatively, the information processing device 100 may be configured to be capable of mode switching to the learning mode via the user interface of the external device (such as smartphone) that cooperates with the information processing device 100.

(E) Acoustic-Space Rendering Function

The acoustic-space rendering refers to a calculation process of making sounds audible by numerical calculations of sound pressure waveforms at ears based on three-dimensional sound field calculations that take into account acoustic characteristics (such as a shape and a reflectance) of acoustics reflectors such as walls, and wave nature of the sounds. The process of the acoustic-space rendering may be executed by dedicated processors such as an SPU (Sound Field Processing Unit) or the GPGPU (or GPU). The acoustic-space rendering that uses these processors having high processing performance allows a process of high-speed acoustic-space rendering such as the sound-image localization described below with the sound sources being moved in the three-dimensional acoustic space to be executed in real time.

When an entire information in processes of calculations, for example, in the space recognition and acoustic-space generation are processed in real time, a scale of the processes can be large. Thus, the information processing device 100 may execute only limited ones of the calculation processes, and the rest of the calculation processes may be executed by the server device (processing device or storage (including memory)) on the Internet, which is connected via wireless or wired communication. As an example of the limited ones of the calculation processes to be executed by the information processing device 100, there may be mentioned processes of calculating effects of movements of sound sources corresponding to objects (such as the walls and a floor) present in an environment in a three-dimensional space in a limited small space (for example, with a depth and a width of approximately 2 m, and a height of approximately 3 m above the ground). Calculation processes on an outside of the limited environment may be executed by the server device on the Internet.

1.3 Configuration Example of Enhancement-Function-Separation-Type Device

Some of the functions provided to the information processing device 100 may be separated as a function enhancement portion from the body of the information processing device 100 in a form of an earpiece or the like, and may be combined with the body portion to constitute a single audible-ability enhancement system. In this case, the main body portion that serves also as the earpiece and the function enhancement portion may include connection terminals for communication of control information and data, and for power supply.

Figure 14:
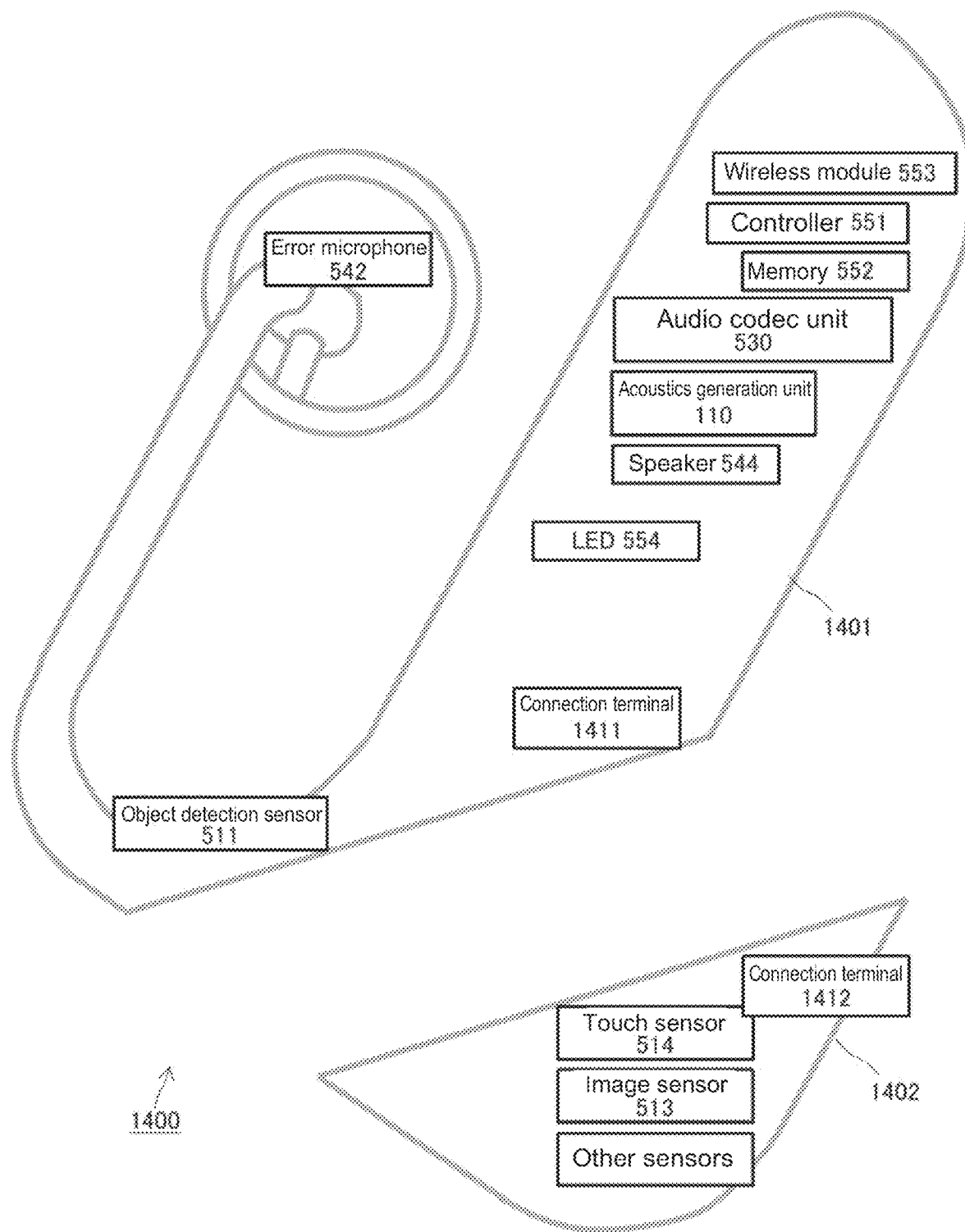
FIG. 14 is a diagram showing a configuration example of an audible-ability enhancement system 1400 including a body portion 1401 and a function enhancement portion 1402 of the information processing device 100 (separated state).
Figure 15:
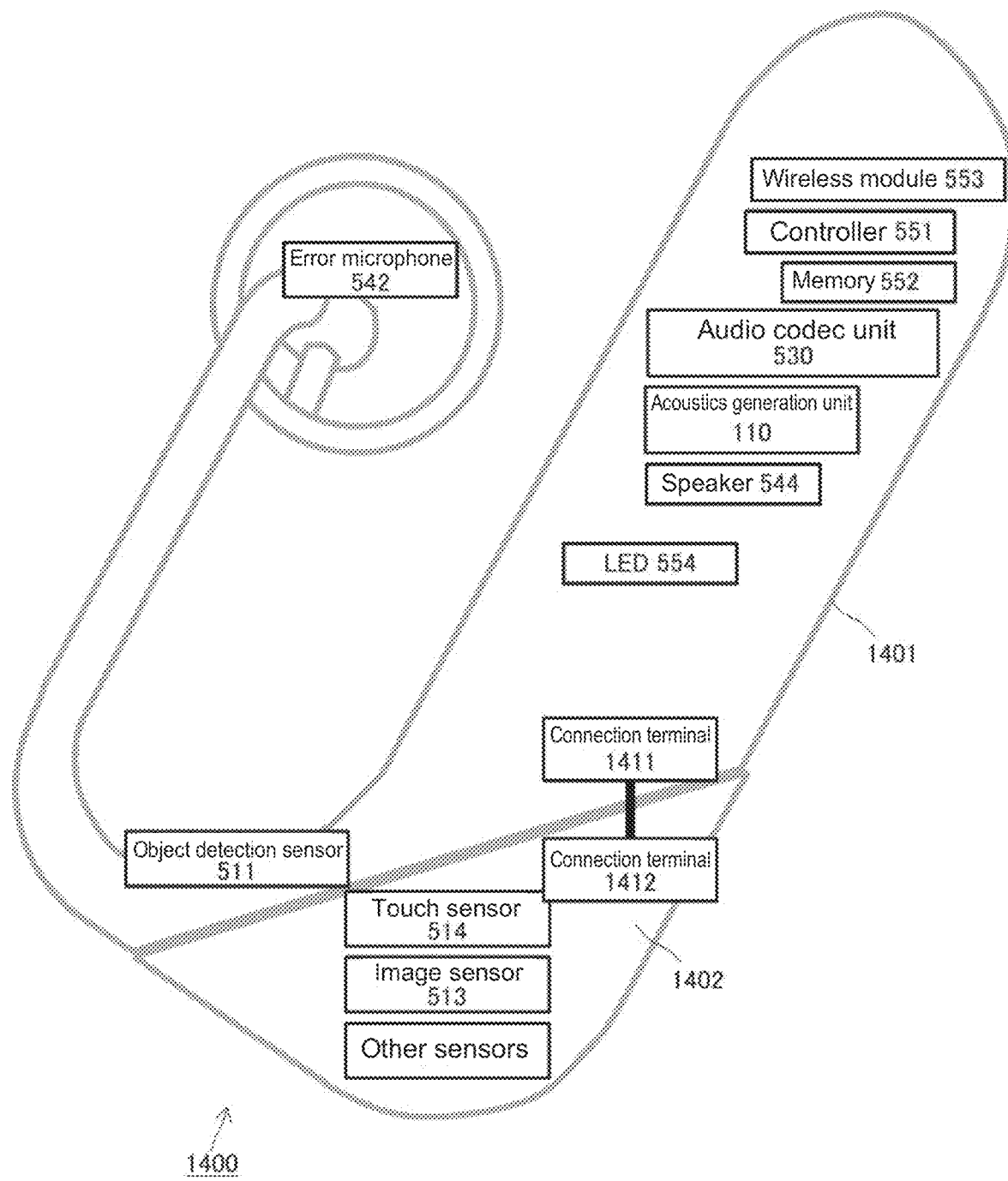
FIG. 15 is a diagram showing the configuration example of the audible-ability enhancement system 1400 including the body portion 1401 and the function enhancement portion 1402 of the information processing device 100 (coupled state).

FIG. 14 and FIG. 15 show a configuration example of an audible-ability enhancement system 1400 including a body portion 1401 and a function enhancement portion 1402 of the information processing device 100. FIG. 14 shows a state in which the body portion 1401 and the function enhancement portion 1402 are separated from each other, and FIG. 15 shows a state in which the body portion 1401 and the function enhancement portion 1402 are coupled to each other. However, arrangement of respective functional modules is not limited to that in the example shown in FIG. 14 and FIG. 15. Many of the functional modules may be arranged in any one of the body portion 1401 and the function enhancement portion 1402, and hence may be conveniently arranged in any one of the body portion 1401 and the function enhancement portion 1402 for design convenience or the like. The LED 554, which is arranged on the body portion 1401 side in the example shown in FIG. 14 and FIG. 15, may be arranged in at least one of the body portion 1401 or the function enhancement portion 1402, and the internal conditions of the information processing device 100 may be indicated, for example, by colors of flashes or patterns of light emission.

The body portion 1401 includes a connection terminal 1411, and the function enhancement portion 1402 includes a connection terminal 1412 that is attachable to and detachable from the connection terminal 1411. The body portion 1401 and the function enhancement portion 1402 are capable of allowing data (including commands) to be exchanged between their respective components, and capable of supplying power via the connection terminals 1411 and 1412. Note that, an embodiment in which similar functions are provided by connecting the connection terminal 1411 and the connection terminal 1412 to each other with a cable or via wireless communication is also assumed.

Although not shown in FIG. 14 or FIG. 15, a battery may be arranged in any of the body portion 1401 and the function enhancement portion 1402. Batteries may be arranged in both the body portion 1401 and the function enhancement portion 1402. In this case, one of the batteries may be used as a main power supply, and another one of the batteries may be used as an auxiliary power supply. In addition, a battery controller (not shown) having a battery control function, such as switching the other one of the batteries to the main power supply when a remaining capacity of the one of the batteries decreases, may be additionally provided.

Figure 16:
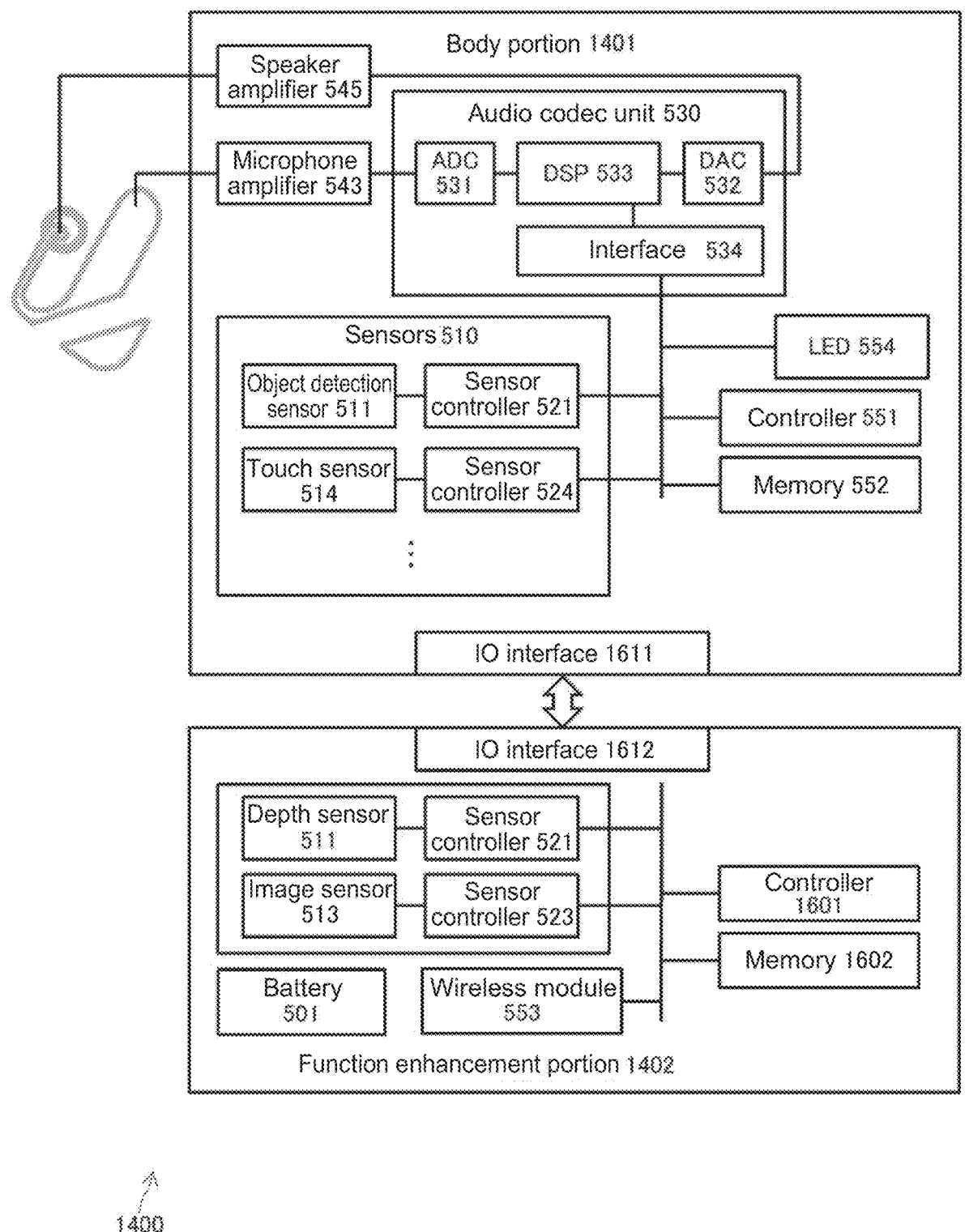
FIG. 16 is a diagram showing a functional configuration example of the audible-ability enhancement system 1400 including the body portion 1401 and the function enhancement portion 1402 of the information processing device 100.

FIG. 16 shows a functional configuration example of the audible-ability enhancement system 1400 including the body portion 1401 and the function enhancement portion 1402 of the information processing device 100. The body portion 1401 and the function enhancement portion 1402 are connected to each other via their respective IC (input/output) interfaces 1611 and 1612. The body portion 1401 and the function enhancement portion 1402 are capable of allowing the data (including commands) to be exchanged between their respective components, and capable of supplying power via the IC interfaces 1611 and 1612.

In the configuration example shown in FIG. 16, the battery 501 and the wireless module 553 are arranged on the function enhancement portion 1402 side. In addition, in the configuration example shown in FIG. 16, of the sensors 510, the object detection sensor 511 and the touch sensor 514 are arranged in the body portion 1401, and the depth sensor 512 and the image sensor 513 are arranged on the function enhancement portion 1402 side. Note that, various combinations as to in which of the body portion 1401 and the function enhancement portion 1402 each of the sensor elements being ones of the sensors 510 is installed are conceivable. (As a matter of course, all the sensor elements may be installed on the function enhancement portion 1402 side.) Further, in addition to the controller 551 and the memory 552 on the body portion 1401 side, a controller 1601 and a memory 1602 are arranged also on the function enhancement portion 1402 side. By reading out programs from the memory 1602 and executing these programs, the controller 1601 comprehensively controls, for example, the processes on the function enhancement portion 1402 side, and processes of the communication with the body portion 1401.

A shape of the function enhancement portion 1402 is not limited to a shape as shown in FIG. 14 and FIG. 15, which is formed by dividing a part of the housing of the information processing device 100 in the form of the earpiece. For example, some of or all the function modules constituting the function enhancement portion 1402 may be arranged in a housing of the external device such as the smartphone, the smartwatch, eyewear, a neckband, shoulder wear, a device suspended from the neck, or a wearable device of, for example, a vest type, or in a housing of an external device in a form of a ring or a cane, the external devices being provided with the AR functions. In addition, an external device as the function enhancement portion 1402 may be provided with functions such as a function selection, the mode selection, and the volume control of the information processing device 100.

When the smartphone, the eyewear, or the like provided with a display is used as the function enhancement portion 1401, and when information can be provided from the body portion 1401 to the function enhancement portion 1401 in the information device 100, information about objects, and information about an environment, which are recognized by the body portion 1401, may be displayed on the display of the function enhancement portion 1401.

1.4 Audible-Ability-Enhancement Space-Recognition Function

A space enhancement function of the information processing device 100 according to this embodiment is provided to the listener by mapping, into the three-dimensional acoustic space, the information about the environment recognized through analysis of the sensor information from the sensors 510 including the various sensor elements, and by expressing acoustic data and sound data in this three-dimensional acoustic space. In order to perform the sound-image localization as a basic voice-service function for the audible-ability enhancement, the information processing device 100 maintains an HRTF database in the memory 552, and sets an appropriate one of the HRTFs stored in the HRTF database as filtering characteristics of the DSP 533 via the controller on the outside of the audio codec unit 530. In this way, the sound-image localization is enabled. By performing sound-image position control via the controller 551, a predetermined sound source can be set to an arbitrary position in a predetermined acoustic space for the listener. In this way, the sound-image localization can be performed.

Figure 17:
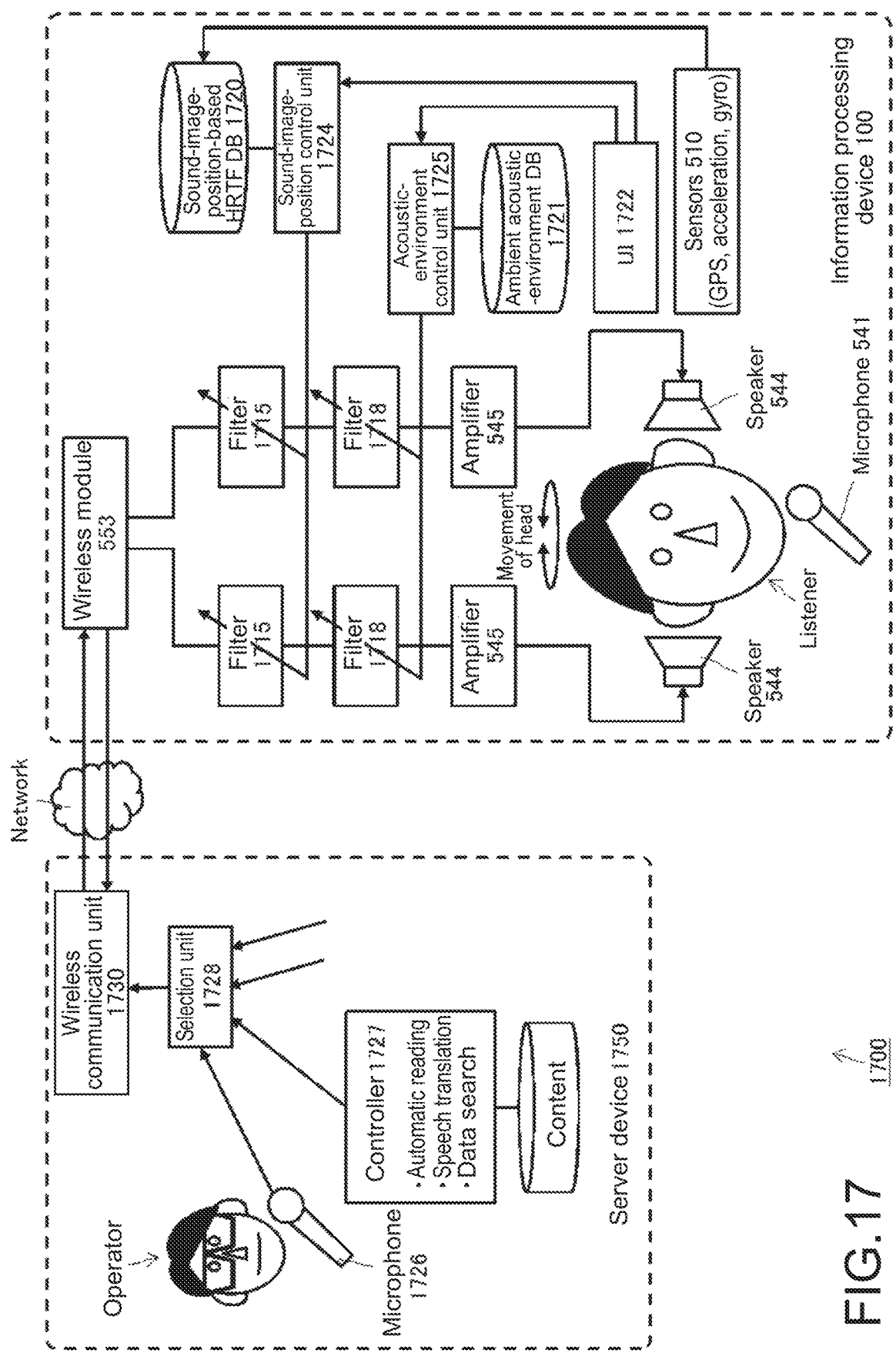
FIG. 17 is a diagram showing an example of a system that performs sound-image localization with use of HRTFs.

FIG. 17 shows an example of a system 1700 that performs the sound-image localization with use of the HRTFs. How the sound-image localization is performed in this system 1700 is described.

Convolution of the HRTF is performed by filters 1715. By convolving characteristics of transfer from a position of a sound source (not shown) to the ear of the listener with the filters 1715, the sound-image localization to the arbitrary position can be performed. A sound presented to the listener from the speakers 544 of the information processing device 100 sounds on an inside of the head of the listener when the HRTF is not convolved. However, by convolving the HRTF, this sound sounds on an outside of the head of the listener as a virtual sound. Thus, the virtual sound (including voice) presented from the speakers 544 of the information processing device 100 sounds as an out-of-head sound together with an ambient sound. This allows the listener to hear the ambient sound and the virtual sound without feeling a sense of discomfort. Note that, FIR (Finite Impulse Response) filters may be used as the filters 1715 for the HRTF. In addition, the sound-image localization can be performed also with filters approximated by a calculation on a frequency axis or a combination of IIR (Infinite Impulse Response).

The convolution of the sound of the sound source with the filters 1715 for the HRTF allows the listener to recognize a sense of direction of the sound source and a certain distance to the sound source, thereby localizing a sound image. In the system 1700 shown in FIG. 17, in order to adapt the sound source as the sound image to an ambient environment at the time of reproduction, an acoustic-environment transfer function is additionally convoluted by filters 1718. The acoustic-environment transfer function mainly contains information about a reflected sound and reverberation. Ideally, on an assumption of a real reproduction environment, or on an assumption of an environment close to the real reproduction environment, it is desirable to use, for example, a transfer function (impulse response) between appropriate two points (for example, between two points of a position of a virtual speaker and a position of the ear).

Filter coefficients for the filters 1715 corresponding to positions of the sound-image localization are stored in a sound-image-position-based HRTF database 1720. In addition, filter coefficients for the filters 1718 corresponding to types of acoustic environments are stored in an ambient acoustic-environment database 1721. The listener can select the position of the sound-image localization and the type of the acoustic environment via, for example, a user interface (UI) 1722. As examples of the user interface 1722, there may be mentioned mechanical controllers such as switches provided to the body of the information processing device 100, and a display (touchscreen) of the external device (such as smartphone) that cooperates with the acoustics output device 100. Alternatively, the position of the sound-image localization and the type of acoustic environment may be selected by voice input via the microphone 541.

A sound-image-position control unit 1724 controls a position of the sound image of the sound source to be output from the speakers 544. At this time, the sound-imageposition control unit 1724 selects an optimum one of the filter coefficients from the sound-image-position-based HRTF database 1720 in response, for example, to an operation to the user interface 1722 by the listener, and sets the optimum filter coefficient as that for the filters 1715. In addition, an acoustic-environment control unit 1725 controls acoustics of the sound of the sound source to be output from the speaker 544. At this time, the acoustic-environment control unit 1725 selects an optimum one of the filter coefficients, which is optimum to a desired acoustic environment, from the ambient acoustic-environment database 1721 in response, for example, to the operation to the user interface 1722 by the listener, and sets the optimum filter coefficient as that for the filters 1718.

For example, to which position the sound-image localization of the sound source is to be performed may be different depending on a difference in individual listening sensation or depending on in which situation the sound source is used. Thus, the listener is allowed to operate and select the position of the sound-image localization via the user interface 1722. In this way, the system 1700 to be established can provide high convenience to the listener. In addition, it has been known that the HRTFs vary among individuals, specifically, among shapes of ears of the individuals. Thus, HRTFs corresponding to a plurality of ear shapes may be stored in the sound-image-position-based HRTF database 1720 such that the listener can select an optimum one of the HRTFs in accordance with the individual difference. Alternatively, individual HRTFs measured individually for respective listeners may be stored in the sound-image-position-based HRTF database 1720 such that the listeners can each select a sound-image-position-based HRTF dedicated for himself/herself.

Also with regard to the acoustic environments, the listener is allowed to select an optimum (or desired) acoustic environment via the user interface 1722. With this, the sound of the sound source, which is output from the speaker 544, can be set to that in a desired acoustic environment. For example, the listener is allowed to hear the sound of the sound source from the speaker 544 in an acoustic environment such as a concert hall or a movie theater.

In addition, processes of fixing the sound-image position with respect to a real space in conjunction with movements of the head of the listener may be executed. In the configuration of the system 1700 shown in FIG. 17, the movements of the head of the listener are detected by the GPS, the acceleration sensor, the gyro sensor, and the like being ones of the sensors 510, and the sound-image-position control unit 1724 automatically selects optimum ones of the filters from the sound-image-position-based HRTF database 1720 in accordance with the movements of the head, and updates the filter coefficient for the filters 1715. Note that, it is desirable that, after the listener has specified, via the user interface 1722, a position to which the listener wants to localize the sound image of the sound of the sound source, the position of the sound-image localization be varied in a manner of following the movements of the head. With this, for example, even when the orientation of the head of the listener has varied, the HRTF can be controlled such that the position of the sound image is stabilized in the space.

Note that, the sound-image-position control unit 1724 and the acoustic-environment control unit 1725 may each be a software module to be implemented by programs to run on the controller 551, or may each be a dedicated hardware module. In addition, the sound-image-position-based HRTF database 1720 and the ambient acoustic-environment database 1721 may be stored in the memory 552, or may be an external database accessible via the wireless module 553.

The sound of the sound source, which is presented by the information processing device 100, may be supplied from the outside via wireless systems such as Bluetooth (trademark), Wi-Fi (registered trademark), or mobile communication standards (such as LTE (Long Term Evolution), LTE-Advanced, 5G, and the like). As examples of the sound of the sound source, there may be mentioned, for example, a sound of music (including voice), a voice of a voice response to be automatically generated or reproduced by a server device 1750 on the network such as the Internet (or cloud) with use of a function of the artificial intelligence, and a voice obtained by collecting voices of an operator (or an instructor, a voice actor/actress, a coach, or the like) with a microphone 1726 via wireless network connection. (Voice obtained by collecting the voices with the microphone 1726 includes reproduced ones of voice information that has been collected and recorded in advance.) More specifically, examples of the voice to be generated or reproduced by the server device 1750 include voices of automatic content reading, speech translation, and data search (including information search and guidance based on map information by a controller 1727 of the server device 1750. Any of these voices of is selected by switching via a selection unit 1728 and is transmitted from a wireless communication unit 1730 on the server device 1750 side to the wireless module 553 of the information processing device 100. Then, the voice received by the wireless module 553 is transmitted to the filters 1715. Next, as described above, after executing the processes for localizing the sound image to the optimum position (or position that the listener desires), and for adapting the sound source as the sound image to the ambient environment at the time of reproduction, the selected voice is output from the speaker 544.

When the system 1700 shown in FIG. 17 is applied, for example, to a system for offering advice to a pedestrian, a visually impaired person, an athlete, a driver of, for example, an automobile, or a speaker giving a speech, the pedestrian, for example, is allowed to walk safely because he/she can sufficiently hear the ambient sounds even while listening to the advice. In addition, voices of the advice are not generated in public places with respect to a large number of general public as generated by smart speakers. This allows the persons as mentioned above to listen to personal advice of their own with their privacy protected. In addition, the system 1700 shown in FIG. 17 is capable of also automatically responding to inquiries from other persons on behalf of the listener himself/herself with use of the function of the artificial intelligence described below of the personal agent.

Figure 18:
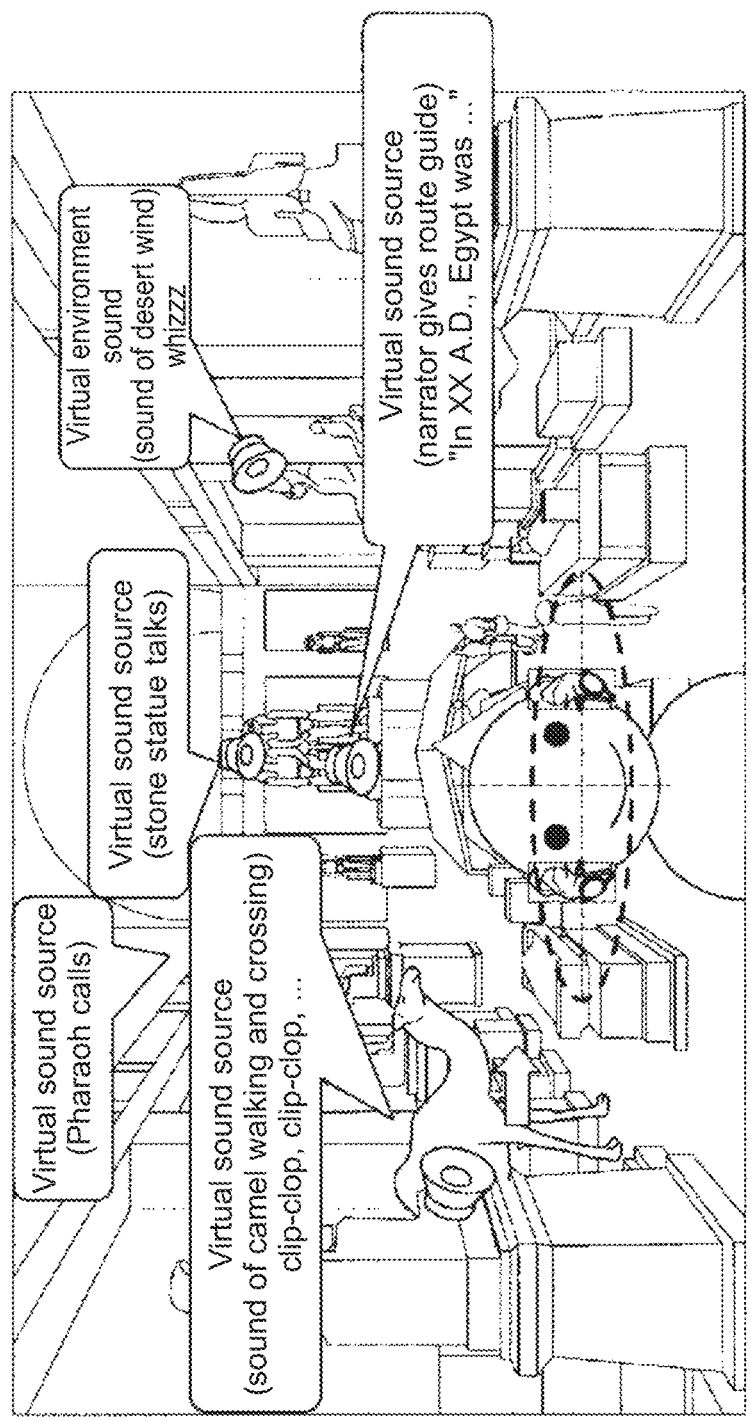
FIG. 18 is a view exemplifying how simultaneous reproduction from a plurality of objects as sound sources is performed by applying a system 1700 shown in FIG. 17.

The system 1700 shown in FIG. 17 is widely applicable to perform simultaneous reproduction from a plurality of objects as sound sources. FIG. 18 illustrates an operation example of an exhibit guide system that presents a plurality of virtual sound sources in a museum by utilizing the system 1700 shown in FIG. 17. The information processing device 100 analyzes the sensor information detected by the GPS, the acceleration sensor, and the gyroscopic sensor being ones of the sensors 510, and then acquires a voice information from the server device 1750. The server device 1750 automatically reads out, on the basis of, for example, a position information acquired by the GPS, the content such as voices from objects as the sound sources, specifically, from respective exhibits in an exhibition room where the listener is currently located, ("sound of desert wind," "Pharaoh's shout," "sound of a camel walking and crossing," and "route guidance by a narrator"), and reads out a guide information such as an announcement in the museum. Then, the server device 1750 transmits the content to the information processing device 100. Next, when the listener stands in front of the exhibit such as the stone statue, the sound-image-position control unit 1724 causes a position of a sound image of the sound source to match a corresponding one of the exhibits, and to interlock with the movement of the head of the listener. In addition, the acoustic-environment control unit 1725 sets an acoustic environment of the exhibition room so as to present virtual sounds such as the "sound of desert wind," the "Pharaoh's shout," the "sound of a camel walking and crossing," and the "route guidance by a narrator" to the listener.

When this system 1700 is applied to a plurality of visitors in the same exhibition hall, the visitors each simultaneously experience the virtual sounds localized to the same sound-image positions. This allows a plurality of persons to share presence of the virtual sound images, and to enjoy fusion of a real world and the virtual sound sources. As a matter of course, the visitors each hear only the virtual sounds presented from their respective information processing devices 100. Thus, the information processing devices 100 can each perform reproduction in a language in accordance with a corresponding one of the listeners wearing the devices. Therefore, it is needless to say that, unlike a case where voices are simultaneously emitted from speakers installed in the hall, visitors who speak languages different from each other can have fun independently of each other.

1.5 Distinguishment of Virtual Sound Sources

The sound sources of the virtual sounds (including voices) can be reproduced with their sound images localized in the three-dimensional acoustic space on the basis of the HRTFs. The information processing device 100 according to this embodiment allows the listener to listen to the artificial sounds while listening to the real ambient sound via the open ear style earpiece. However, at this time, the listener cannot distinguish to which of the real ambient sound and the virtual sound he/she is listening, which may inconvenience the listener.

Elaborate setting of the parameters for subjecting the virtual sound sources to the localization allows the listener to distinguish the ambient sound and the virtual sound from each other. The information about the virtual sound sources are registered with a database in the memory 552 in association with virtual sound IDs. As the virtual sound sources, sound sources recorded as PCM sound sources may be registered. In this case, even when sizes of the PCM sound sources are small, if the sound sources have ever been reproduced once and remain in a cache memory, reproduction processes can be executed at high speed only by specifying the IDs. In addition, sounds to be frequently reproduced may be stored in the cache memory on the basis of statistical information.

The database relating to the virtual sound sources may be stored in the memory 552 in the information processing device 100, or may be stored in virtual storage devices, specifically, a memory and a storage such as an HDD (Hard Disc Drive), which are accessible by the server device on the network such as the Internet (or cloud).

When the virtual sounds are localized in the three-dimensional space by the information processing device 100, first, the virtual sounds are localized in the head of the listener wearing the device 100, and then the virtual sounds are moved and localized to (caused to possess) target objects. Such a method of presenting the virtual sounds allows the listener to recognize that the sounds are not real sounds but sounds of the virtual sound sources. In addition, the virtual sounds may be generated by changing, for example, their frequency characteristics to characteristics that are distinguishable from characteristics of sounds to reach the eardrum through the opening portion of the open ear style earpiece of the information processing device 100, and then by executing signal processes.

Similarly, by causing sound sources that do not exist in the real world or are significantly rare even if existing to move in the three-dimensional acoustic space, the listener is allowed to recognize that these sounds are the sounds of the virtual sound sources. Some examples regarding the movements of the sound sources of the virtual sounds are listed below.

Localize the sound images while moving the sound sources in a manner of approaching the listener rapidly from a distance.

Localize the sound images in a manner that the sound sources appear from walls to be reproduced in the three-dimensional acoustic space.

Localize the sound images in a manner that the sound source appears from under a floor to be reproduced in the three-dimensional acoustic space.

Localize the sound images in a manner that the sound sources descend in a direction from the sky (ceiling) to be reproduced in the three-dimensional acoustic space.

Localize the sound images in a manner that the sound images move helically in the three-dimensional acoustic space.

Localize the sound images while the sound images bounce like balls in the three-dimensional acoustic space.

Localize the sound images in the three-dimensional acoustic space in a manner that the sound images extend from a part or a region of the body of the listener, such as his/her fingertip or his/her toe, or converge on the fingertip or the toe.

In the three-dimensional acoustic space, by varying the parameters for subjecting the virtual sound sources to the localization (such as types of the objects to which the virtual sound sources are subjected to the localization, start points and end points, travelling trajectories, travelling speeds, and the like for the virtual sounds to travel), various impressions can be given to the listener, which can be utilized, for example, also for generating messages or guiding the listener, or for assisting the actions of the listener. Now, some specific examples in which the listener is intentionally given impressions in accordance with the parameters for subjecting the virtual sound sources to the localization are described.

(A) Possession of Object (1)

Figure 20:
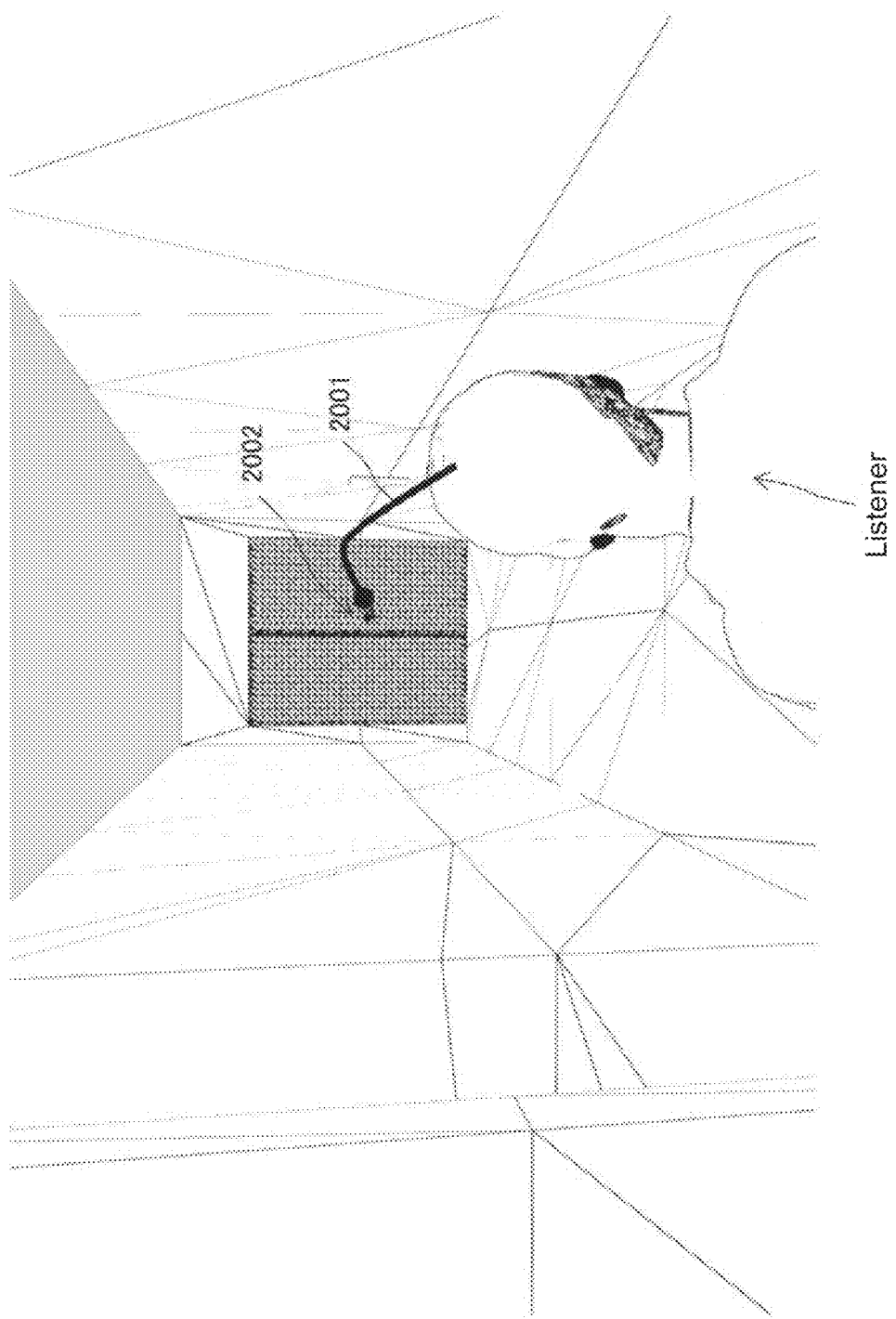
FIG. 20 is a view illustrating how a sound image is moved and localized in a three-dimensional acoustic space.

A sound with a sound image localized in the head moves away from the head toward a target object (door knob) so as to be subjected to the localization thereat. FIG. 20 illustrates how the sound with a sound image localized in the head of the listener moves away from the head toward a door knob 2002 in a three-dimensional acoustic space based on the result of the detection by the depth sensor 512. In FIG. 20, a trajectory along which a virtual sound source moves is denoted by a reference numeral 2001. As can be understood from FIG. 20, an impression that the sound gradually possesses the object can be given to the listener. A real object having a physical body cannot make such a movement, and hence the listener can recognize that the sound source moving along the trajectory 2001 is a virtual sound source.

(B) Possession of Object (2)

Figure 21:
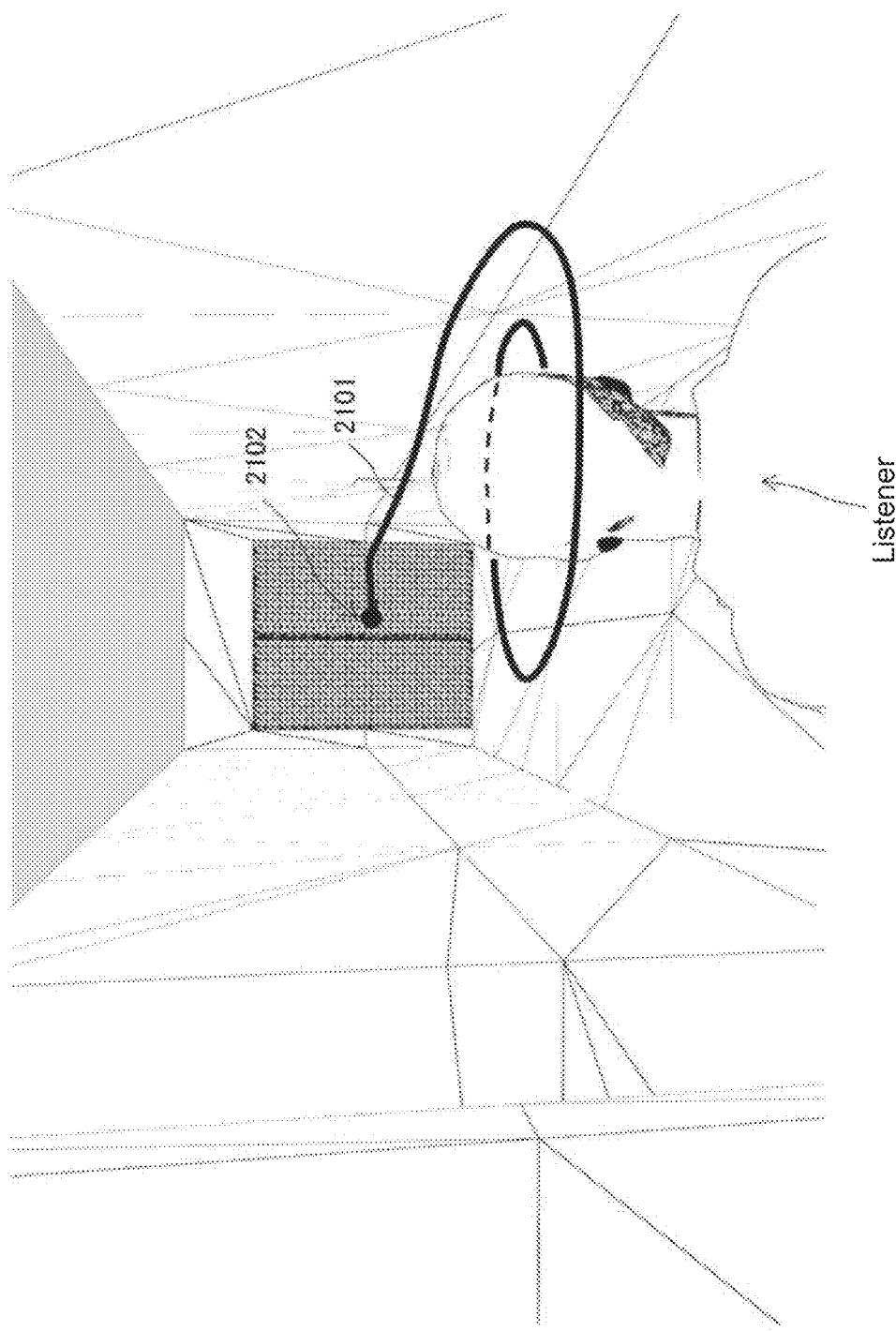
FIG. 21 is a view illustrating how another sound image is moved and localized in the three-dimensional acoustic space.

Similar to (A) described above, (B) is another example in which the virtual sound source possesses a specific object. However, as illustrated in FIG. 21, the virtual sound source does not head toward a door knob 2102 from the inside of the head of the listener, but turns around the body of the listener as indicated by a moving trajectory denoted by a reference numeral 2101, and then its sound image is localized in a manner of sticking to the door knob 2102. Note that, although the virtual sound source is turned only once around the body in the example illustrated in FIG. 21, the sound image may be turned a plurality of times or changed in turning radius such that a still another impression can be given to the listener.

(C) Approach from Above

Figure 22:
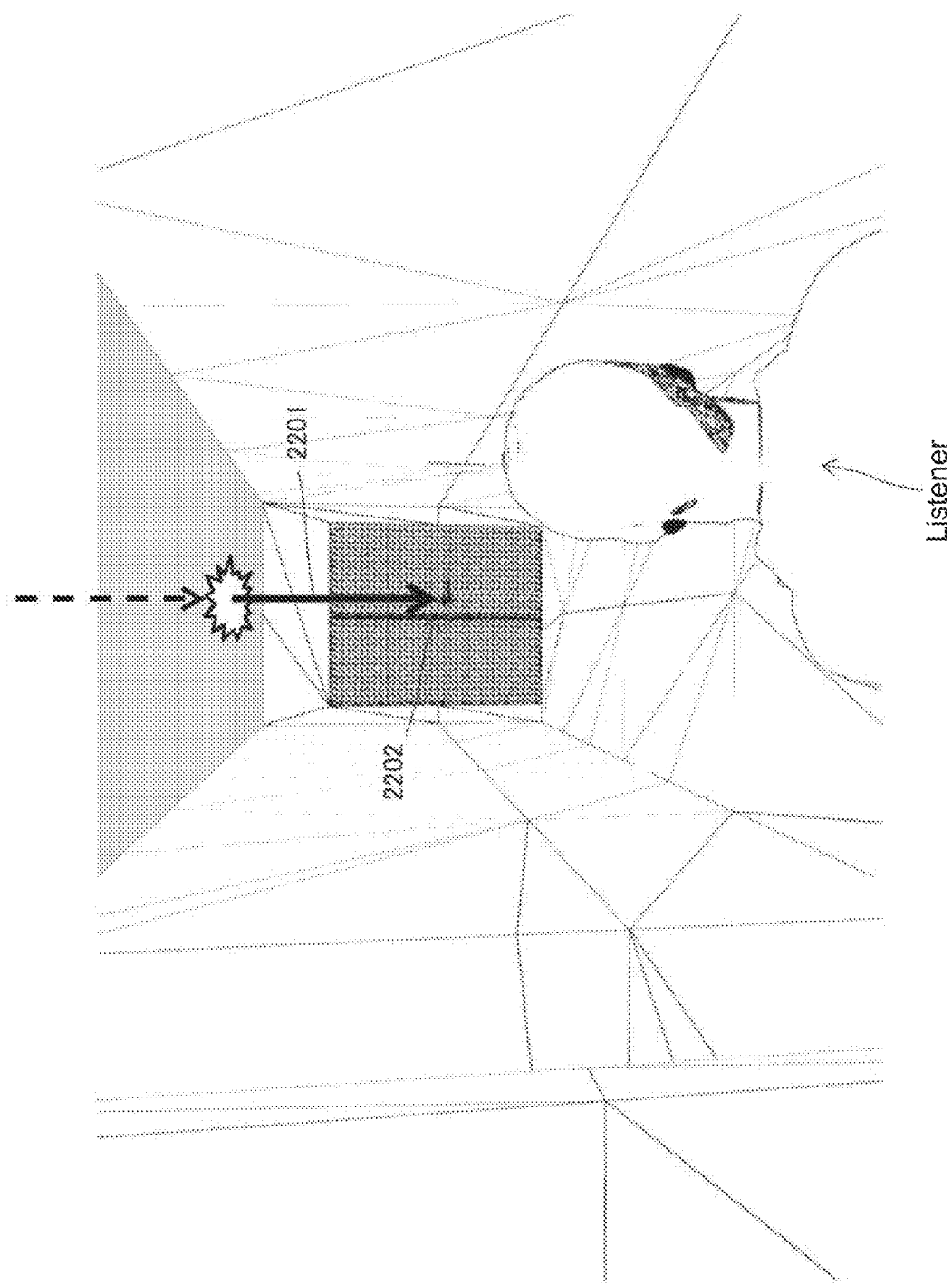
FIG. 22 is a view illustrating how a still another sound image is moved and localized in the three-dimensional acoustic space.

FIG. 22 illustrates an example in which the virtual sound source descends from the ceiling (sky) in the three-dimensional acoustic space based on the result of the detection by the depth sensor 512. The virtual sound source penetrates the ceiling of a room where the listener is located, and then descends along a trajectory denoted by a reference numeral 2201 to reach a door knob 2202. A real object having a physical body scarcely makes such a movement, and hence the listener can recognize that the sound source moving along the trajectory denoted by the reference numeral 2201 is a virtual sound source. In addition, at the time when the virtual sound source appears by penetrating the ceiling, volume of the virtual sound source may be changed (increased or decreased), or acoustic effects such as a sound of penetrating the ceiling may be generated such that the listener can further strongly recognize that the sound is not a real sound but a virtual sound.

(D) Possession of Object from Wall or Floor

Figure 23:
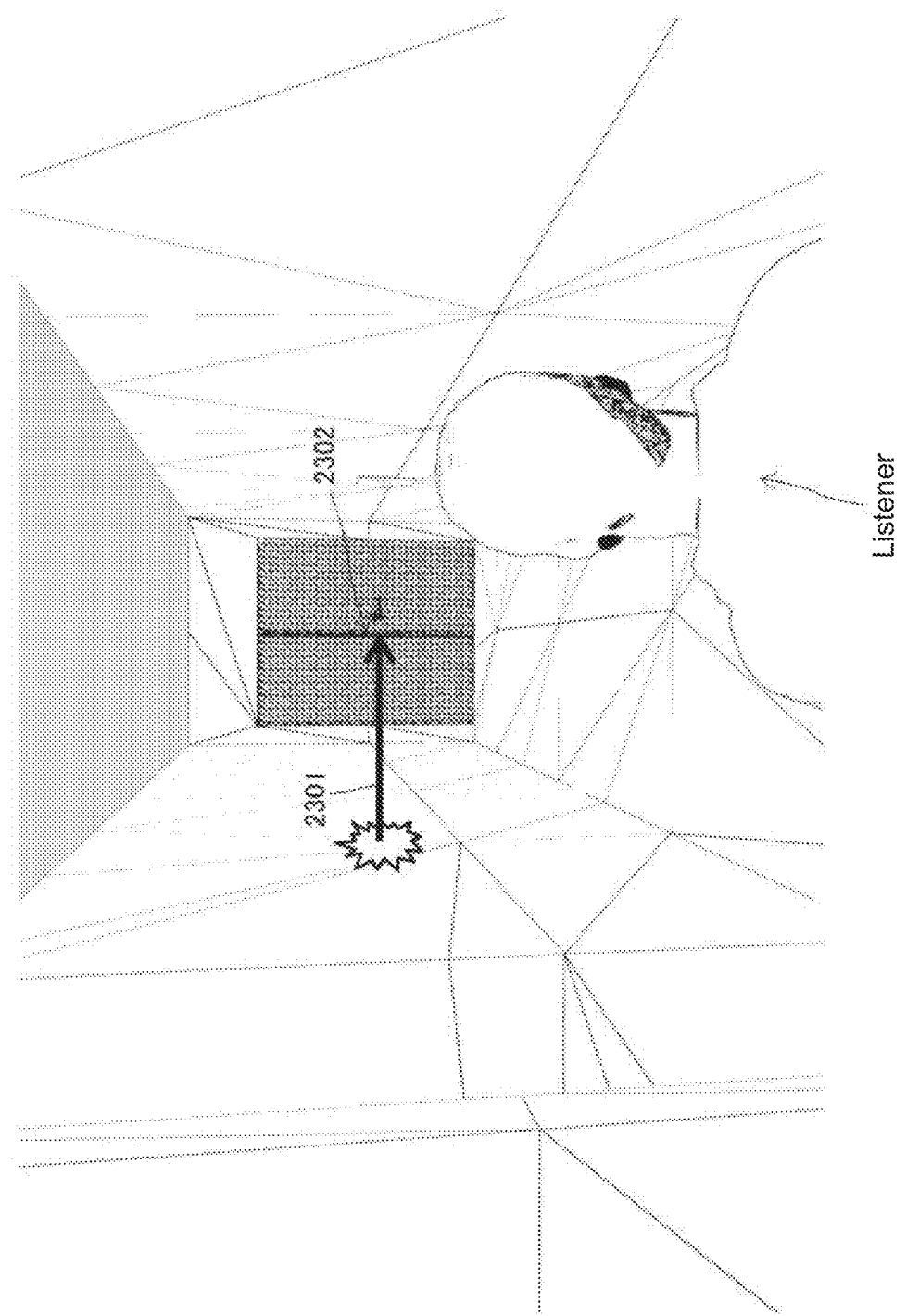
FIG. 23 is a view illustrating how a yet another sound image is moved and localized in the three-dimensional acoustic space.

FIG. 23 illustrates an example in which, in the three-dimensional acoustic space based on the result of the detection by the depth sensor 512, the virtual sound source springs out of a wall to possess a door knob 2302, and then its sound image is localized. The virtual sound source springs out of the wall of a room where the listener is located, and then advances along a trajectory denoted by a reference numeral 2301 to reach the door knob 2302. Note that, the virtual sound source need not necessarily spring out of the wall, and may spring out of a floor. A real object having a physical body scarcely makes such a movement, and hence the listener can recognize that the sound source moving along the trajectory denoted by the reference numeral 2301 is a virtual sound source. In addition, at the time when the virtual sound source springs out of the wall, acoustic effects may be generated such that the listener can further strongly recognize that the sound is not a real sound but a virtual sound.

(E) Bouncing Ball

Figure 24:
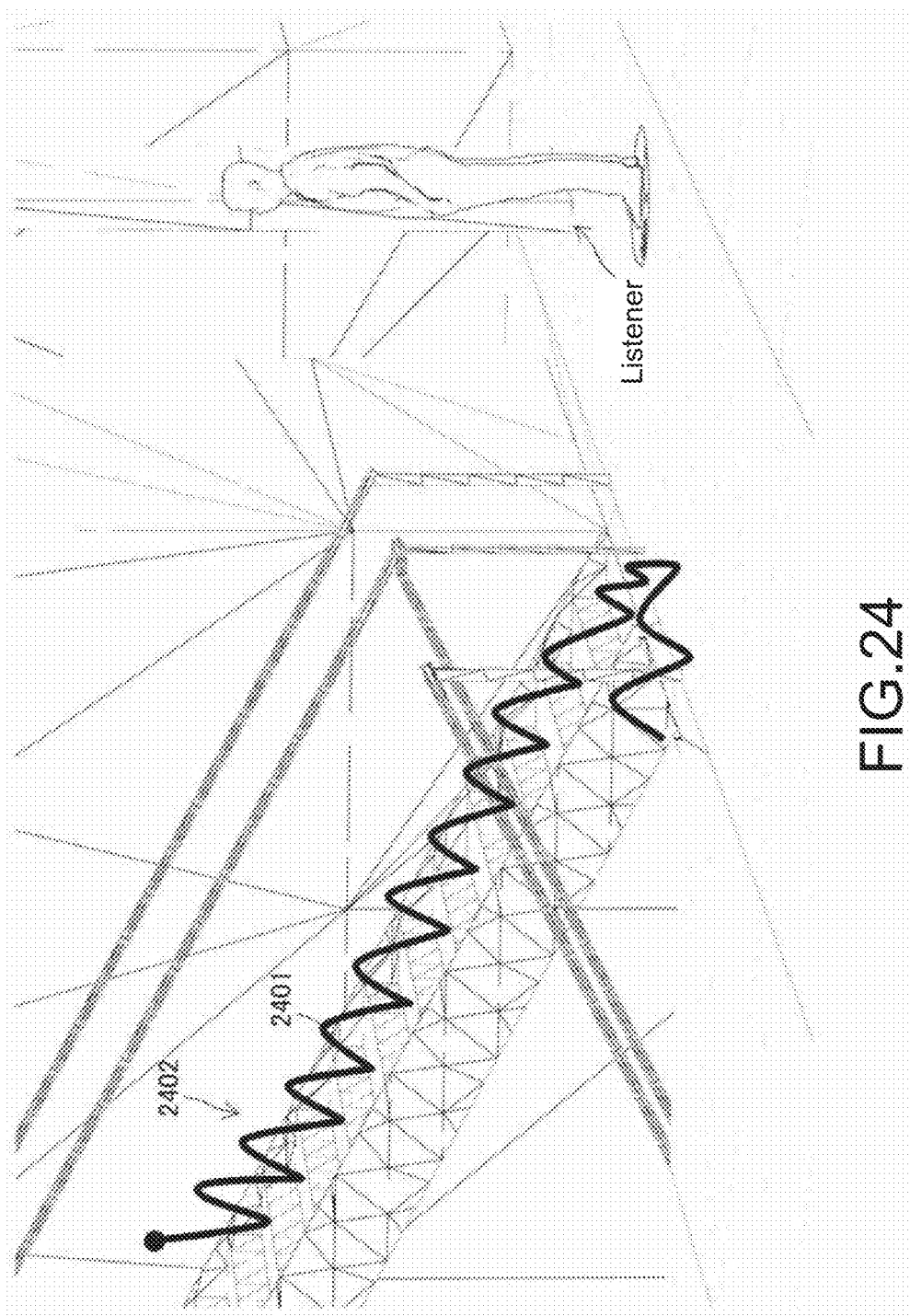
FIG. 24 is a view illustrating how a yet another sound image is moved and localized in another three-dimensional acoustic space.

FIG. 24 illustrates an example in which the sound image of the virtual sound source is localized while the virtual sound source bounces and moves like a ball in another three-dimensional acoustic space based on the result of the detection by the depth sensor 512. In the example illustrated in FIG. 24, the virtual sound source goes down while bouncing on each step of stairs 2402 as indicated by a trajectory denoted by a reference numeral 2401. By a physical operation (simulation) on the movement of the virtual sound source with use of the function of the GPU (or GPGPU), the acoustic-space rendering indicating how the virtual sound source is heard in the three-dimensional acoustic space can be performed. The virtual sound source may always emit sounds, or may emit sounds at a regular interval each time coming into contact with the ground. The virtual sound source varies in height and distance each time bouncing on each of the steps. This allows the listener to imagine that the virtual sound source is going down a road surface having steps or a height difference. In addition, objects in the real world can scarcely move so freely, and hence the listener can recognize that the sound source moving along the trajectory denoted by the reference numeral 2401 is a virtual sound source.

(F) Sound-Image Localization with Respect to Handrails

Handrails implement an important function especially when a visually impaired person goes up and down stairs. Thus, it is important to make it easy to recognize positions of the handrails. The handrails exist continuously along the stairs, and hence the listener needs to be enabled to continuously and consciously distinguish a virtual sound source from real sounds.

Figure 25:
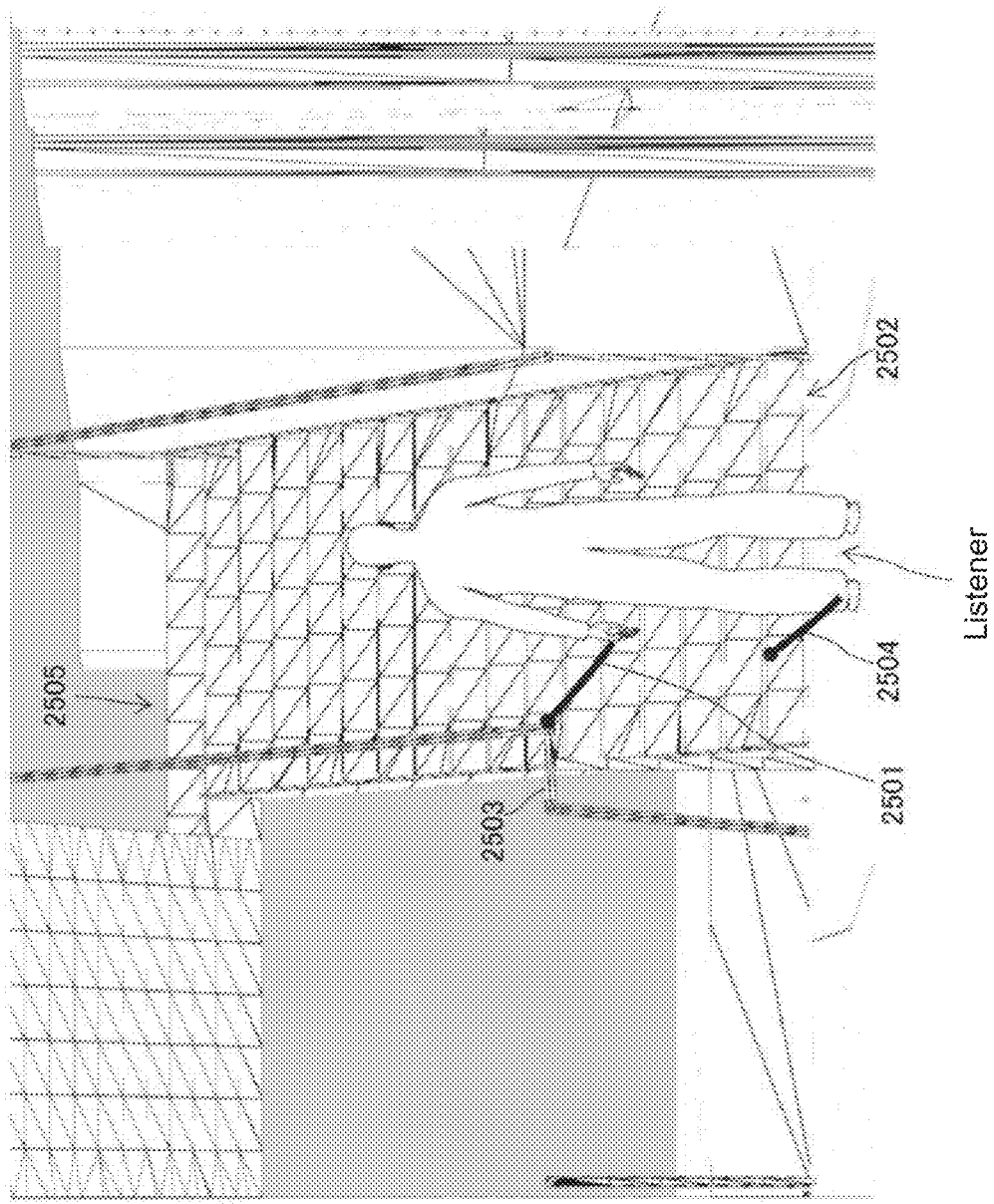
FIG. 25 is a view illustrating how yet other sound images are moved and localized in the other three-dimensional acoustic space.

FIG. 25 illustrates how the information processing device 100 recognizes that the listener has approached stairs 2502, and subjects a virtual sound source to the localization to a handrail 2503 in the other three-dimensional acoustic space based on the result of the detection by the depth sensor 512. In the example illustrated in FIG. 25, the sound image of the virtual sound source, which has been localized to the left hand of the listener who is supposed to grasp the handrail, moves away from the left hand toward the handrail 2503 along a trajectory denoted by a reference numeral 2501. The sound source notifying that the virtual sound has reached (has possessed) the handrail 2503 may generate a simple ping. However, in order that the listener easily understands (or is warned) that the localization has been completed, it is desirable that the sound include a high sound range around 1 kHz to 10 kHz, or be a noise.

When the information processing device 100 recognizes that the listener has approached the stairs 2502 on the basis of, for example, a distance and a posture of his/her body, which are sufficient for making a determination that the listener goes up the stairs 2502, the information processing device 100 localizes a sound image of another virtual sound source also to the handrail 2503. Then, the sound image of the other virtual sound source, which has been localized to a foot of the listener (left foot), moves away from the toe, and is localized to a first step of the stairs 2502 along a trajectory denoted by a reference numeral 2504. Once the listener steps onto the first step of the stairs 2502, the sound source may be discarded.

In addition, when the listener who continues to go up the stairs 2502 reaches a landing 2505, the other sound image of the other virtual sound source, which has been localized to the foot of the listener may be moved away from the toe, and then may be localized while being moved in a direction to a wall. In such a way, the listener may be guided to another flight side of the stairs.

(G) Sound-Image Localization to Escalator

When the information processing device 100 recognizes that the listener has approached an escalator in the three-dimensional acoustic space based on the result of the detection by the depth sensor 512, the information processing device 100 moves the sound image of the virtual sound source, which has been localized to the foot of the listener, away from the toe, and then localizes the sound image while moving the same in a direction to an entrance step of the escalator. Next, when the listener has approached a predetermined position, the information processing device 100 fixes the virtual sound source to the entrance of the escalator (first step), thereby localizing the sound image. In such a way, the listener is allowed to easily take the escalator while being guided by the moving virtual sound source (that is, while moving his/her toes in a direction to the virtual sound source). In addition, by moving the sound image of the virtual sound source, which has been localized to the hand of the listener, away from the hand toward a handrail, the listener is allowed to easily grip the handrail of the escalator while being guided by the moving virtual sound source (that is, while moving his/her hand in the direction to the virtual sound source).

After that, near an exit of the escalator, the handrail becomes less tilted and more horizontal, and a height difference between the steps decreases. Thus, the listener can recognize that he/she has approached the exit of the escalator. In addition, near the exit of the escalator, instructions about what the listener should do after getting off the escalator can be issued by moving the sound image of the virtual sound source, which has been fixed to a step of the escalator (or foot of the listener), away from the step or the toe, and then localizing the sound image while moving the same toward the exit of the escalator, or by releasing forward and fixing the sound image of the virtual sound source, which has been fixed to the handrail.

(H) Sound-Image Localization to Elevator

When the information processing device 100 recognizes that the listener has entered an elevator lobby in the three-dimensional acoustic space based on the result of the detection by the depth sensor 512, the information processing device 100 subjects the virtual sound source to the localization near doors of the elevator. When the elevator ascends, the information processing device 100 presents a virtual sound source that moves upward from the ground along the doors of the elevator. Meanwhile, when the elevator descends, the information processing device 100 presents a virtual sound source that moves downward from a ceiling along the doors of the elevator.

As described below, the information processing device 100 is capable of providing virtual-sound information services in the voice mode or the sensing mode by combining modes with each other. As a service in the voice mode, when the listener approaches stairs, or when the escalator or the elevator is arriving, information about a floor number of a building (for example, guidance information such as "Fourth Floor: Men's Clothing Department") may be provided.

1.6 Function to Control Level of Information to be Provided

The information processing device 100 is capable of controlling the amount of information to be provided as sound information (information to be provided as the virtual sounds (including voices)) in accordance, for example, with needs of the listener who uses the device. With regard to voices to be virtually generated (virtual voices), for example, in a situation where the listener may be confused by intensive provision of an excessively large amount of voice information, the server device 1750 controls a level of summarization of all the voice information to be provided. This allows the information processing device 100 to provide only limited ones of the information to the listener. In addition, the information processing device 100 is also capable of providing voice information including a voice message. However, when the listener does not want a message of the virtual voice, a single onomatopoeic sound generated by a virtual sound source, such as a "ping," may be used to present the information as the virtual sound. Alternatively, the information may be presented as a virtual sound generated by synthesizing virtual sounds with use of sounds that can be heard in the surroundings at that time (such as sounds of wind and the sounds of approaching automobiles).

As examples of the virtual sound source to be emitted by the information processing device 100, there may be mentioned a single sound and combinations of a plurality of sounds (including not only a simple musical scale, a melody, and the like, but also an artificially synthesized voice of a character). Further, by combining information about data of these sounds with the sound-image localization, the information processing device 100 may provide the information in a manner of moving the virtual sound source. Still further, by performing the acoustic space rendering, specifically, by using, for example, a Doppler shift, the information processing device 100 may also provide information that utilizes special effects, such as a state in which an object is approaching the listener, and a state in which the object moves away from the listener conversely. Details of an information processing method including using various virtual sound sources and advantages to be obtained thereby are described below.

Figure 26:
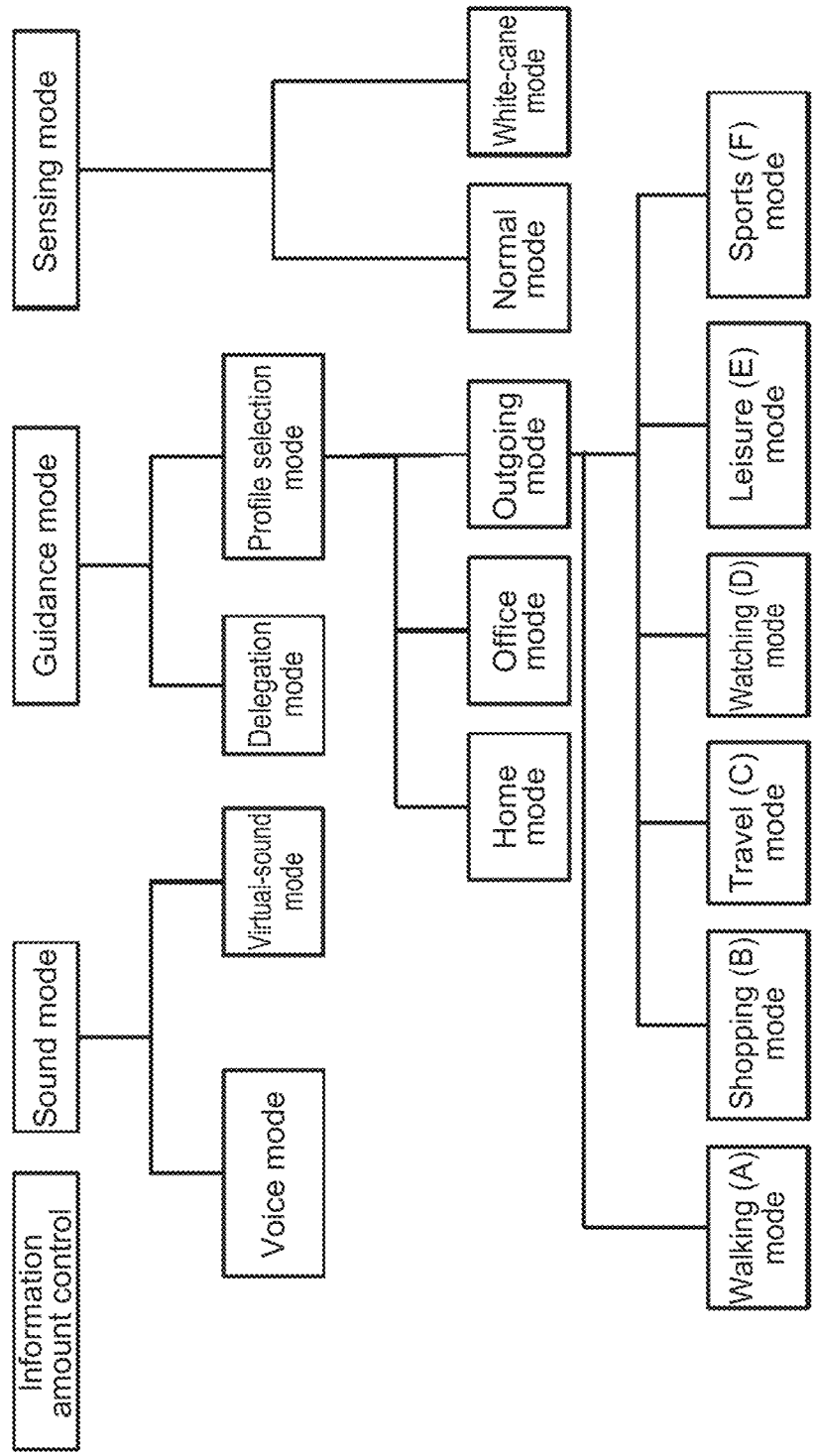
FIG. 26 is a diagram showing a system for setting a level of information to be provided.

FIG. 26 shows a system for setting a level of information to be provided in the information processing device 100. The level of the information to be provided is controlled in the following four main modes.

Information Amount Control:

In this mode, the amount of the information to be provided as the virtual sounds (including voices) is controlled. When the amount of the information is large, a personal agent that provides the information is detected by the sensors 510 around the listener (or information processing device 100), and an attempt to provide recognized information continuously and as much as possible is made. By setting the amount of the information to a minimum, the information processing device 100 can be caused not to provide the information as the virtual sounds (including voices) at all. When an emergency situation is recognized under a state in which the information processing device 100 has been set to an emergency mode, a warning can be issued as the virtual sound (including voice) to the listener.

Sound Mode:

The sound mode can be selected from the voice mode and the virtual-sound mode. The sound mode is a mode in which the information processing device 100 provides information in a recognized situation as virtually generated voices on the basis of information recognition based on the results of the detection by the sensors 510. As described below, settings may be made such that the listener can make a selection from a delegation mode and a profile mode. The selection from these modes may be made in a menu format via a GUI (Graphic User Interface) to be provided on the display of the external device (such as smartphone) that cooperates with the information processing device 100. Alternatively, the selection from these modes may be provided in a stepwise manner through operations of the buttons, a lever, the touch sensor, or the like provided to the body of the information processing device 100.

Guidance Mode:

As described below, the guidance mode is a mode that can be automatically or manually selected from the delegation mode or the profile mode, and that changes a guidance providing method. The delegation mode is a mode in which guidance to be provided is delegated to the personal agent, and the profile mode is a mode in which guidance is performed in accordance with profiles customized respectively for situations.

Sensing Mode:

The sensing mode is a mode in which the information processing device 100 provides information as the virtual sounds (including voices) in accordance with the information recognition based on the results of the detection by the sensors 510. As described below, as the sensing mode, the information processing device 100 provides two types, specifically, the normal mode and the white-cane mode.

The above-described four main modes can each be selected via the user interface. As the user interface that can be used also for the mode selection, input means such as a switch, a slide bar, and a touch sensor (including circuit or bus that converts input information to electric signals and transmits these signals to the processing device) may be provided to the front surface of the housing of the information processing device 100. The information processing device 100 may set the modes by voice commands. Alternatively, instructions of the mode selection may be issued via the user interface of the external device that cooperates with the information processing device 100, such as the smartphone, the smartwatch, or the eyewear. When the external device that cooperates with the information processing device 100 has a touchscreen display such as that of the smartphone, a menu may be displayed via the GUI on the display such that the instructions of the mode selection may be issued via the touchscreen. Note that, the user interface to be provided may allow the user to select, by his/her voice, the level of the information to be provided no matter whether the listener does not want the voice service, or the listener is allowed to select the level.

Figure 27:
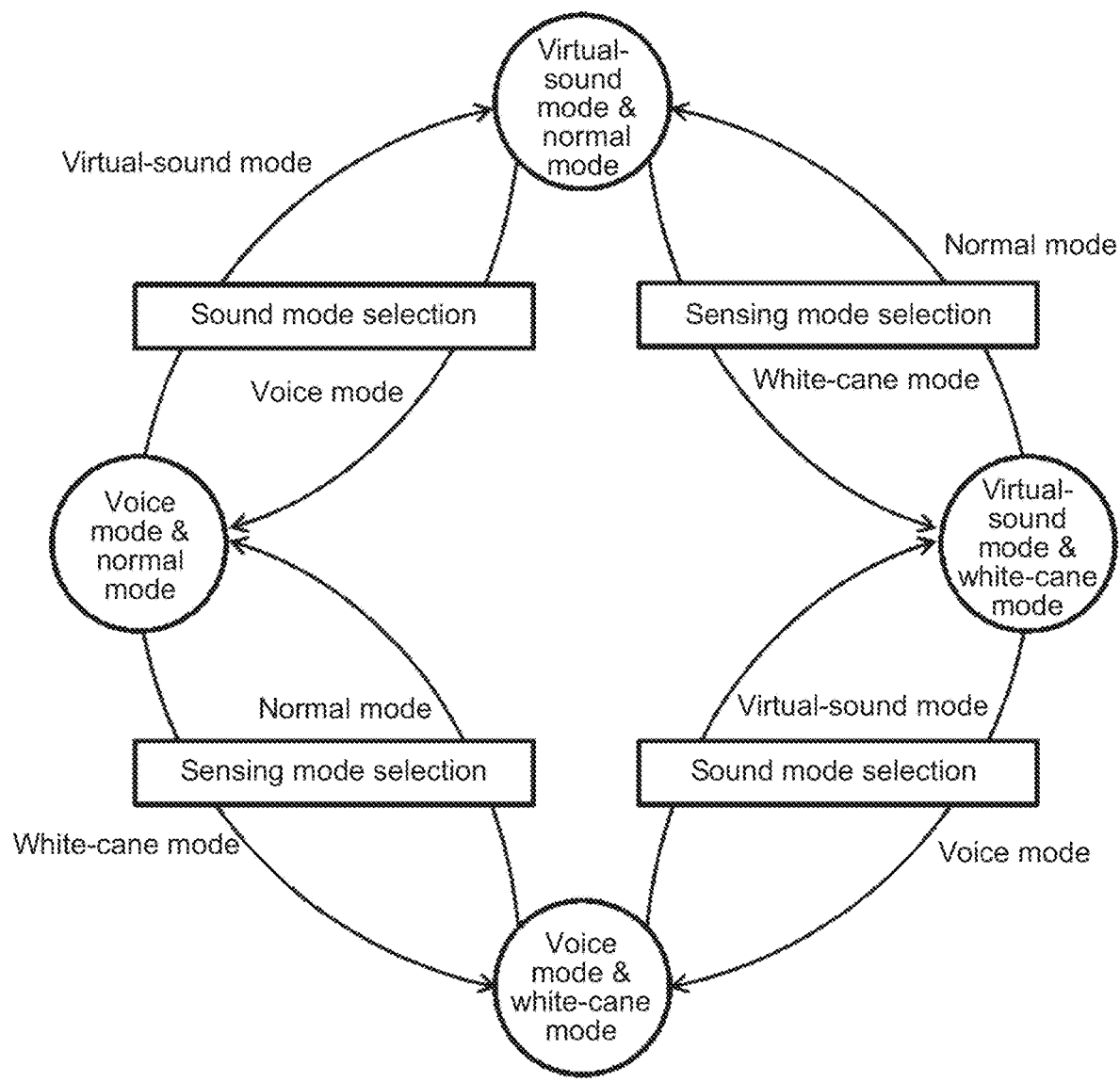
FIG. 27 is a diagram showing state transition relationships between combinations of a sound mode and a sensing mode.

FIG. 27 shows state transition relationships between combinations of the sound mode and the sensing mode. In controlling an information providing method, the information amount control and the guidance mode may be added to four states shown in FIG. 27. This allows the listener to control the information at various levels in accordance, for example, with his/her expectation for the sound information, or a degree of necessity for the sound information.

Note that, in this embodiment, the names of the modes in the guidance mode are given for the sake of convenience in representing assumed functions. Thus, other names may be used as well for similar functions. In addition, functions described below also may be distinguished by other methods.

(A) Guidance Mode

The guidance mode is subdivided at least into the following two functions. For example, the guidance mode is configured to allow the listener to select any of the following functions via the user interface.

(A-1) Delegation Mode (Information-Amount Control Mode)

The delegation mode is a mode in which the personal agent reads out information (presents information as virtual voices), or expresses the information as virtual sounds as appropriate at current time points or along a timeline.

By adjusting the level via the user interface provided for the information amount control as described above, how frequently the information processing device 100 reads out (makes the expression with the virtual sounds) can be adjusted.

Settings may be made such that, even when the information processing device 100 is in the virtual-sound mode, in case where there is a voice inquiry from the listener or another, a response is made as the virtually generated voice. When the information amount control has been set to the lowest level (MIN, ZERO), the information is not provided as the virtual sounds (including voices) at all. Meanwhile, under a state in which the information amount control has been set to a maximum level (MAX), if the agent finds interesting topics on the basis of the information currently recognized by the sensors, the information is continuously provided as the virtual sounds (including voices). When the amount of information to be controlled is intermediate, the information is provided at a certain interval.

The information amount control may be set to be switched in a stepwise manner at preset numbers in accordance with systems. In an embodiment, the amount of information to be controlled may be set on a scale of 1 to 10, with 1 being the minimum and 10 being the maximum. Settings may be made such that a read-out interval is lengthened by one minute each time the number decreases by 1 from the maximum on the scale, or that the number of words in sentences to be read out is reduced to half each time the number decreases by 1 on the scale. In addition, the listener or another may make, as appropriate, settings of the information amount control via the user interface of the external device (such as smartphone) that cooperates with the information processing device 100.

In addition, the delegation mode may be used in combination with the profile selection mode. In this case, under a state in which the information processing device 100 has provided information as the virtual sounds (including voices) according to a specific profile, when the listener feels that the amount of the information is too large, the listener can reduce the amount of the information (how frequently voice messages are generated) by adjusting the level. Meanwhile, when the listener wants a larger number of messages, it is appropriate to set the level to the maximum. When the listener wants all content of messages from another party to be translated in real time as in speech translation, all the content can be translated merely by setting the level to the maximum.

An object that is defined in the profile as an object to be prioritized in the object recognition procedure under a state in which the delegation mode has not been combined with the profile selection mode is an object belonging to a category (class or subclass) of objects that have been infrequently recognized among objects that have been recently recognized. In other words, the personal agent that runs on the controller 551 of the information processing device 100 may be configured to perform the object recognition on the basis of the information acquired from the sensors 510, to execute a statistical process on the categories (classes or subclasses) of the objects observed in a predetermined time period, and to generate sound information for the listener if an uncommon object is recognized.

The personal agent may run on the server device (such as processing device or storage (including memory)) on the network such as the Internet, which is connected via wireless or wired communication. In this case, the information processing device 100 transmits the voice information from the listener, which is acquired via the microphone 541 and the like, to the server device 1750 via the wireless module 553. On the server device 1750 side, the real-time voice recognition is performed with respect to the received voice information, and then returns, to the information processing device 100, the voice information generated by the personal agent that has understood the content of an inquiry from the listener on the basis of a result of the recognition. Then, the information processing device 100 can make a voice response to the listener by utilizing the voice information received from the server device 1750.

In addition, also when the personal agent processes the information, which are acquired via the sensors 510, with use of the controller 551 in the information processing device 100, the personal agent may transmit the information also to the server device at once. In this case, the analysis process or the recognition process on the information from the sensors 510 is executed in the server device. The information processing device 100 is capable of receiving results of the analysis process or the recognition process, and of presenting these results as the voice information to the listener.

(A-2) Profile Selection Mode

A selection from the profiles of the information processing device 100 is made in advance, and the information processing device 100 generates guidance as the virtual sound (including voice) on the basis of a definition of the selected profile when necessary. The profile selection mode includes forms as follows per definition.

Home Mode:

A home mode is a mode in which the information is provided as the virtual sounds (including voices) by the personal agent in response to the voice inquiry from the listener. For the listener, his/her home is generally a familiar environment, and usually, there is no situation where the listener requires support. Thus, by setting the information processing device 100 not to provide the information as the virtual sounds (including voices) unless there is an inquiry from the listener who has fallen into a troublesome situation, the listener is not troubled by unnecessary virtual sounds (including voices). The "troublesome situation" in this case is, for example, a situation where the visually handicapped listener requests a certain information for confirmation such as "Tell me what is left in the refrigerator." In the home mode, the information processing device 100 does not generate the information as the virtual sounds (including voices) unless the listening item does not make an inquiry. Objects to be prioritized in the object recognition procedure in the home mode are persons or objects that cannot be recognized from past information.

Office Mode:

An office mode is a mode in which the information processing device 100 monitors actions of the listener on the basis of, for example, the results of the detection by the sensors 510, and provides, in a case where the information processing device 100 recognizes an unusual action, a response by the personal agent, which is required in that situation. When the (virtual) voice mode has been set as the sound mode, the information processing device 100 presents the information as the virtually generated sound. When the virtual-sound mode has been set, the information processing device 100 presents the information as the virtual sound.

For example, when the listener stays in front of a vending machine for a long time period, a situation where the listener is at a loss which to select is estimated (inferred). Thus, the information processing device 100 generates, for example, a voice message such as "Coffee is at the upper right." Further, when the listener stays at a center of an elevator lobby without talking with anyone else for a long time period, the information processing device 100 generates a voice message "Turn right and go straight, and you will find a vending machine." Still further, when the virtual-sound mode has been selected, a virtual sound source moves such that its sound image is localized to a coffee button on the vending machine (specifically, the virtual sound source, which has been localized to the hand of the listener, moves away from the fingertip toward the vending machine, and the sound image is finally localized to the coffee button). In this way, the listener can be informed of the position of the coffee button.

In the office mode, target places of the listener are limited. For example, when the listener goes out of an office space into a corridor, and then has a choice between a restroom or a vending machine section, sound images are localized while their sound sources possess objects and move alternately and continuously in directions to the restroom and the vending machine section. This allows the listener to have an impression exactly as wind blows from vicinities of his/her ears in the two directions. At a branch point, when the restroom is on the left, and the vending machine corner is on the right, the sound source data corresponding to the restroom to which its sound image is localized while the sound source moves in the direction to the restroom is generated from the vicinity of the left ear, and the sound source data corresponding to the vending machine to which its sound image is localized while the sound source moves in the direction to the vending machine section is generated from the vicinity of the right ear, the data being generated alternately to each other. When the listener turns right at the branch point, it is determined that the vending machine section has been selected, and only the sound image of the sound source corresponding to the vending machine section is localized while the sound source moves in the direction to the vending machine section.

Objects to be prioritized in the object recognition procedure in the office mode are objects that the listener usually uses (the restroom, dining room, the vending machine section), or objects in front of the listener at places where the listener stays for a long time period.

Outgoing Mode:

As an outgoing mode, a plurality of further subdivided modes may be set. As an embodiment, the outgoing mode may be selected from the following modes.

All the modes further subdivided from the outgoing mode have their respective names. However, the names of the modes do not necessarily represent corresponding functions of the modes. For example, names that do not directly suggest the functions, or abstract names, such as a mode A, a mode B, a mode C, . . . , may be given. Now, all the modes subdivided from the outgoing mode are described.

Walking Mode (or Mode A)

A walking mode is a mode in which a priority is given to offering advice that is necessary for ensuring safety when the listener walks around a place that the listener knows and visits on a daily basis. Even when the delegation mode has been set, and at the same time even when the information amount control has been set to the minimum, the information processing device 100 always provides, as the virtual sounds (including voices), a certain information that is essential for ensuring the safety. For example, when the information processing device 100 recognizes that a vehicle is approaching from behind the listener on the basis of the result of the detection by an obstacle detection sensor (object detection sensor 511) being one of the sensors 510, the information processing device 100 generates a voice message, for example, in a case where a risk of collision is high. Object to be prioritized in the object recognition procedure in the walking mode are obstacles.

Shopping Mode (or Mode B)

A shopping mode is a mode in which guidance on a noteworthy one of items listed in advance is offered. Objects to be prioritized in the object recognition procedure in the shopping mode are objects registered in the shopping list.

Travel Mode (or Mode C)

A travel mode is a mode in which necessary advice is offered to the listener as appropriate in accordance with a plan developed in advance. The information processing device 100 collects map information and information about shops and hotels, which are provided on the Internet, on the basis of, for example, position information acquired via the GPS (or GNSS) and image information acquired via the image sensor 513, and offers the advice by combining the information. In addition, in a case where a current position of the listener is in a place where thefts, accidents, and the like are likely to occur, the information processing device 100 provides, as a virtual sound (including voice), a certain information that alerts the listener. In a place where an alert level has been set high, the information processing device 100 preferentially provides an alert message over other voice messages. In addition, the information processing device 100 may always provide the alert message even when the delegation mode has been set, and at the same time even when the information amount control has been set to the minimum. Objects to be prioritized in the object recognition procedure in the travel mode are POIs (Points of Interest). The POIs include sightseeing spots, shops, hotels, airports, car rental companies, museums, and theaters that are highlighted in guidebooks, or caution-needed points on a map (such as a theft-prone area, an accident-prone area, and the like), and objects (such as souvenirs, meal menus, famous paintings, and the like) associated with certain ones of the POIs.

Watching Mode (or Mode D)

A watching mode is a mode in which necessary advice on a viewing target in a performance or the like held in a place where the listener is currently located is offered as appropriate. For example, when the information processing device 100 recognizes that the listener is in a theater on the basis of a result of the detection by the GPS (or GNSS), the information processing device 100 allows the personal agent, which is arranged in the server device 1750 or is resident in the memory 552 of the information processing device 100 itself, to acquire information about the performance at the theater from the server device on the network by a start time of the performance. When, for example, the acquired information about the performance are in a foreign language, and hence are difficult for the listener to understand, information that can be understood by the listener with use of a translation function or the like, and that can describe content of the performance may be included. In addition, in a case where a listener who speaks English as the native language or an everyday language watches a Kabuki performance in Japanese, the personal agent may translate an outline into English in accordance with progress of the performance. In this way, the information processing device 100 can make an explanation in English. In the case where the information processing device 100 has been set to the delegation mode, by combining the delegation mode with the information amount control, the amount of voice information about the content to be explained can be adjusted. Objects to be prioritized in the object recognition procedure in the viewing mode are scenes in the performance.

Leisure Mode (or Mode E)

A leisure mode is a mode in which recommended information about selected leisure (such as climbing and camping) is provided at recommended timings. For example, when the information processing device 100 recognizes that the listener is at a climbing entrance on the basis of the result of the detection by the GPS being one of the sensors 510, the information processing device 100 can generate a voice message such as "Please submit a climbing plan here" with respect to the listener. Objects to be prioritized in the object recognition procedure in the leisure mode are POIs (such as the climbing entrance and a campsite), and special items (such as a climbing post and a cottage) associated with these POIs.

Sports Mode (or Mode F)

The sport mode is a mode in which the movements of the body of the listener are detected on the basis of the result of the detection by the acceleration sensor or the gyro sensor being one of the sensors 510, and then the sensor information is recorded, whereby necessary advice is offered as appropriate. For example, when the listener is playing tennis, in a case where the acceleration sensor suddenly recognizes a negative acceleration despite having been continuously recognizing a positive acceleration, the information processing device 100 recognizes that the listener has made an action of hitting a ball. When the information processing device 100 recognizes that a timing of hitting the ball is late, the information processing device 100 can offer advice as voice information such as "Swing the racket a little earlier." Objects to be prioritized in the object recognition procedure in the sports mode are tools relating to sports, such as the ball and the racket.

Other Modes:

As an example of other modes, there is a drive support mode (or mode G). The drive support mode is a mode in which sound information services are provided by allowing the personal agent in the information processing device 100 to exchange information with a personal agent that runs on a computer installed in an automobile, or with the personal agent that runs on the server device on the network such as the Internet by a mobile wireless-communication function of the computer of the automobile, the personal agents being allowed to exchange the information with each other by connecting an on-board wireless device (for example, Bluetooth (trademark)) such as an automotive infotainment system and the wireless module 553 of the information processing device 100 to each other such that communication can be performed therebetween. Switching to the drive support mode is performed by a selection by the user or automatically. When switching of the profiles is performed together, a different sound-information service can be provided. When an NFC (Near-Field Communication) reader connected to the on-board computer of the automobile authenticates the information processing device 100 by proximity wireless communication, the connection can be established automatically. Alternatively, the personal agent may be automatically connected to the wireless device of the computer of the automobile only after the information processing device 100 has recognized that the user is on board on the basis of the sensor information.

(B) Sensing Mode

Figure 28:
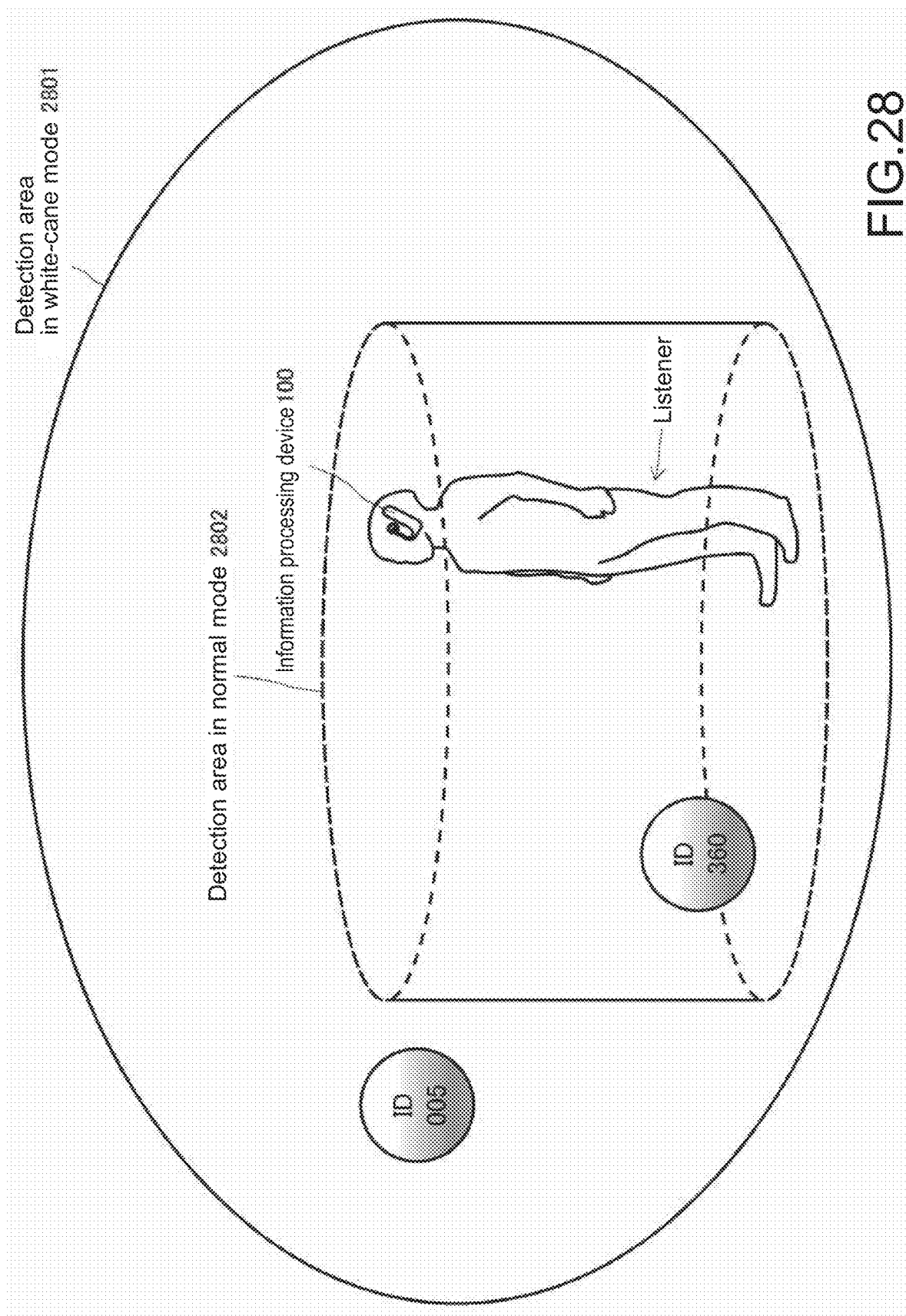
FIG. 28 is a view illustrating the sensing mode.

The sensing mode is subdivided into at least two function modes, specifically, the "normal mode" and the "white-cane mode" in accordance with sizes of areas to be detected, as illustrated in FIG. 28, by the various sensors being ones of the sensors 510. The listener or another can select the sensing mode via the user interface of the information processing device 100, or that of the external device to cooperate therewith.

As illustrated in FIG. 28, targets in the normal mode are all objects that can be detected by the sensors 510 in an environment around the listener. A detection area in the normal mode is denoted by a reference numeral 2801. In the normal mode, objects "ID005" and "ID360" in FIG. 28 correspond to the detection targets. Meanwhile, in the white-cane mode, an operation of detecting and recognizing, among the objects that can be detected by the sensors 510, objects that are present in a predetermined range surrounded by dotted lines is performed. The detection area in the white-cane mode is denoted by reference numeral 2802. In the white-cane mode, only the object "ID360" is detected.

In the white-cane mode, a forward side as viewed from the listener or surroundings of a small area are mainly focused on as in cases where the listener illuminates the forward side with a flashlight, the listener feels his/her way with a white cane, or a guide dog watches out around the listener. The white-cane mode is used mainly for a purpose of providing peripheral information on the basis of the result of the detection by the object detection sensor 511. By combining the information acquired via the object detection sensor 511 with the information acquired via the image sensor 513 and the depth sensor 512, a configuration for providing enhanced services can be provided.

Note that, although the detection area 2802 in the white-cane mode is illustrated in a cylindrical shape in the example illustrated in FIG. 28, this shape merely expresses that the targets are detected only within the predetermined range. Thus, the shape of the detection area is not limited to the cylindrical shape. In addition, the detection area 2802 in the white-cane mode can be limited in various forms depending on the system design.

Also with regard to methods for the sound-image localization, various forms are conceivable. For example, when a character type of the personal agent is set to "dog" in the white-cane mode, a sound image can be localized while its sound source varies its position in a manner of moving near the ground.

In each of the sensing modes, the information processing device 100 is capable of providing information in various forms by combining the sensing mode with the sound modes, and by performing the information amount control. In addition, in response to occurrence of a certain event such as approach of the listener to his/her favorite place, or approach of the personal agent to a recommended place, the information processing device 100 may automatically switch the sensing mode from the normal mode to the white-cane mode. In such a way, the sound information services can be provided to the listener while further limiting the amount of information. As a matter of course, the information processing device 100 may automatically and reversely make a restoration from the white-cane mode to the normal mode in response to occurrence of another event.

(B-1) Normal Mode

The normal mode is a mode in which the white-cane mode of the information processing device 100 has been turned off. In the normal mode, the information processing device 100 provides, as virtual sounds (including voices), information relating to the objects in the environment around the listener on the basis of results of analyses or recognition of a situation of the environment, in which an entire sensor information from the various sensors being ones of the sensors 510 is utilized.

(B-2) White-Cane Mode

The white-cane mode may be regarded as a mode in which processes such as the object detection in a significantly short range from the listener are preferentially executed. The information processing device 100 provides, when necessary, information about objects detected in the significantly short range to the listener as virtual sounds (including voices) in accordance with the sound mode. The "significantly short range" in this case corresponds to the range of the detection area in the white-cane mode. (Range with a diameter of approximately 5 m or less is desirable.) The object detection sensor 511 functions to always search near the feet of the listener. The white-cane mode may be combined with the voice mode. In addition, when the white-cane mode is combined with the virtual-sound mode, the amount of information is limited to be smaller than that of the information to be provided as the virtually generated voices. Thus, a relatively satisfactory environment can be provided to the visually handicapped listener.

In the white-cane mode, in order to express sounds at a time when the listener himself/herself walks with a cane, the information processing device 100 may generate virtual pulse sounds in synchronization, for example, with walking steps (steps at a time when the walking steps are recognized by a vibration sensor or the like, or reference walking steps with which the listener is to synchronize his/her steps). Alternatively, the information processing device 100 may generate virtual footsteps of a forward person, which give an impression that someone else is walking ahead, or may generate other virtual-sound information into a forward side in the three-dimensional acoustic space, and then localize sound images of the footsteps. For example, when a forward person advancing in the same direction is recognized by the object detection sensor 511, footsteps of the forward person may be emphasized such that the listener can follow, and sound images of the footsteps may be localized in the three-dimensional acoustic space.

Still alternatively, in the white-cane mode, when the information processing device 100 detects ahead an object that may collide, the information processing device 100 generates a virtual sound in accordance with a type of the object. Specifically, services can be provided to the listener by using the virtual sound sources as exemplified above in 1.4 "Distinguishment of Virtual Sound Sources." Yet alternatively, the information processing device 100 may reproduce impulses from a point sound source and virtual sounds of a sonar in the three-dimensional acoustic space, and calculate space propagation, thereby presenting virtual reflected sounds to the listener.

Figure 29:
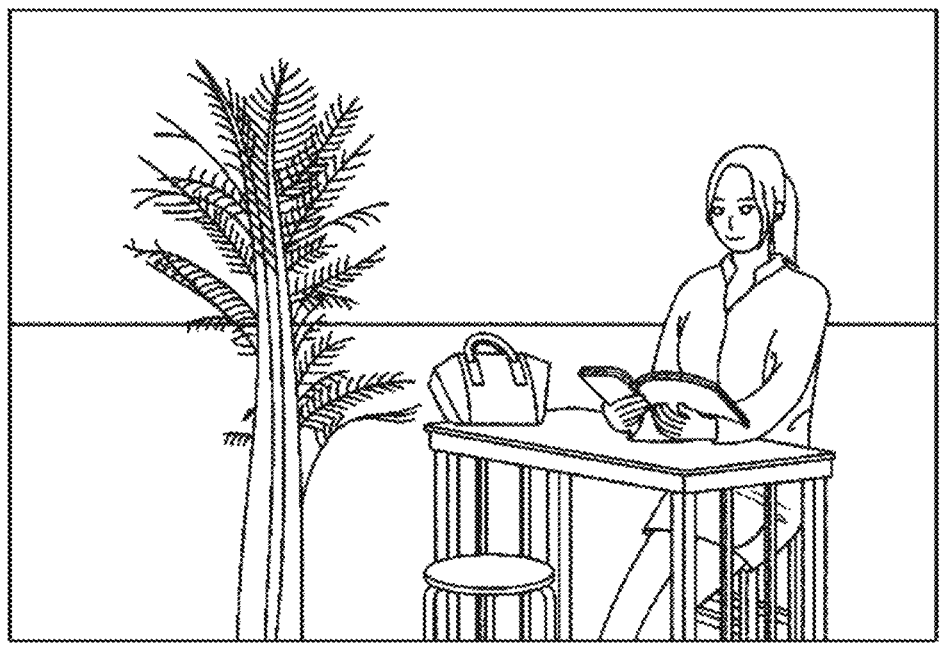
FIG. 29 is a view illustrating an example of an image in a field of view of the listener.
Figure 30:
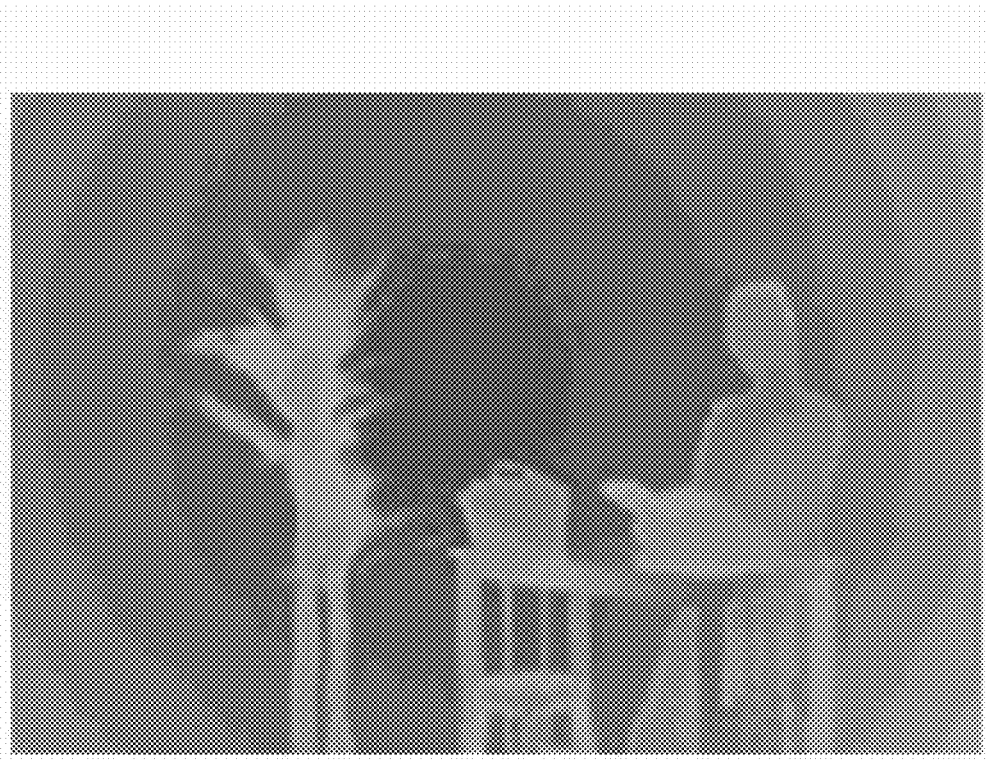
FIG. 30 is a view illustrating a three-dimensional acoustic space recognized from the field of view of the listener, which is illustrated in FIG. 29, on the basis of the result of detection by the depth sensor 512.
Figure 31:
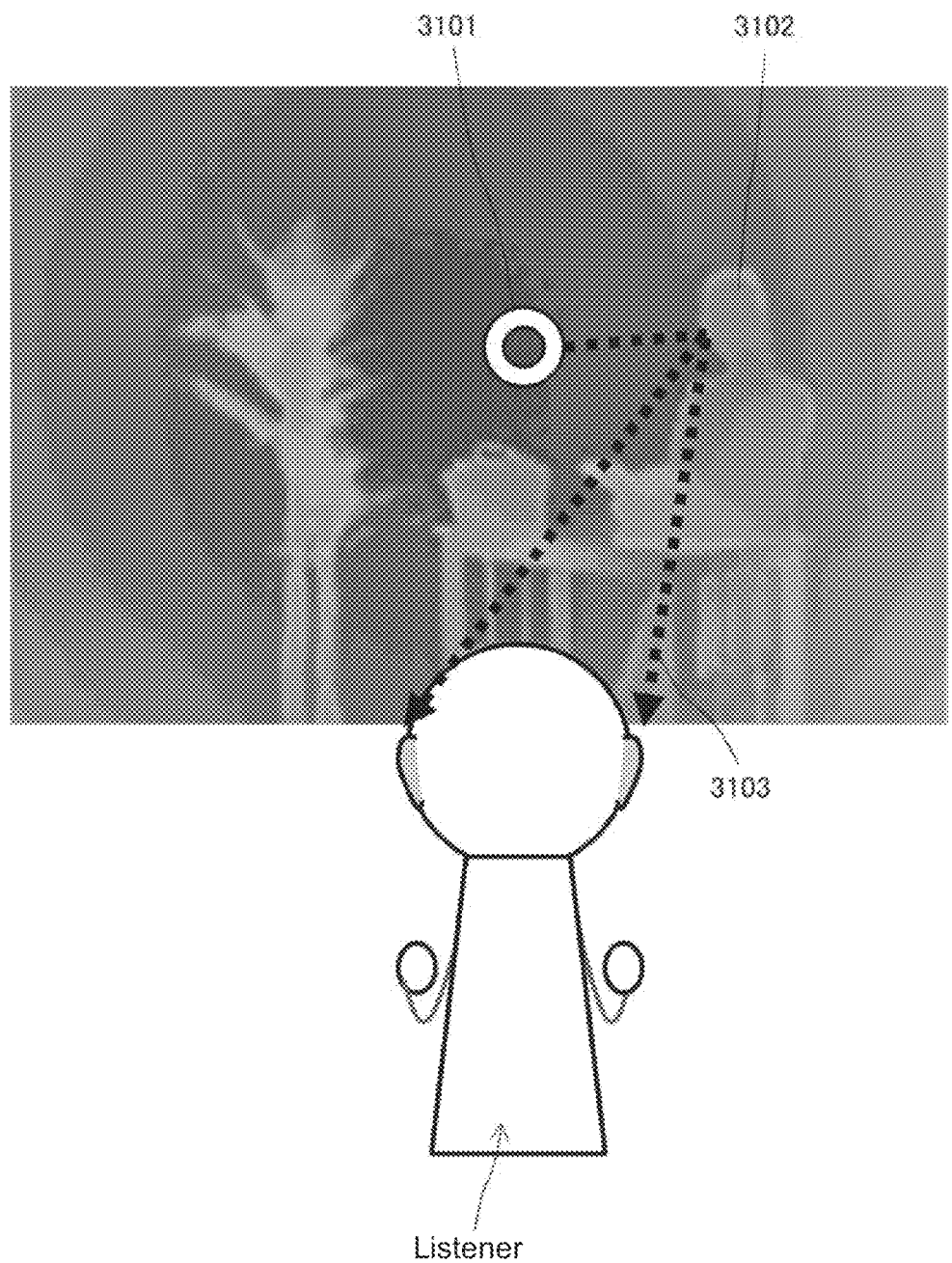
FIG. 31 is a view illustrating how a virtual sound propagates in the three-dimensional acoustic space illustrated in FIG. 30.

FIG. 30 illustrates a three-dimensional space recognized from a real space (real field of view of the listener) illustrated in FIG. 29 on the basis of the result of the detection by the depth sensor 512. In FIG. 30, depth information sensed on 16 scales by the depth sensor 512 is expressed as a grayscale image in accordance with the depths. Note that, as an amount of the information of point-cloud-data information extracted from the depth sensor 512 is too large to use as it is, example, a filtering process such as the voxel grid filtering may be applied. In addition, FIG. 31 illustrates how a virtual sound reproduced from a virtual sound source 3101 arranged in the three-dimensional acoustic space based on the depth information illustrated in FIG. 30 is reflected by another object 3102 arranged in the same space, and how the reflected sound propagates through the space as denoted by a reference numeral 3103 to reach both the ears of the listener. In the example illustrated in FIG. 31, the virtual sound source 3101 is arranged on a wall on a farther side in the field of view of the listener, and a woman sitting in a room corresponds to the reflective object 3102. The information processing device 100 calculates the space propagation at the time of reproducing the impulses from the point sound source or the virtual sounds of the sonar, which is arranged as the virtual sound source 3101 in the three-dimensional acoustic space, and moves and localizes a sound image of the sound source in accordance with the calculated space propagation.

At the time of presenting the virtual reflected sound to the listener as illustrated in FIG. 31, the information processing device 100 may further elaborately control the method of presenting the sound in accordance with properties or characteristics of the object, such as a hardness of the object, which is detected with the object detection sensor 511. Specifically, when the obstacle detected with the object detection sensor 511 is a hard object such as a wall or a pillar, the information processing device 100 presents a high-pitched sound. When a soft obstacle such as a person is detected, the information processing device 100 presents a low-pitched sound. This allows the listener to grasp feeling of the obstacle on the basis of the pitches of the sound presented by the information processing device 100, and to prepare against (anticipate) the collision with the obstacle. Note that, by additionally using a millimeter wave sensor and the like together with the object detection sensor 511, information about the hardness of the object can be advantageously obtained.

Further, the information processing device 100 may vary volume of the sound in accordance with a distance to the obstacle. Specifically, the information processing device 100 increases the volume of the sound as the obstacle becomes closer, and decreases the volume of the sound as the obstacle becomes farther. This allows the listener to grasp the distance to the obstacle on the basis of the volume of the sound presented by the information processing device 100, and to prepare against (anticipate) the collision with the obstacle. For example, the listener is allowed to make a collision avoiding action, specifically, to stop walking or to walk in a different direction.

Still further, the information processing device 100 is also capable of recognizing, in the detection area in the white-cane mode, object IDs of objects from which virtual sounds should be presented, thereby providing a service of presenting virtual sounds on the basis of data of these objects. For example, when the recognized object is operable by the listener (or when the listener needs to operate the object), the information processing device 100 can lead the listener to perform a desired operation by utilizing a movement of the sound-image localization of the virtual sound.

Note that, the listener may approach and directly operate the object, or may remotely operate the object. As examples of a method of the remote operation, there may be mentioned a remote instruction with use of gestures of the listener, and a remote instruction via the user interface of the information processing device 100, such as the touch sensor 514. The listener may select any of these object operation methods, and the information processing device 100 leads the listener by using the movement of the sound-image localization of the virtual sound such that the listener can operate the object according to the selected operation method. For example, the information processing device 100 leads the listener to operate the object by the virtual-sound expression technique "Possession (Possession of Object)" as described above.

The object operable by the listener may issue, for example, information indicating the object ID of its own. Alternatively, the information processing device 100 may specify the object ID by recognizing an image of the object, which is taken with the image sensor 513. In the former case, the object operable by the listener may issue a beacon for virtual-sound-source presentation by utilizing a short-range wireless technology that allows communication within the detection area in the white-cane mode, such as BLE (Bluetooth (trademark) Low Energy). Alternatively, the object may utilize a beacon that uses light beams or sound waves, and a combination process thereof. The information processing device 100 may identify the object ID from information contained in the beacon received via the wireless module 553. Alternatively, visual information such as a two-dimensional barcode or a two-dimensional marker may be attached to the object operable by the listener, and the information processing device 100 may specify the object ID from a result of the image recognition of the image taken with the image sensor 513.

In addition, the information processing device 100 may acquire virtual-sound information necessary for presenting a virtual sound for leading the listener to operate the object on the basis of the object ID and from the server device on the network such as the Internet, or from the external device (such as smartphone) that cooperates with the information processing device 100. As a matter of course, the information processing device 100 may cache, in association with the object ID, the virtual-sound information once used for presenting the virtual sound.

Then, the information processing device 100 moves the sound-image localization of the virtual sound by acquiring the virtual-sound-presentation information from the server device or the external device, or by utilizing the cached virtual-sound-presentation information. In this way, the information processing device 100 leads the listener to operate the object.

Figure 32:
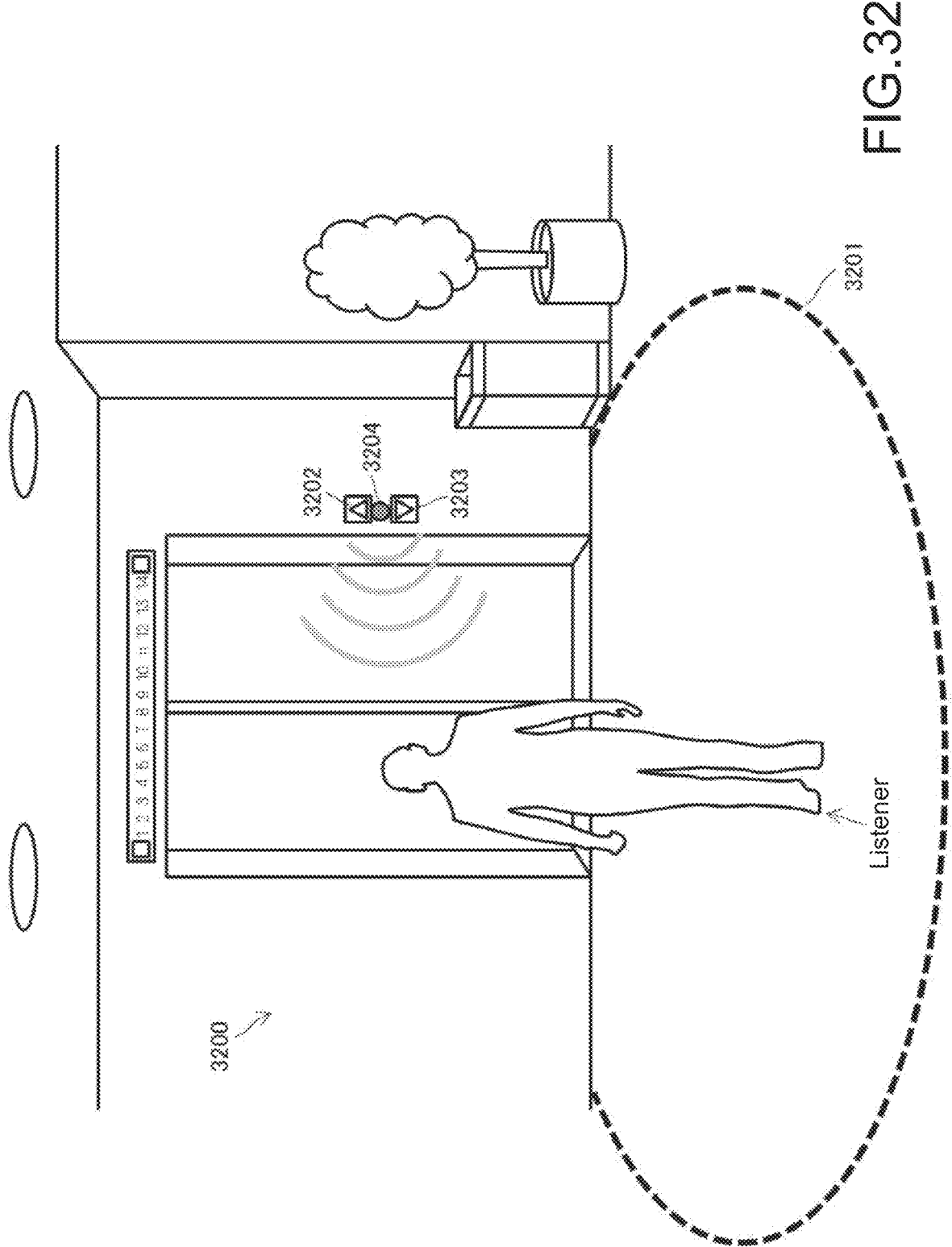
FIG. 32 is a view illustrating an operation example of the information processing device 100 in a white-cane mode.

In this context, an operation example of the information processing device 100 in the white-cane mode is described by way of a specific example of a case where, as illustrated in FIG. 32, the listener wearing the information processing device 100 enters an elevator lobby 3200, and operates an elevator switch ("UP" and "DOWN" buttons) as the operable object.

In the elevator lobby 3200, an "UP" button 3202 and a "DOWN" button 3203 of an elevator correspond to the object which is operable by the listener, and from which a virtual sound should be presented to the listener. In the example illustrated in FIG. 32, a transmitter 3204 installed between the "UP" button 3202 and the "DOWN" button 3203 transmits a BLE beacon for specifying the object, specifically, the "elevator switch" including the "UP" button 3202 and the "DOWN" button 3203. Meanwhile, when the "UP" button 3202 and the "down" button 3203 fall within a detection area 3201 in the white-cane mode, the information processing device 100 (not shown in FIG. 32) that is worn on both or at least one of the right ear or the left ear of the listener receives the BLE beacon from the transmitter 3204. In this way, the information processing device 100 can specify an object ID of the "elevator switch."

Figure 33:
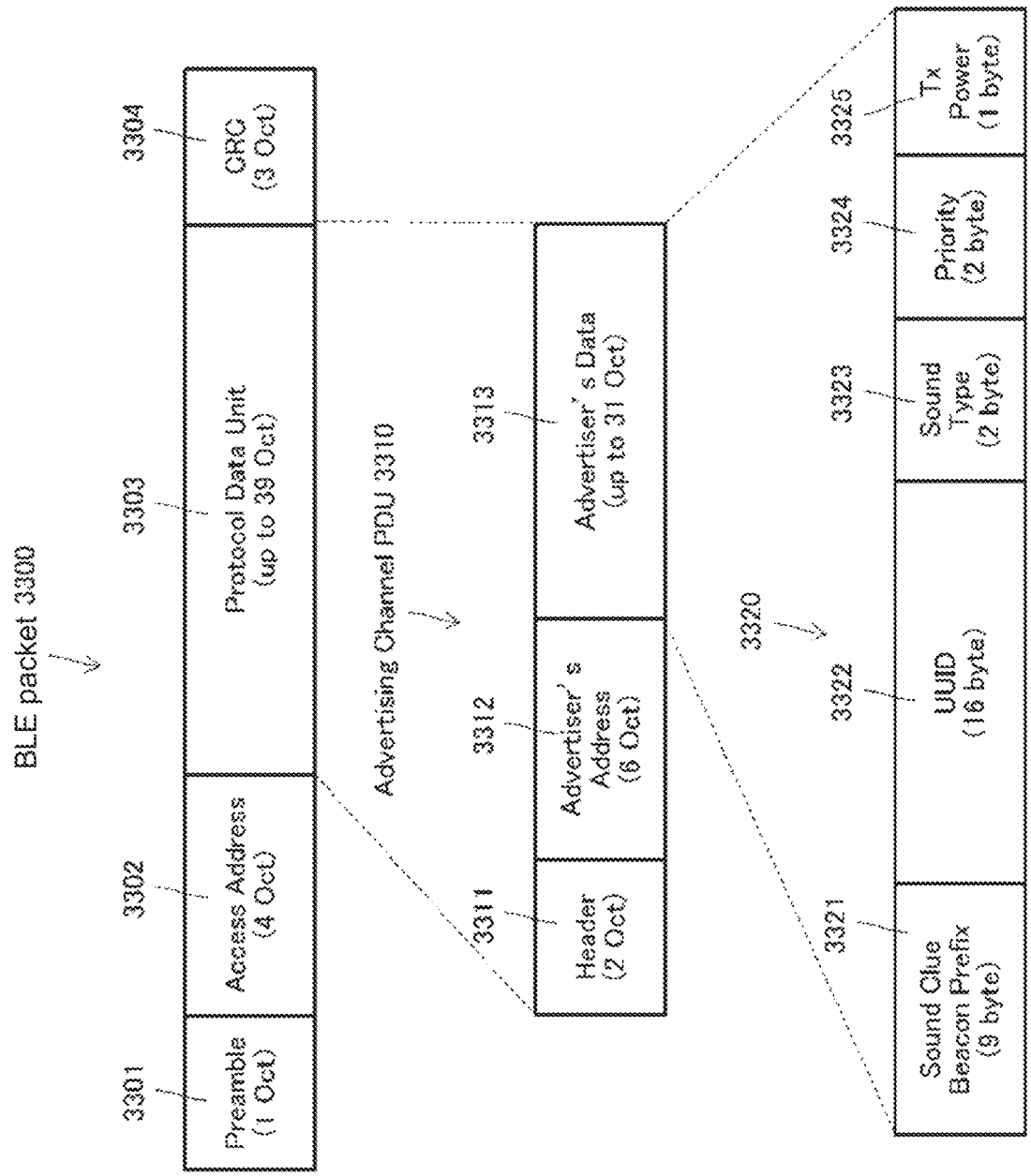
FIG. 33 is a diagram showing an example of a frame format of a BLE beacon for virtual-sound-source presentation (Sound Clue).

FIG. 33 shows an example of a frame format of the BLE beacon for the virtual-sound-source presentation (Sound Clue), which is transmitted from the object to be the target of the remote instructions. This BLE packet 3300 includes a Preamble field 3301, an Access Address field 3302, and a Protocol Data Unit (PDU) field 3303 in this order from a beginning of the packet, and a CRC (Cyclic Redundancy Code) 3204 with a length of 3 Oct for error correction is added to an end of the packet. The Preamble field 3301 stores a bitstream with a length of 1 Oct for synchronization on a bit-by-bit basis on the reception side. In addition, the Access Address field 3302 stores fixed data with a length of 4 Octs for packet discrimination and synchronization on a byte-by-byte basis on the reception side (in a case of an advertising channel). The PDU field 3303 stores a main data part with a length of up to 39 Octs, which is carried in the packet 3300.

A format of the PDU field 3303 of the advertising channel to be used at the time of transmitting the beacon is denoted by a reference numeral 3310. The PDU field 3303 of the advertising channel includes a Header field 3311 with a length of 2 Octs, an Advertiser's Address field 3312 with a length of 6 Octs, and an Advertiser's Data field 3313 with a length of up to 31 Octs in this order from a beginning of the PDU field 3303.

In addition, details of a configuration of the Advertiser's Data field 3313 in the case of the frame of the BLE beacon for Sound Clue are denoted by a reference numeral 3320. The Advertiser's Data field 3313 includes a Sound Clue Beacon Prefix field 3321 with a length of 9 bytes, which indicates that the packet is the beacon for Sound Clue, a UUID field 3322 with a length of 16 bytes, which stores a UUID (Universally Unique Identifier) that allows the object to be uniquely identified, a Sound Type field 3323 with a length of 2 bytes, which indicates a type of the virtual sound, a Priority field 3324 with a length of 2 bytes, which indicates a priority of the virtual sound, and a Tx Power field 3325 with a length of 1 byte, which indicates transmission power of the packet. The UUID is used as the object ID.

Description is made referring back to FIG. 32. The information processing device 100 acquires virtual-sound information necessary for presenting a virtual sound for leading the listener to operate the object, specifically the "UP" button 3202 or the "DOWN" button 3203, the virtual-sound information being acquired on the basis of the object ID acquired from the BLE beacon, and being acquired from the server device on the network such as the Internet, or from the external device (such as smartphone) that cooperates with the information processing device 100. Alternatively, when the virtual-sound information corresponding to the object ID acquired from the BLE beacon has already been cached, for example, in the memory 552, the information processing device 100 acquires this virtual-sound information from the cache.

FIG. 34 shows a configuration example of the virtual-sound information to be acquired on the basis of the object ID specified by the BLE beacon transmitted from the transmitter 3204 in the elevator lobby 3200. The virtual-sound information shown in FIG. 34 is information for leading the listener to operate the "UP" button 3202 or the "DOWN" button 3203. Hereinafter, this information is also referred to as "elevator switch object." The elevator switch object exemplified in FIG. 34 is described in a natural-language format for the sake of better understanding. Alternatively, the elevator switch object may be described in an arbitrary language.

The elevator switch object shown in FIG. 34 includes information 3401 about the object ID of the corresponding elevator switch (in example shown in FIG. 34, object ID of the elevator is "EVSW0340"), information 3402 about a reference position and a reference direction of the elevator switch, an API (in the example shown in FIG. 34, referred to as "API-TYPE SELECTON_A_OR_B") 3403 for subjecting the virtual sound source, which is for leading the listener to issue the remote instructions to this elevator switch, to the localization, and an API (in the example shown in FIG. 34, referred to as "API_LOCATOIN_PRESENTATION") 3404 for subjecting the virtual sound source, which is for leading the listener to directly operate this elevator switch, to the localization.

Figure 35:
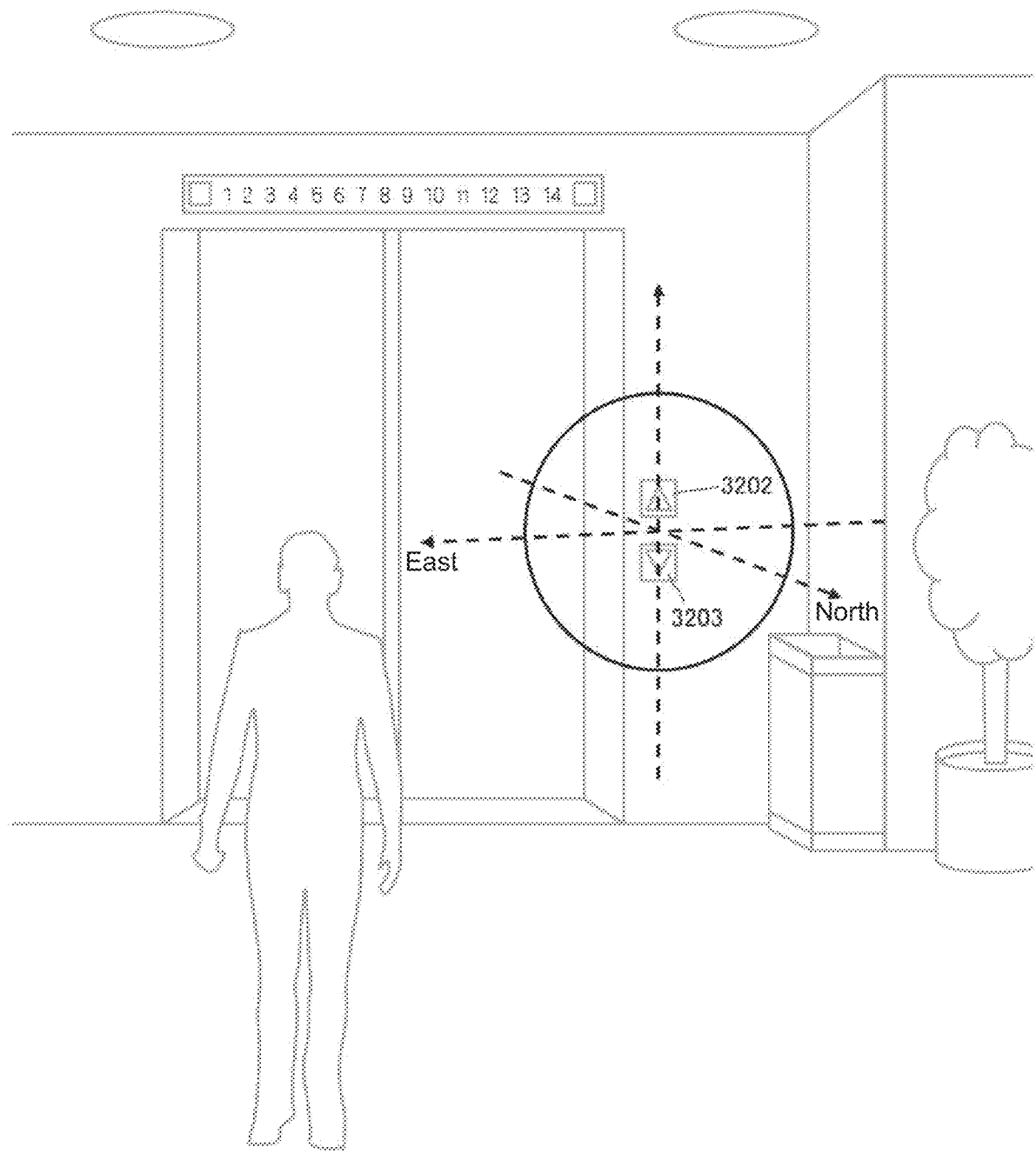
FIG. 35 is a view illustrating a local polar-coordinate system set for an elevator switch.

The information about the reference position and the reference direction of the elevator switch, which is denoted by the reference numeral 3402, is information for setting a local coordinate system of the elevator switch (with respect to a world coordinate system). In the example shown in FIG. 32 and FIG. 34, an origin of the local coordinate system of the elevator switch is set between the UP button 3202 and the DOWN button 3203 of the elevator, and (1,0,0) is set, that is, a north direction is set as a front direction. FIG. 35 illustrates the local polar-coordinate system set for the elevator switch.

The reference symbol 3403 denotes the API for subjecting the virtual sound sources, which are for leading the listener to issue the remote instructions to this elevator switch, to the localization. This API includes a sound source ID (OS0030) for identifying virtual sound sources that lead the listener to issue the remote instructions to the elevator switch, a text information and a voice information of an assist voice defined for a selection from the remote instructions to the elevator switch by the listener, a sound source ID (OS0030) for identifying a virtual sound source that leads the listener to issue a remote instruction ("UP") to the UP button 3202 of the elevator, information indicating a localization position of this virtual sound source, a sound source ID (OS7401) for identifying a virtual sound source that leads the listener to issue a remote instruction ("DOWN") to the DOWN button 3203 of the elevator, and information indicating a localization position of this virtual sound source. Note that, whether the assist voice is defined for the command selection by the listener depends on objects. However, in the virtual-sound mode, this assist voice need not necessarily be used. (Hereinafter, the same applies.)

The reference symbol 3404 denotes the API for subjecting the virtual sound sources, which are for leading the listener to directly operate this elevator switch, to the localization. This API includes a sound source ID (OS0031) for identifying virtual sound sources that lead the listener to directly instruct the elevator switch, an assist message and an assist voice defined for a direct selection of the elevator switch by the listener, a sound source ID (OS0031) for identifying a virtual sound source that leads the listener to a position of the UP button 3202 of the elevator (or for indicating the position of the UP button 3202), information indicating a localization position of this virtual sound source, a sound source ID (OS7402) for identifying a virtual sound source that leads the listener to a position of the DOWN button 3203 of the elevator (or for indicating the position of the DOWN button 3203), and information indicating a localization position of this virtual sound source.

Figure 36:
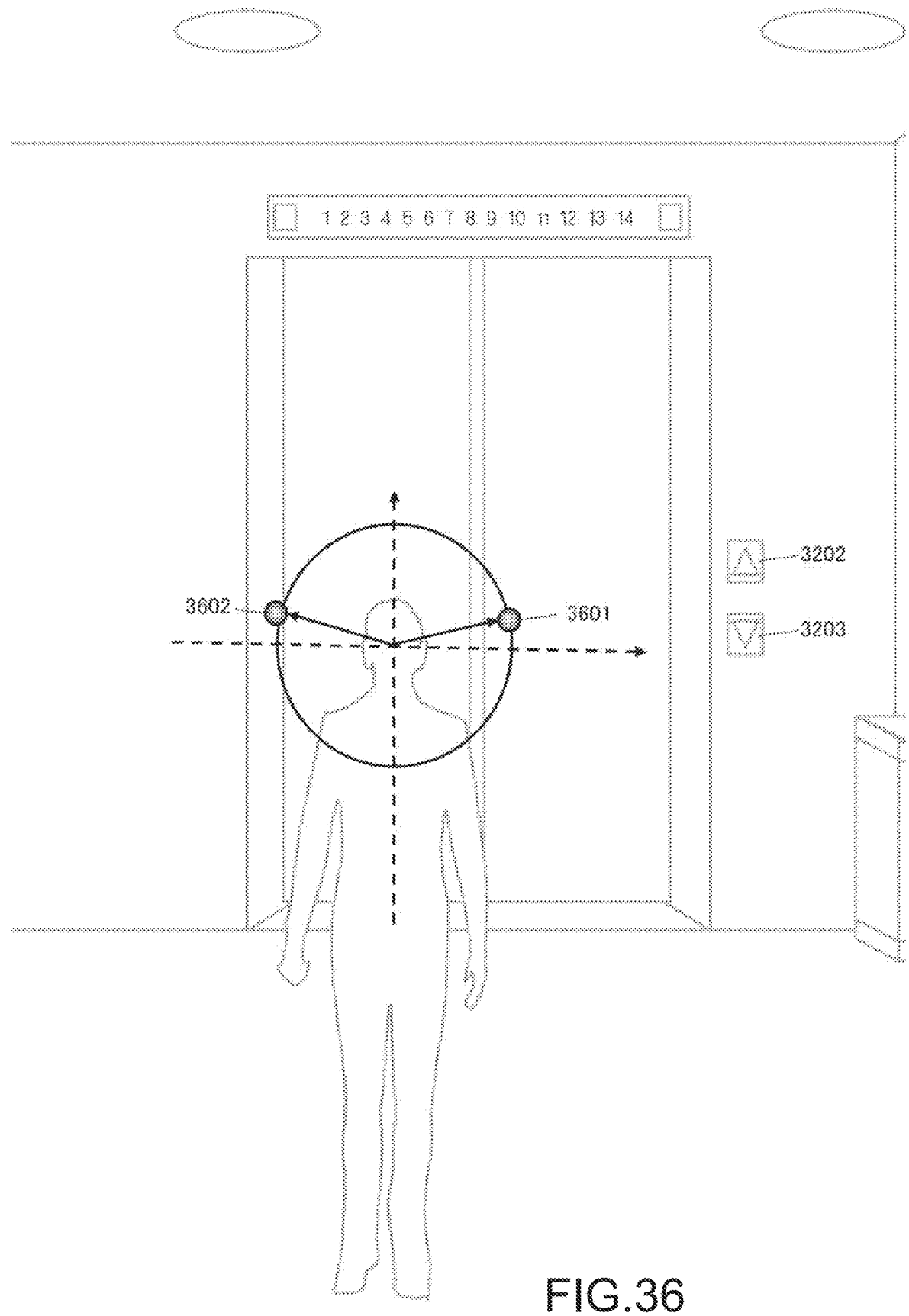
FIG. 36 is a view illustrating localization positions of sound images of virtual sound sources that lead the listener to issue remote instructions to the elevator switch.

Note that, the localization positions of the virtual sound sources for leading the listener to issue the remote instructions to the elevator switch, which are defined by a code part denoted by the reference numeral 3403 in the elevator switch object shown in FIG. 34, are represented by the local coordinate system (polar coordinate system centered on a center of the head of the listener). FIG. 36 illustrates the localization position of the sound image of each of the virtual sound sources. The localization position of the virtual sound source that leads the listener to issue the remote instruction to the UP button 3202 is a position denoted by a reference numeral 3601, which is a position spaced at a distance of 40 cm away from the center of the head in a direction at a clockwise azimuth of 45 degrees corresponding to rotational coordinates in a horizontal plane with respect to 0 degrees corresponding to a front direction as viewed from the listener, and at an elevation angle of 10 degrees corresponding to rotational coordinates in a vertical plane with respect to 0 degrees in the same front direction. Meanwhile, the localization position of the virtual sound source that leads the listener to issue the remote instruction to the DOWN button 3203 is a position denoted by a reference numeral 3602, which is a position spaced at a distance of 40 cm away from the center of the head in a direction at a clockwise azimuth of −45 degrees corresponding to rotational coordinates in the horizontal plane with respect to 0 degrees corresponding to the front direction as viewed from the listener, and at the elevation angle of 10 degrees corresponding to rotational coordinates in the vertical plane with respect to 0 degrees in the same front direction.

Figure 37:
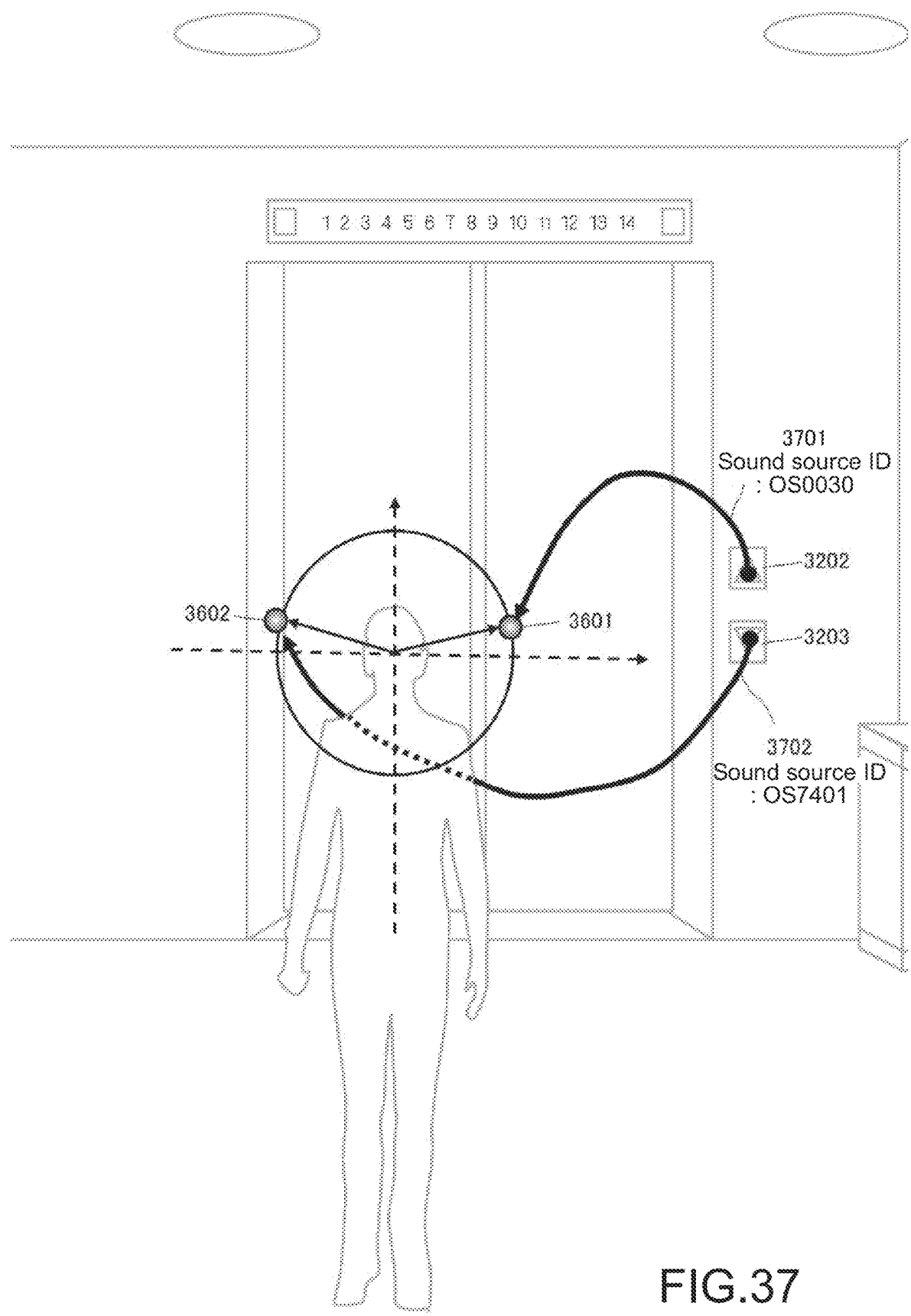
FIG. 37 is a view illustrating how the sound images of the virtual sound sources that lead the listener to issue the remote instructions to the elevator switch are moved and localized.

Thus, when the remote instruction to the elevator switch is selected, as illustrated in FIG. 37, a sound image of the virtual sound specified by the sound source ID "OS0030" moves away from the UP button 3202 of the elevator to the localization position denoted by the reference numeral 3601, for example, along a trajectory denoted by a reference numeral 3701. In this way, the listener is led to issue the remote instruction to the UP button 3202. At this time, the listener can issue the remote instruction to select the UP button 3202, for example, by touching the touch sensor 514 of the information processing device 100 worn on his/her right ear (refer to FIG. 38). The information processing device 100 notifies the elevator side that the UP button 3202 has been selected via the server device or the cooperating external device (such as smartphone).

In addition, as illustrated in FIG. 37, the virtual sound specified by the sound source ID "OS7401" moves away from the DOWN button 3203 of the elevator to the localization position denoted by the reference numeral 3602, for example, along a trajectory denoted by a reference numeral 3702. In this way, the listener is led to issue the remote instruction to the DOWN button 3203. At this time, the listener can issue the remote instruction to select the DOWN button 3203, for example, by touching the touch sensor 514 of the information processing device 100 worn on his/her left ear (refer to FIG. 39). The information processing device 100 notifies the elevator side that the DOWN button 3203 has been selected via the server device or the cooperating external device (such as smartphone).

The code part in the elevator switch object shown in FIG. 34, which is denoted by the reference numeral 3403, may be regarded as a description example of APIs which assume that the listener wears the information processing devices 100 on both his/her ears, and the issues remote instructions with use of the right and left information processing devices 100. FIG. 40 illustrates, as a modification of FIG. 36 to FIG. 39, an example of techniques for expressing the virtual sounds that lead the listener to issue the remote instructions to the elevator switch with use only of the information processing device 100 worn on his/her right ear. The sound image of the virtual sound specified by the sound source ID "OS0030" moves away from the UP button 3202 of the elevator along a trajectory denoted by a reference numeral 4001, and then is localized to the upper right arm of the listener as denoted by a reference numeral 4003. In this way, the listener is led to issue the remote instruction to the UP button 3202. In addition, the sound image of the virtual sound specified by the sound source ID "OS7401" moves away from the DOWN button 3203 of the elevator along a trajectory denoted by a reference numeral 4002, and then is localized to the right forearm of the listener as denoted by a reference numeral 4004. In this way, the listener is led to issue the remote instruction to the DOWN button 3203. Note that, after the respective sound images of the virtual sounds have been localized to the arm of the listener, these sound images may be returned to the UP button 3202 and the DOWN button 3203 in a manner that wind goes away. At this time, as illustrated in FIG. 41, the listener can issue the remote instruction to select the UP button 3202 by touching an upper side of the touch sensor 514 of the information processing device 100 worn on his/her right ear, and can issue the remote instruction to select the DOWN button 3203 by touching a lower side of the touch sensor 514.

Figure 38:
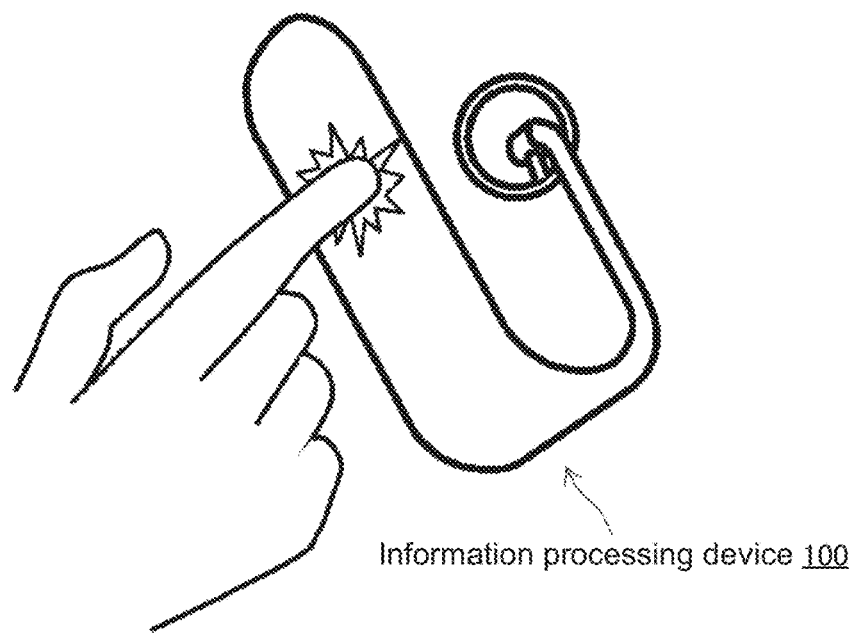
FIG. 38 is a view illustrating how the listener issues a remote instruction to select an UP button of an elevator via the information processing device 100.
Figure 39:
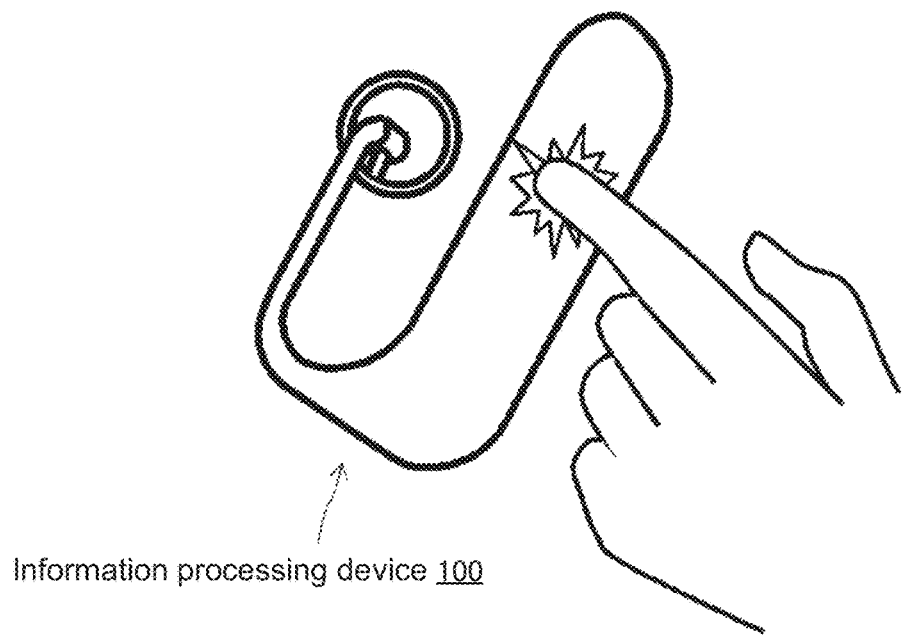
FIG. 39 is a view illustrating how the listener issues a remote instruction to select a DOWN button of the elevator via the information processing device 100.
Figure 40:
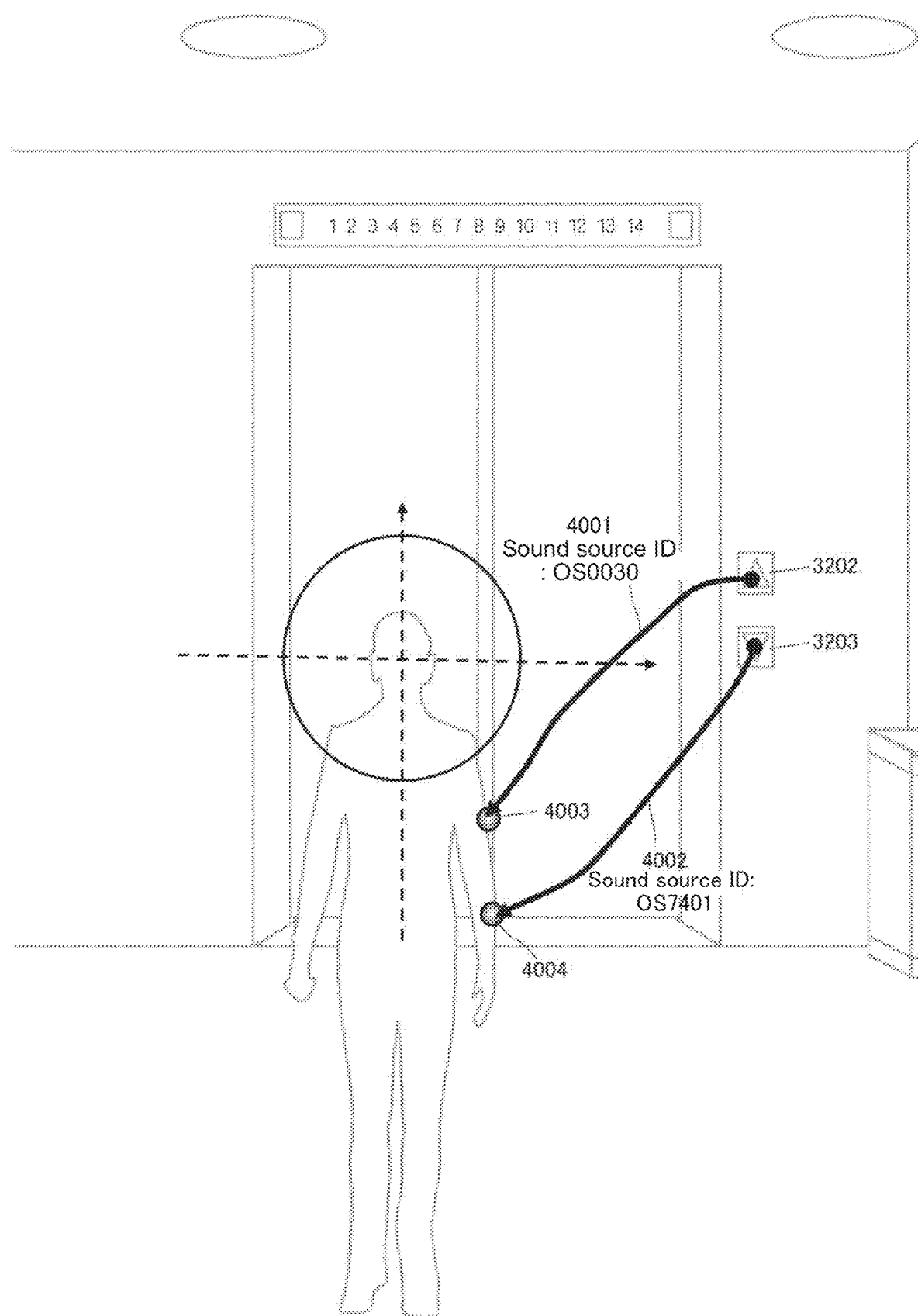
FIG. 40 is a view illustrating another example in which the sound images of the virtual sound sources that lead the listener to issue the remote instructions to the elevator switch are moved and localized.
Figure 41:
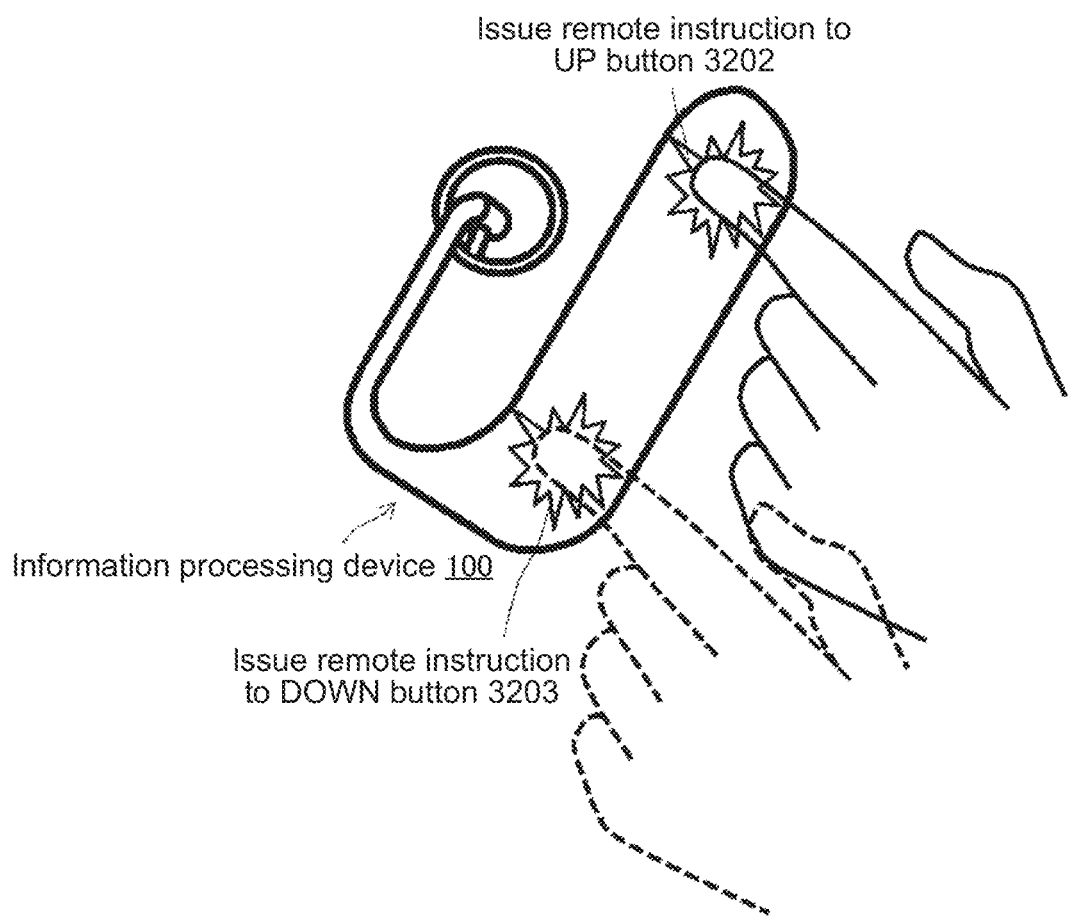
FIG. 41 is a view illustrating another example in which the listener issues the remote instructions to make selections with respect to the elevator switch via the information processing device 100.

Note that, at the time of issuing the remote instructions to the objects in the detection area in the white-cane mode, the user interface of the information processing device 100, such as the touch sensor 514, need not necessarily be utilized as shown in FIG. 38, FIG. 39, and FIG. 41, and the gestures of the listener may be utilized. For example, gesture operations by the listener, such as touching to or intersecting with a sound image of a desired operation target with his/her hand, and touching to the upper side or the lower side of the information processing device 100 worn on his/her ear may be recognized on the basis of the result of the detection by the depth sensor 512.

Figure 42:
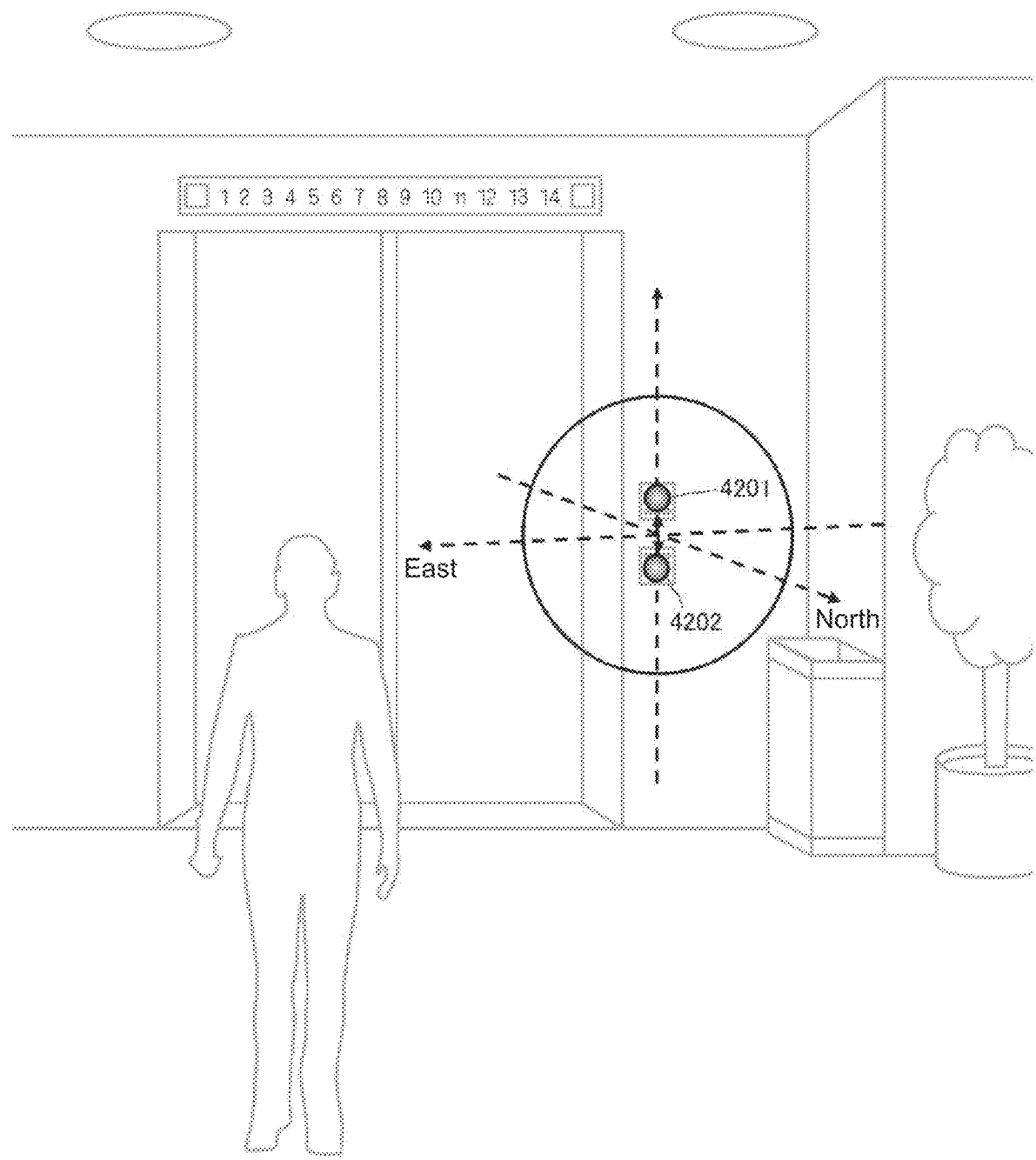
FIG. 42 is a view illustrating localization positions of sound images of virtual sound sources that lead the listener to directly operate the elevator switch.

In addition, the localization positions of the virtual sound sources for leading the listener to directly operate the elevator switch, which are defined by a code part denoted by the reference numeral 3404 in the elevator switch object shown in FIG. 34, are represented by the polar coordinate system centered on the reference position of the elevator switch (refer to FIG. 35), which corresponds to the part denoted by the reference numeral 3402. FIG. 42 illustrates the localization positions of the virtual sound sources for leading the listener to directly operate the elevator switch. The localization position of the virtual sound source that leads the listener to directly operate the UP button 3202 is a position denoted by a reference numeral 4201, which is the position of the UP button 3202 spaced at a distance of 20 cm away from the reference position in a direction at a clockwise azimuth of 0 degrees corresponding to rotational coordinates in a horizontal plane with respect to 0 degrees corresponding to a front direction as viewed from the reference position (between UP button 3202 and DOWN button 3203), and at an elevation angle of 90 degrees corresponding to rotational coordinates in a vertical plane with respect to 0 degrees in the same front direction. Meanwhile, the localization position of the virtual sound source that leads the listener to directly operate the DOWN button 3203 is a position denoted by a reference numeral 4202, which is the position of the DOWN button 3203 spaced at a distance of 20 cm away from the reference position in the direction at the clockwise azimuth of 0 degrees corresponding to the rotational coordinates in the horizontal plane with respect to 0 degrees corresponding to the front direction as viewed from the reference position, and at an elevation angle of −90 degrees corresponding to rotational coordinates in the vertical plane with respect to 0 degrees in the same front direction.

Figure 43:
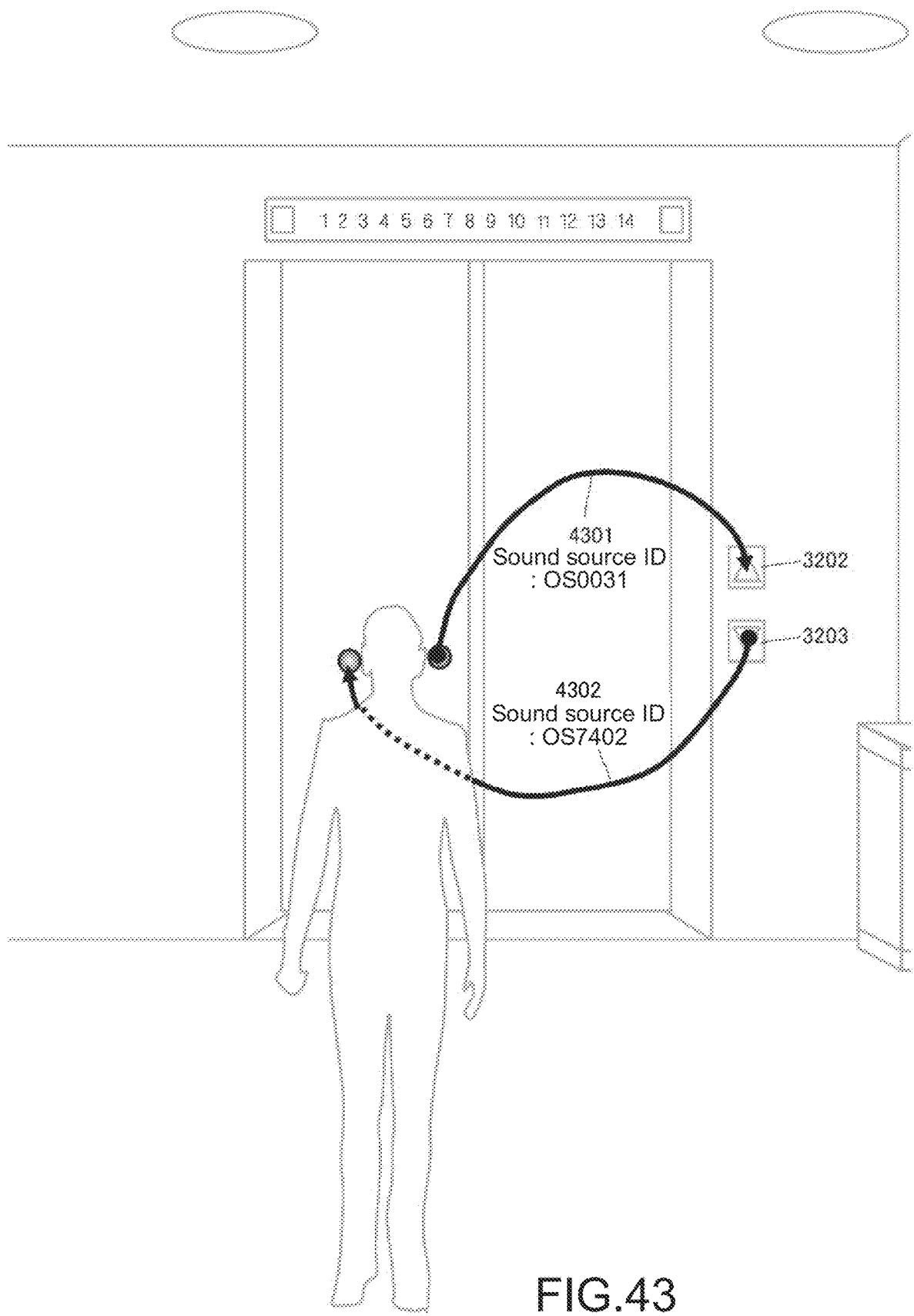
FIG. 43 is a view illustrating how the sound images of the virtual sound sources that lead the listener to directly operate the elevator switch are moved and localized.

Thus, when the direct operation to the elevator switch is selected, as illustrated in FIG. 43, the sound image of the virtual sound specified by the sound source ID "OS0031" moves away from the vicinity of the right ear of the listener to the UP button 3202, for example, along a trajectory denoted by a reference numeral 4301. In this way, the listener is led to the position of the UP button 3202. Then, when the listener wants to take the elevator to go upstairs, he/she can call a car of the elevator to go upstairs by directly pressing the UP button 3202 to which the sound image of the virtual sound specified by the sound source ID "OS0031" has been localized. Similarly, the sound image of the virtual sound specified by the sound source ID "OS7402" moves away from the vicinity of the right ear of the listener to the DOWN button 3203, for example, along a trajectory denoted by a reference numeral 4302. In this way, the listener is led to the position of the DOWN button 3203. Then, when the listener wants to take the elevator to go downstairs, he/she can call the car of the elevator to go downstairs by directly pressing the DOWN button 3203 to which the sound image of the virtual sound specified by the sound source ID "OS7402" has been localized.

Figure 44:
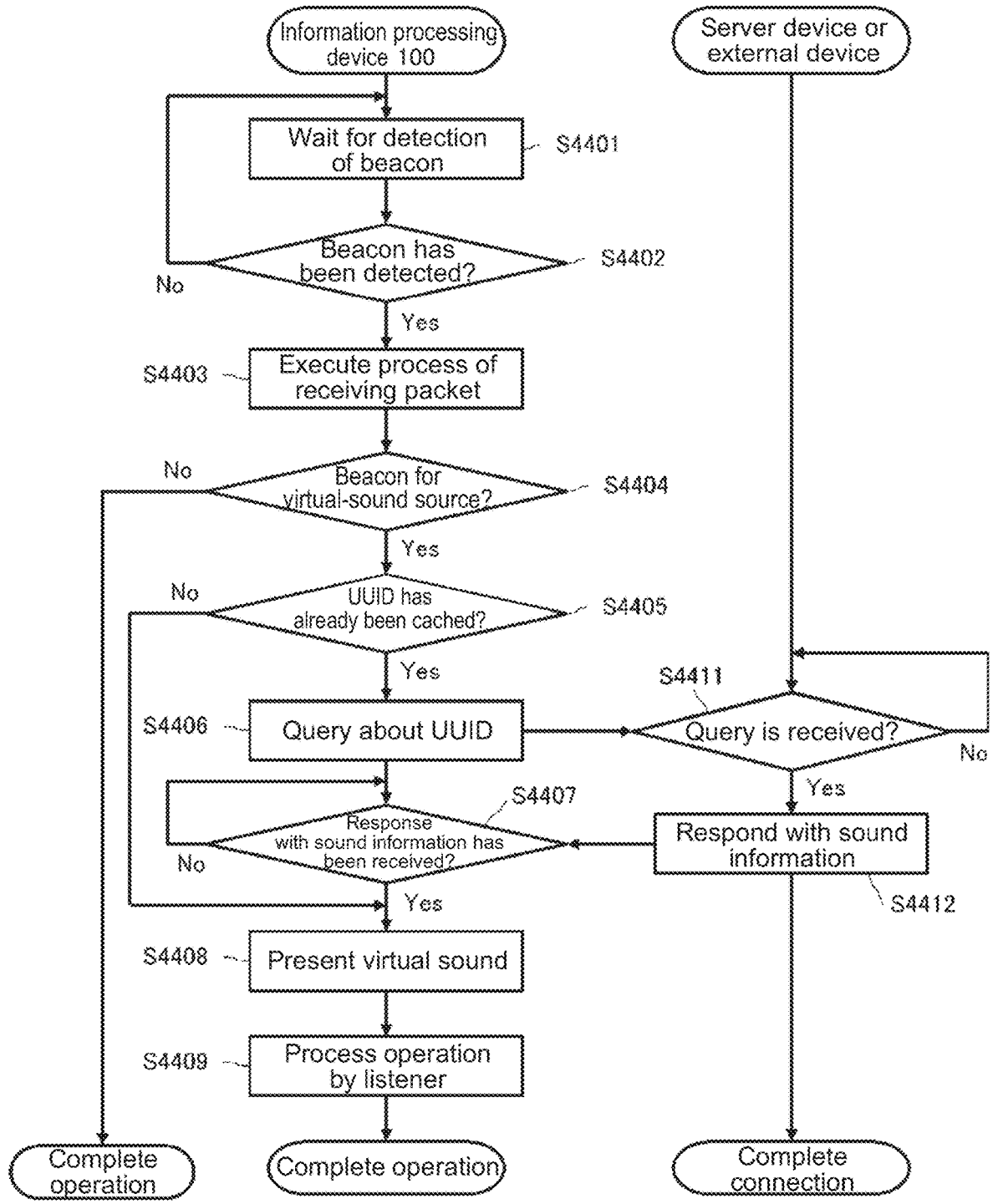
FIG. 44 is a flowchart showing a procedure to be executed by the information processing device 100 in the white-cane mode.

FIG. 44 shows, as a flowchart, a procedure to be executed by the information processing device 100 in the white-cane mode. In the white-cane mode, the information processing device 100 detects the BLE beacon transmitted from an object in the detection area, presents a virtual sound source to the listener, and controls a target device (such as elevator) in response to an operation by the listener. The processes in the information processing device 100 are executed basically under the control by the controller 551.

In the white-cane mode, the information processing device 100 waits for the detection of the BLE beacon in the detection area in the white-cane mode (Step S4401). Then, when the information processing device 100 detects the BLE beacon (Yes in Step S4402), the information processing device 100 executes a process of receiving the BLE packet (Step S4403).

Next, with reference to the Sound Clue Beacon Prefix in the received BLE beacon, the information processing device 100 checks whether the Prefix is for the virtual sound source (Step S4404). When the Prefix is not for the virtual sound source, a source of the received BLE beacon is not an object to be a target of the remote instructions. Thus, the information processing device 100 need not to present the virtual sound to the listener, and hence ends this procedure.

Meanwhile, when the Prefix is for the virtual sound source (Yes in Step S4404), the source of the received BLE beacon is the object to be the target of the remote instructions. Thus, the information processing device 100 additionally checks whether the information about the virtual sound corresponding to the UUID (object ID) described in the BLE beacon has already been cached (Step S4405).

When the information about the corresponding UUID has not yet been cached (No in Step S4405), the information processing device 100 queries the server device on the Internet or the cooperating external device (such as smartphone) about the UUID (Step S4406), and waits until a response with the information (such as elevator switch object) about the virtual sound corresponding to the UUID is made (Step S4407).

When the query about the UUID from the information processing device 100 is received on the server device side or the external device side (Yes in Step S4411), the server device or the external device responds to the information processing device 100 with the information about the virtual sound corresponding to the UUID (Step S4412), and then ends connection to the processing device 100.

Then, when the information processing device 100 receives the information about the virtual sound from the server device or the external device (Yes in Step S4407), or when the information about the virtual sound has already been cached (Yes in Step S4405), the information processing device 100 moves and localizes a sound image of the virtual sound source for leading the listener to operate the object detected in the detection area in the white-cane mode (Step S4408). In Step S4408, the information processing device 100 leads the listener to operate the object by the virtual-sound expression technique "Possession (Possession of Object)" as illustrated, for example, in FIG. 37, FIG. 40, and FIG. 43.

The listener issues the remote instruction to the object in the detection area in the white-cane mode by being led by the movement and the localization of the sound image of the virtual sound. Then, the information processing device 100 controls the target device in response to the remote instruction issued by the listener (Step S4409), and ends the procedure.

Figure 45:
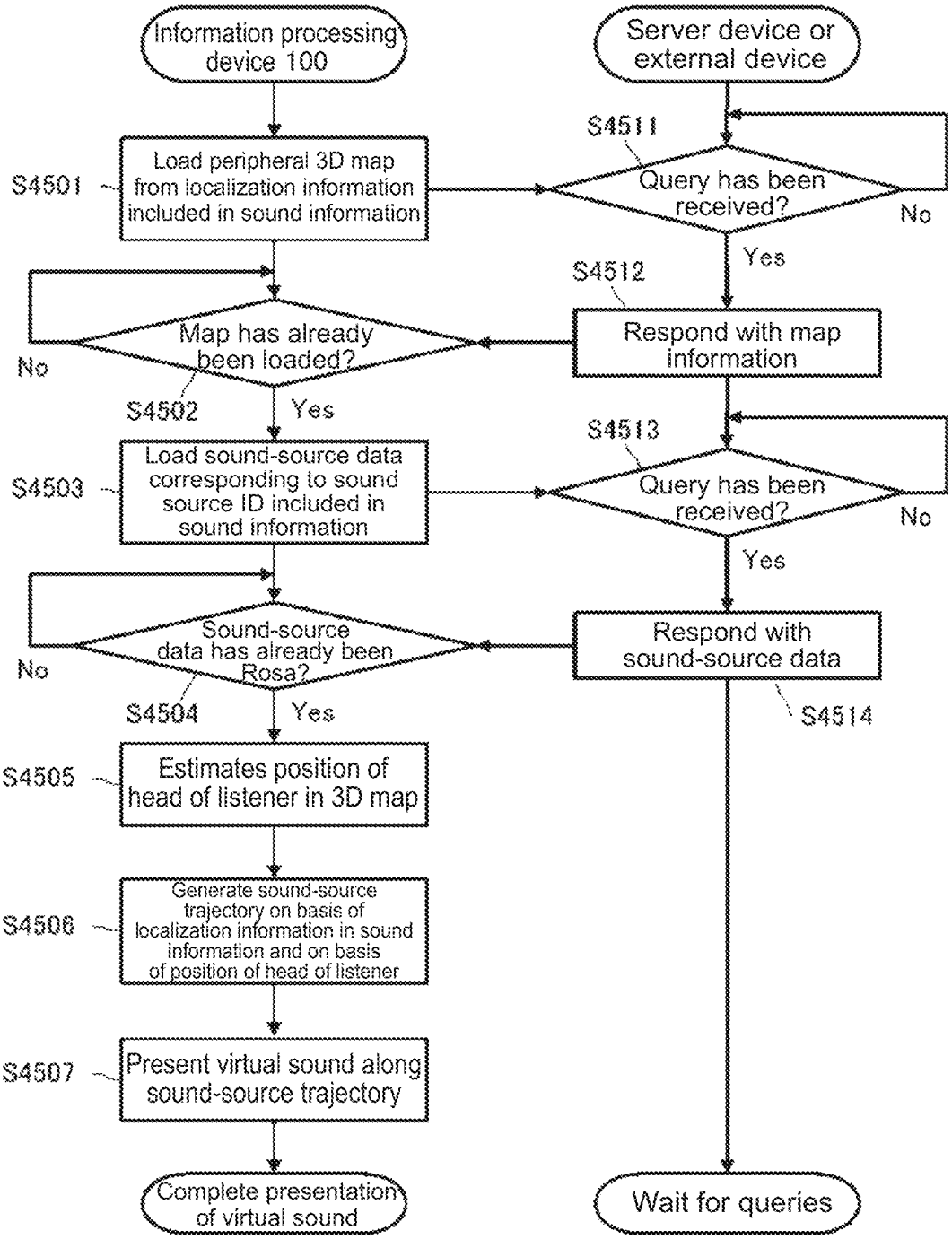
FIG. 45 is a flowchart showing a detailed procedure for presenting a virtual sound.

FIG. 45 shows, as a flowchart, a detailed procedure for the information processing device 100 to present the virtual sound in Step S4408 in the flowchart shown in FIG. 44.

The information processing device 100 loads, to the memory 552, a peripheral three-dimensional map from a localization information of the virtual sound source, which is included in the virtual-sound information (such as elevator switch object) acquired in Step S4407 (Step S4501).

The information processing device 100 may query the server device on the Internet or the cooperating external device (such as smartphone) about the corresponding three-dimensional map. The server device or the external device always waits for the queries from the information processing device 100. Then, in response to the query from the information processing device 100 (Yes in Step S4511), the server device or the external device responds with the map information (Step S4512).

When the information processing device 100 has loaded the map information to the memory 552 (Yes in Step S4502), the information processing device 100 subsequently loads, to the memory 552, a sound-source data corresponding to a sound source ID included in the virtual-sound information acquired in Step S4407 (Step S4503).

The information processing device 100 may query the server device or the cooperating external device about the corresponding sound-source data. Then, in response to the query from the information processing device 100 (Yes in Step S4513), the server device or the external device responds with the sound-source data (Step S4514).

When the information processing device 100 has loaded the sound-source data to the memory 552 (Yes in Step S4504), the information processing device 100 estimates a position of the head of the listener wearing this information processing device 100 on his/her ear in the peripheral three-dimensional map of a localization position of the virtual sound source (Step S4505).

Then, on the basis of the localization information of the virtual sound source, which is included in the virtual-sound information, and on the basis of the position of the head of the listener, the information processing device 100 generates a trajectory for moving and localizing a sound image of the virtual sound (Step S4506). The information processing device 100 reproduces the sound-source data of the virtual sound while moving and localizing the sound image along this sound-source trajectory (refer, for example, to FIG. 37) (Step S4507). Then, the information processing device 100 ends the procedure for presenting the virtual sound.

Figure 46:
FIG. 46 is a flowchart showing a detailed procedure for controlling a target device in response to the remote instruction by the listener who has been led by the virtual sound.

FIG. 46 shows, as a flowchart, a detailed procedure for the information processing device 100 to control the target device in response to the remote instruction by the listener who has been led by the virtual sound in Step S4409 in the flowchart shown in FIG. 44.

When the information processing device 100 receives input to the user interface such as the touch sensor 514, or recognizes a gesture of the listener (Yes in Step S4601), the information processing device 100 makes a query by transmitting an object ID of an object selected as the target of the operation (remote instruction), a selected API type, and information about a sound source ID corresponding to the operation selected by the listener to the server device on the Internet or the cooperating external device (such as smartphone) (Step S4602). For example, under a state in which the elevator switch object has been the operation target, and in which the API type "SELECTION_A_OR_B" has been selected, when the listener makes a selection by touching the touch sensor 514 of the information processing device 100 worn on his/her right ear (refer, for example, to FIG. 38), the information processing device 100 queries the server device or the external device about the sound source ID "OS0030," and waits for a response from the server device or the external device being a destination of the query (Step S4603).

The server device or the external device, and the device selected as the target of the operation by the listener always wait for the queries.

When the server device or the external device receives the query about the object ID, the API type, and the information about the selected sound-source ID from the information processing device 100 (Yes in Step S4611), the server device or the external device specifies the device selected as the operation target, and requests the operation-target device to perform control corresponding to the API type and the sound source ID that have been queried about (Step S4612), and waits for a response from the operation-target device being a destination of the request (Step S4613).

When the operation-target device receives the query from the server device or the external device (Yes in Step S4621), the operation-target device responds with a notification that the control request has been accepted (Step S4622), and then controls the operation of the operation-target device itself in accordance with the content of the request (Step S4623). Then, after the operation-target device has completed its operation in accordance with the control request, the operation-target device enters a query waiting mode again.

Next, when the server device or the external device receives the notification of the control acceptance from the operation-target device being the destination of the control request (Yes in Step S4613), the server device or the external device notifies the information processing device 100 being a source of the query that the operation-target device has accepted the control (Step S4614), and then enters a query waiting mode again.

After that, when the information processing device 100 receives, from the server device or the external device being the destination of the query, the notification that the operation-target device has accepted the control (Yes in Step S4603), the information processing device 100 provides feedback, to the listener, that the operation input by the listener in Step S4601 has been completed (Step S4604). Then, the information processing device 100 ends this operation.

(C) Personal Agent

The personal agent is software (a computer program) that runs on a processor on a computer. In this embodiment, the information processing device 100 causes the personal agent to be resident in the memory 552, and to monitor actions of the listener. This allows the personal agent to recognize the actions of the listener, and to provide appropriate information as the virtual-sound information (including voice information) in accordance with the mode settings (described above) of the information processing device 100. A part of the personal agent may reside in the memory 552 (in other words, locally in the information processing device 100), and another part of the personal agent or another personal agent may run on the network such as the Internet (or cloud). With this, the services can be provided cooperatively with the cloud to the listener.

Figure 47:
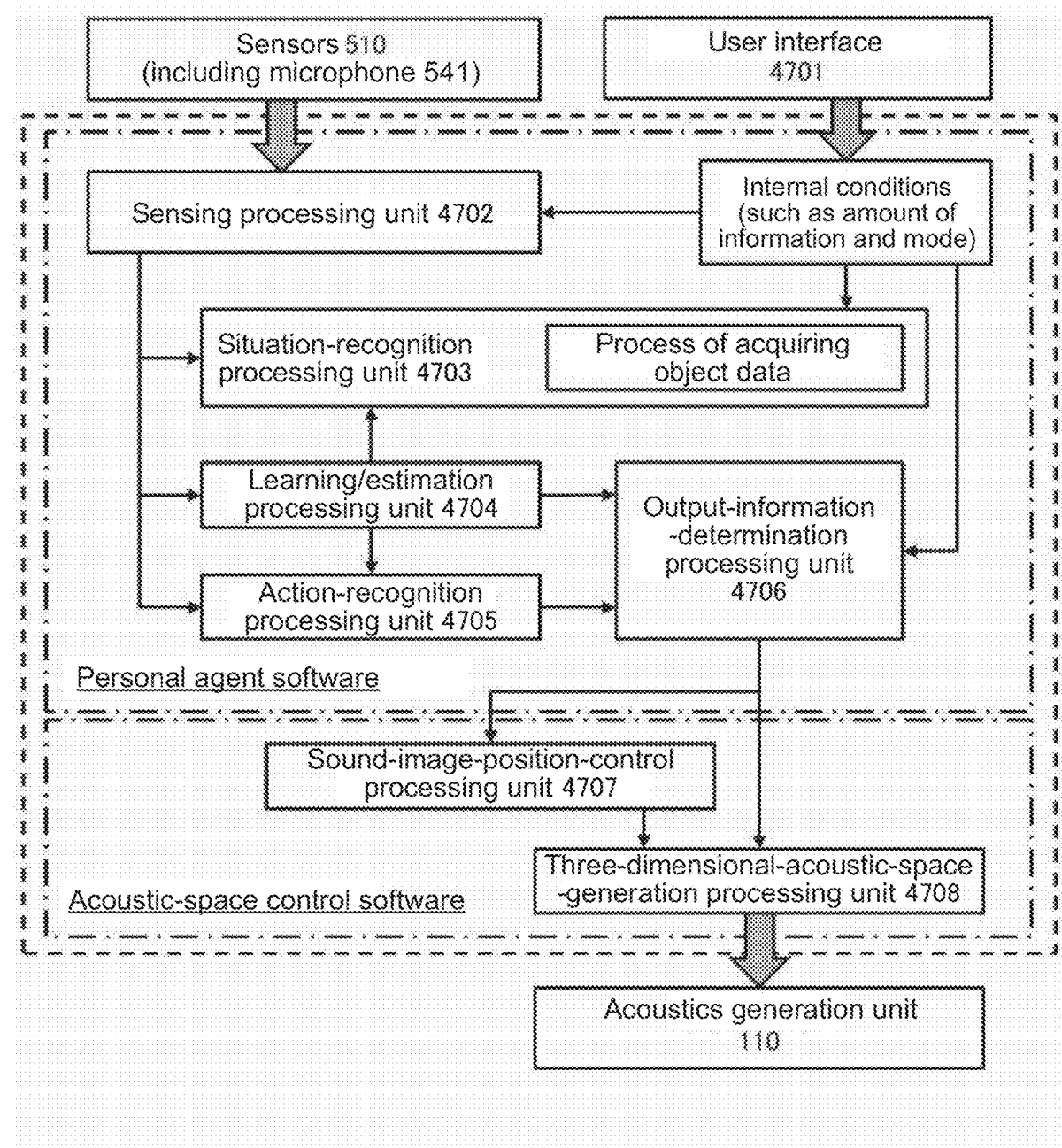
FIG. 47 is a diagram showing an example of relationships between processes by a personal agent and acoustic-space control software.

FIG. 47 shows an example of relationships between processes by the personal agent and acoustic-space control software. Note that, in FIG. 47, the sensors 510 (including microphone 541), a user interface 4701, and the acoustics generation unit 110 are main hardware of the information processing device 100. (The user interface 4701 may include the touch sensor 514, or may be the mechanical controller provided to the information processing device 100, such as the buttons or the switches. Alternatively, the user interface 4701 may include the user interface to be provided by the external device (such as smartphone) that cooperates with the information processing device 100.) Meanwhile, in FIG. 47, other processing blocks surrounded by dotted lines than those mentioned above basically represent software modules and data (internal conditions such as the amount of information and a mode, and data of recognized objects) to be read out from the memory 552 when the software modules executed by the processor such as the controller 551.

Note that, processes to be executed respectively by the components shown in FIG. 47 are executed in parallel to each other unless synchronization waiting is required mutually between the processes. Thus, when a multiprocessor is available, or when multi-threading can be implemented by an operating system (OS), all processing blocks that can be executed in parallel to each other can be read out to the memory, and executed in parallel to each other. For example, in the personal agent software, a sensing processing unit 4702 and an output-information-determination processing unit 4706 correlate to each other such that their processes mutually function as data buffers, and hence can always be executed in parallel to each other. A process by a situation-recognition processing unit 4703 and a process by an action-recognition processing unit 4705 can be similarly executed in parallel to each other.

The personal agent is capable of providing a function of artificial intelligence by causing the sensing processing unit 4702, the situation-recognition processing unit 4703, the action-recognition processing unit 4705, and a learning/ estimation processing unit 4704 to cooperate with each other. The function of the artificial intelligence can be provided by a part of the personal agent software, a controller as hardware (or a dedicated neural-network accelerator), or a combination of these software and hardware. It is desirable that a process of the function of the artificial intelligence be provided by a controller 5151 provided with the above-mentioned neural network accelerator 555, or the controller 551 that controls the neural network accelerator 555 as a separate entity. The controller 551 may execute processes such as the learning and the estimation (inference) with use of a neural network as some of the processes in the personal agent software.

When the personal agent acquires the input via the sensors 510 including the microphone 541, and acquires the internal-state data such as the mode selected by the listener via the user interface 4701 and the amount of information, the personal agent transmits these input data to the situation-recognition processing unit 4703, the action-recognition processing unit 4705, and the learning/estimation processing unit 4704. Note that, the learning/estimation processing unit 4704 may be optional, or its process may be executed only when necessary. A function of the learning is described in detail below. The situation-recognition processing unit 4703 acquires, in its process, information about the detected objects from a database (not shown). Note that, when the database is managed by the server device on the network such as the Internet (or cloud), the situation-recognition processing unit 4703 communicates with the server device via a communication interface such as the wireless module 553, thereby acquiring the information about the detected objects. The data of the objects and data of a recognized situation, which are acquired by the situation-recognition processing unit 4703, and data of the actions of the listener, which are recognized by the action-recognition processing unit 4705, are transmitted to the output-information-determination processing unit 4706. Note that, the situation-recognition processing unit 4703 and the action-recognition processing unit 4705 may perform the recognition, for example, by the estimation (inference) process with use of the learnt neural network.

In the output-information-determination processing unit 4706, for example, the estimation (inference) process with use of the neural network that the learning/estimation processing unit 4704 has learnt is executed as appropriate on the data transmitted thereto, the data including the internal-condition data such as the mode selected by the listener via the user interface 4701 and the amount of the information. With this, data necessary for the three-dimensional acoustic space is selected. For example, sound-source data of an object, which has determined to be output in the output-information-determination processing unit 4706, is transmitted to a sound-image-position-control processing unit 4707 of the acoustic-space control software. The sound-image-position-control processing unit 4707 calculates, for example, an effect of the movement of the position of the sound source by the acoustic-space rendering, and executes the process of localizing the sound image by setting the filter of the DSP 533 on the basis of data of the HRTF. Then, a sound in the three-dimensional acoustic space, which is finally generated by a three-dimensional-acoustic-space-generation processing unit 4708, is transmitted to the acoustics generation unit 110 being an audio output driver, and then is output as sound data to the ear of the listener through the tubular sound-guide portion 120.

Note that, the processes by the acoustic-space control software need to be executed in consideration of the HRTF at the ear of the listener, and hence it is appropriate for the software to run while being stored in the memory 552 in the information processing device 100 including the microphone 541 and the acoustics generation unit 110. However, with regard to the other processes by the personal agent software (such as provision of the object information based on the object recognition), some or all of their respective processing blocks may be executed in a proxy process by the agent in the external device (such as smartphone) that cooperates with the information processing device 100, or in the server device on the network such as the Internet (or cloud). In addition, although it is desirable that the database of the data of the objects be stored in the storage managed by the server device, the database may be stored in a memory in a personal device that the listener uses, such as the external device (such as smartphone) that cooperates with the information processing device 100.

Now, an example of procedures by the agent, which are executed in the information processing device 100, is described. Note that, in the information processing device 100, the agent repeats the following processing steps after the power has been turned on.

(Step 1)

In the sensing processing unit 4702, three processes, specifically, a depth process (process on the depth data received via the depth sensor 512), an image process (process on the image data received via the image sensor 513), and an object detection process (process on the data of the detected objects, which have been received via the object detection sensor 511) are executed in parallel to each other. When the controller 551 such as the MPU includes a multi-core processor, real parallel processing is executed. When the controller 551 includes a single-core processor, pseudo-parallel processing (multi-processing or multi-thread processing) is executed by a scheduler of the OS. As the depth process, a process of converting, through filtering, depth data captured via the depth sensor 512 to information that facilitates management of a depth information of the space (such as a voxel grid) is executed. In this way, a depth-map information is generated. As the image process, an image recognition process is executed to recognize the objects, whereby information about the recognized objects are generated. As the object detection process, an object that may collide is detected around the user, whereby information about the recognized object is generated. Some or all of these processes may be executed by the server device on the network such as the Internet (or cloud), or by the external device (such as smartphone) that cooperates with the information processing device 100.

(Step 2)

In parallel to the sensing procedure by the sensing processing unit 4702, the situation-recognition processing unit 4703 executes a situation recognition procedure. The situation recognition procedure includes recognizing the objects on the basis of the object information and the depth-map information generated by the sensing processing unit 4702. In order to extract the information about the recognized objects, an object-data acquisition process in subsequent Step 3 (described below) is called. Some or all of these processes may be executed by the server device on the network such as the Internet (or cloud), or by the external device (such as smartphone) that cooperates with the information processing device 100.

(Step 3)

In the object-data acquisition process, an object that is probably highly interesting to the listener is selected from the recognized objects, information about a sound source of this target object is acquired from the database. A part or an entirety of this process may be executed by the server device on the network such as the Internet (or cloud), or by the external device (such as smartphone) that cooperates with the information processing device 100. When the object-data acquisition process is executed on the outside of the information processing device 100, specifically, in the server device, the database is stored in the storage on the network, which is connectable to the server device via wireless or wired communication, such that the server device and the like can acquire the data from this database.

(Step 4)

The output-information-determination processing unit 4706 acquires the information about the selected sound source (acquires the information via the memory 552 or a communication line in the object-data acquisition process). This sound-source information includes, for example, information about a position of the detected object based, for example, on a distance to the object (position information registered with the database when the object is an object fixed in position, such as the elevator), and data of the sound source registered in association with the object.

(Step 5)

The sound-image-position-control processing unit 4707 maps the listener and the object to positions in the three-dimensional acoustic space on the basis of a current-position information of the listener and the acquired position-information of the object, and calculates a movement trajectory of a defined sound image (such as an image of possession of the object) between the two mapped positions.

(Step 6)

In a three-dimensional-acoustic-space generation procedure, three-dimensional acoustic data is generated by controlling an acoustic space filter such that the sound image is localized while the sound source is moved along the trajectory generated in preceding Step 5. At this time, the three-dimensional-acoustic-space-generation processing unit 4708 executes also a filtering process in consideration of the individual HRTF of the listener. In addition, the generated acoustic-data is acoustically output from the speaker 544. (Alternatively, the acoustic data is converted by the acoustics generation unit 110 into acoustics formed of physical vibration, and then is output to the ear of the listener via the sound guide portion 120.)

Now, an example in which the procedures by the personal agent are controlled from four viewpoints, specifically, the sound mode, the sensing mode, the guidance mode, and the information amount control.

Figure 48:
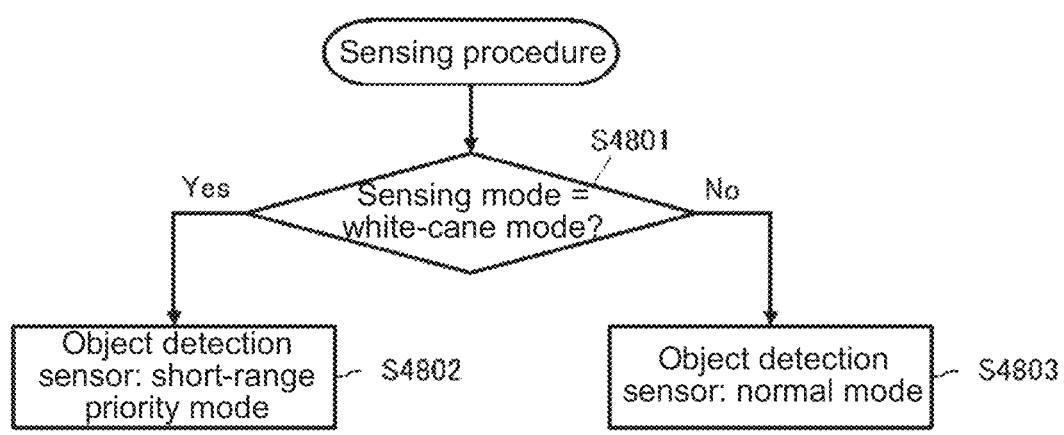
FIG. 48 is a flowchart showing a sensing procedure.

FIG. 48 shows, as a flowchart, the sensing procedure that the personal agent causes the sensing processing unit 4702 to execute in (Step 1) described above.

First, the personal agent checks whether the sensing mode of the information processing device 100 is the white-cane mode (Step S4801).

Then, when the information processing device 100 is in the white-cane mode (Yes in Step S4801), the personal agent sets the object detection sensor 511 to a short-range priority mode (Step S4802). As described above, in the white-cane mode, the object detection in the short range from the user is prioritized (refer, for example, FIG. 28). Thus, the mode of the object detection sensor 511 is set to the "short-range priority mode." Specifically, when the information processing device 100 can use both the millimeter-wave radar and the ultrasonic sensor as the object detection sensor 511, the millimeter-wave radar is turned off (or set to an enabled mode), and the ultrasonic sensor is turned on (or set to a disabled mode) such that detection of proximate objects by the ultrasonic sensor can be preferentially performed. Alternatively, when the information processing device 100 is provided only with the millimeter-wave radar as the object detection sensor 511, a range of the millimeter-wave radar may be set to a short range such that the object detection is performed with low power consumption.

Meanwhile, when the information processing device 100 is not in the white-cane mode (or in the normal mode) (No in Step S4801), the personal agent sets the mode of the object detection sensor 511 to a "normal mode" (Step S4803). In this case, the object detection sensor 511 need not necessarily perform detection only in normal short ranges, and a long-range sensor may be used such that the object detection can be performed to a maximum extent. Alternatively, when the information processing device 100 can use a plurality of object detection sensors, all of these sensors may be set to an enabled mode.

Figure 49:
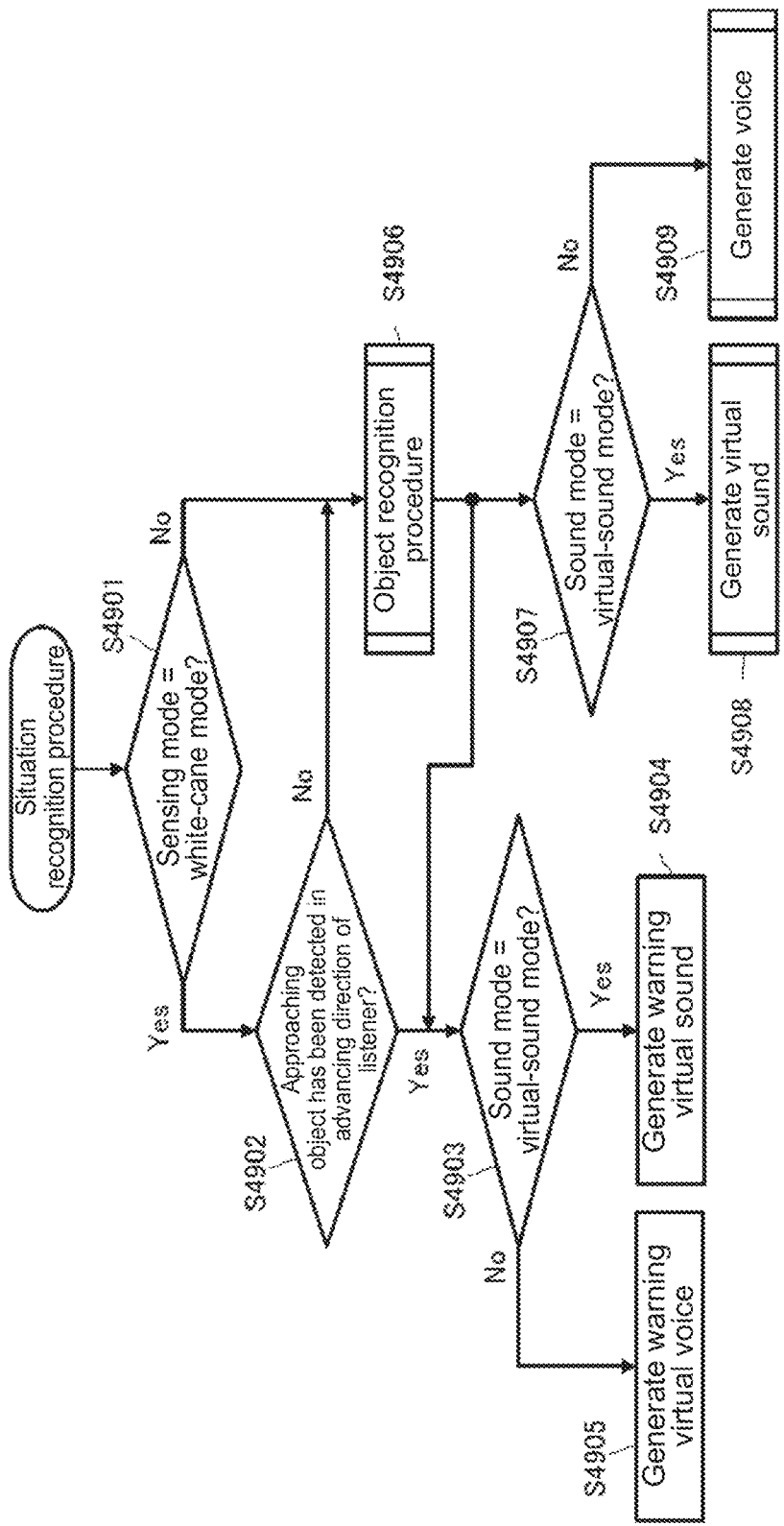
FIG. 49 is a flowchart showing a situation recognition procedure.

FIG. 49 shows, as a flowchart, the situation recognition procedure that the personal agent causes the situation-recognition processing unit 4703 to execute in (Step 2) described above.

First, the personal agent checks whether the sensing mode of the information processing device 100 is the white-cane mode (Step S4901).

Then, when the information processing device 100 is in the white-cane mode (Yes in Step S4901), the personal agent executes a process of detecting whether the object that may collide is present in an advancing direction of the listener (Step S4902).

When the object that may collide is detected in the advancing direction of the listener (Yes in Step S4902), the personal agent additionally checks whether the sound mode of the information processing device 100 is the virtual-sound mode (Step S4903). Meanwhile, when the object that may collide is not detected in the advancing direction of the listener (No in Step S4902), the personal agent executes the object recognition procedure on the basis of, for example, the results of the detection by the object detection sensor 511 (S4906). After the personal agent has acquired information about the detected object, the personal agent checks the sound mode of the information processing device 100 (Step S4903). When the information processing device 100 is in the virtual-sound mode (Yes in Step S4903), the personal agent generates a warning virtual sound (Step S4904). Meanwhile, when the information processing device 100 is in the voice mode (No in Step S4903), the personal agent generates a warning virtual voice (Step S4905).

Meanwhile, when the personal agent is not in the white-cane mode but in the normal mode (No in Step S4901), the personal agent executes the object recognition procedure on the basis of, for example, the results of the detection by the object detection sensor 511 (S4906), thereby acquiring the information about the detected object. Then, the personal agent additionally checks whether the sound mode of the information processing device 100 is the virtual-sound mode (Step S4907). When the information processing device 100 is in the virtual-sound mode (Yes in Step S4907), the personal agent generates a virtual sound relating to the recognized object (Step S4908). Meanwhile, when the information processing device 100 is in the voice mode (No in Step S4903), the personal agent generates a virtual voice for notifying of the information about the recognized object (Step S4909).

Figure 50:
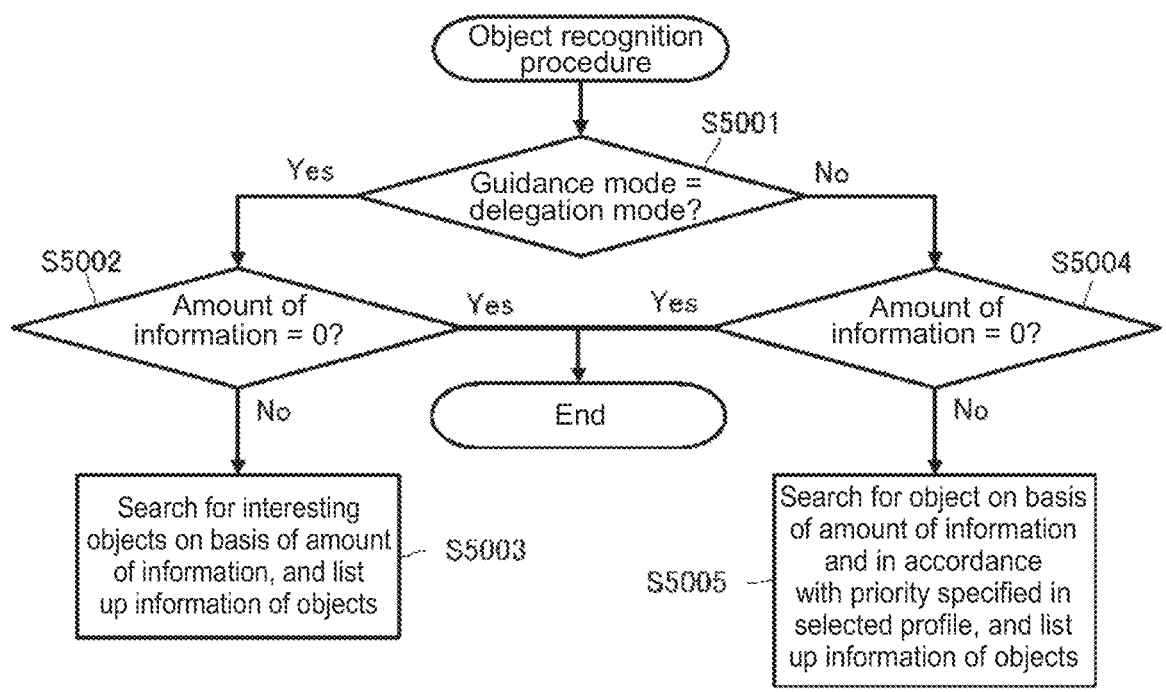
FIG. 50 is a flowchart showing an object recognition procedure.

FIG. 50 shows, as a flowchart, the object recognition procedure to be executed in Step S4906 in the flowchart shown in FIG. 49.

First, the personal agent checks the guidance mode of the information processing device 100 (Step S5001).

Then, when the guidance mode of the information processing device 100 is the delegation mode (Yes in Step S5001), the personal agent additionally checks whether the amount of information is 0 (Step S5002). When the amount of the information is 0 (Yes in Step S5002), the listener does not want sound information. Thus, the personal agent stops and ends the object recognition procedure. Meanwhile, when the amount of the information is not 0 (No in Step S5002), on the basis of the preset amount of information and by the recognition process (such as the image process) on the results of the detection by the sensors 510, the personal agent searches for objects that the personal agent is interested in (or wants to recommend to the listener), and lists up information about these objects (Step S5003).

Meanwhile, when the guidance mode of the information processing device 100 is not the delegation mode (No in Step S5001), the personal agent additionally checks whether the amount of the information, which is set under the information amount control via the user interface or the like by the listener, is 0 (zero) (Step S5004). When the amount of the information is 0 (zero) (Yes in Step S5004), the listener does not want sound information. Thus, the personal agent stops and ends the object recognition procedure. Meanwhile, when the amount of the information is not 0 (zero) (No in Step S5002), on the basis of the preset amount of information, in accordance with the priority specified in the selected profile, and by the recognition process (such as the image process) on the results of the detection by the sensors 510, the personal agent searches for objects, and lists up information about these objects (Step S5003).

After the object recognition procedure shown in FIG. 50 has been ended, the control returns to the situation recognition procedure shown in FIG. 49. Then, in Step S4907, whether the sound mode is the virtual-sound mode is checked, and the virtual sound (including voice) is generated on the basis of a result of the checking.

(D) Mode Selection Support by Learning Function

By causing the personal agent to be resident in the memory 552 of the information processing device 100 so as to monitor the actions of the listener, learning support for controlling the amount of information in the voice service or the sensing service to be provided to the listener can be implemented.

For example, the listener has selected the white-cane mode as the sensing mode, selected the delegation mode as the guidance mode, selected the virtual-sound mode as the sound mode, and set the information amount control to the "minimum." In this case, although virtual-sound information is provided in principle in the white-cane mode, the personal agent may respond with a virtually-generated voice information as appropriate only in a case where the listener makes a voice query.

In such a case where the personal agent, which has monitored the actions of the listener, recognizes a situation where the listener stays in a specific place for a predetermined time period or longer, the personal agent determines that the listener has been in a difficult situation, and the learning/estimation processing unit 4704 of the personal agent can be activated to learn this situation.

When the listener knows where he/she is, the listener does not query about the place. For example, in such a case where the listener, who knows that he/she is in front of a vending machine, remains not making a purchase action at the vending machine for a while, the listener says "Please indicate where canned coffee is." Since the white-cane mode has been selected, a sound source (its virtual sound image) is moved and localized to possess a button for the canned coffee.

In this case, the personal agent activates the neural network accelerator 555 so as to cause the learning/estimation processing unit 4704 to learn, or uses the learning function of the neural network in the controller 551 such as the MPU. With this, a position of the "vending machine" and a position of the "button for the canned coffee" are input and learnt as input-vector information. In such a way, the information processing device 100 can automatically execute the process of moving and localizing the sound image of the sound source such that the sound source possess the button for the canned coffee when the listener comes to the same place next time with the information processing device 100 set to the white-cane mode. When the learning/estimation processing unit 4704 has learnt a plurality of options with respect to the same "vending machine," a plurality of sound images of a plurality of sound sources may be localized to indicate a plurality of buttons. Alternatively, a sound image of the virtual sound may be moved and localized to possess a button that is likely to be pressed by the listener.

In the learning mode of the information processing device 100, a date, weather, a latest selection, and the like may be learnt as the input-vector information together with the information about the position of the corresponding object (such as vending machine). This allows the personal agent to move and localize the sound image of the virtual sound source so as to suggest that the listener press a predetermined button when the personal agent recognizes a similar situation (set of states defined by the position, the date, the weather, the latest selection, and the like) on the basis of the results of the detection by the sensors 510.

As a matter of course, when the personal agent run on the server device (such as processing device or storage (including memory)) on the network such as the Internet (or cloud) to be connected via wireless or wired communication, the server device may provide the learning function as described above.

2. Network System

Next, an audible-ability enhancement system that supports the provision of the services while communicating with the information processing device 100 is described.

The audible-ability enhancement system, which is a system that incorporates the information processing device 100 in a computer network system also called the "cloud," includes a large number of server devices (specifically, a cloud server, edge servers, a fog server, and the like) to be connected to the Internet, and IoT devices or the plurality of information processing devices 100, and the external devices (information terminals owned by the listener, such as the smartphone, the smartwatch, a tablet, and a personal computer) that cooperate with the information processing devices 100.

The personal agent can be selected automatically or manually in accordance with an environment. The personal agent may run as different personal agents, for example, on the server device on the network such as the Internet (or cloud), on computers of vehicles that the listener takes (automobile that the listener drives by himself/herself, or public transportation such as a bus and a train), or on computers installed in various electric appliances such as a home server, a television, and a refrigerator installed in a house of the listener. The personal agent may be automatically selected in accordance with an environment where the listener acts, or settings may be made such that connection to a selected one of the personal agents stored in advance in the memory 552 of the information processing device 100 is always established. In addition, the information processing device 100 stores information about connections to the server device on which these personal agents run.

Figure 56:
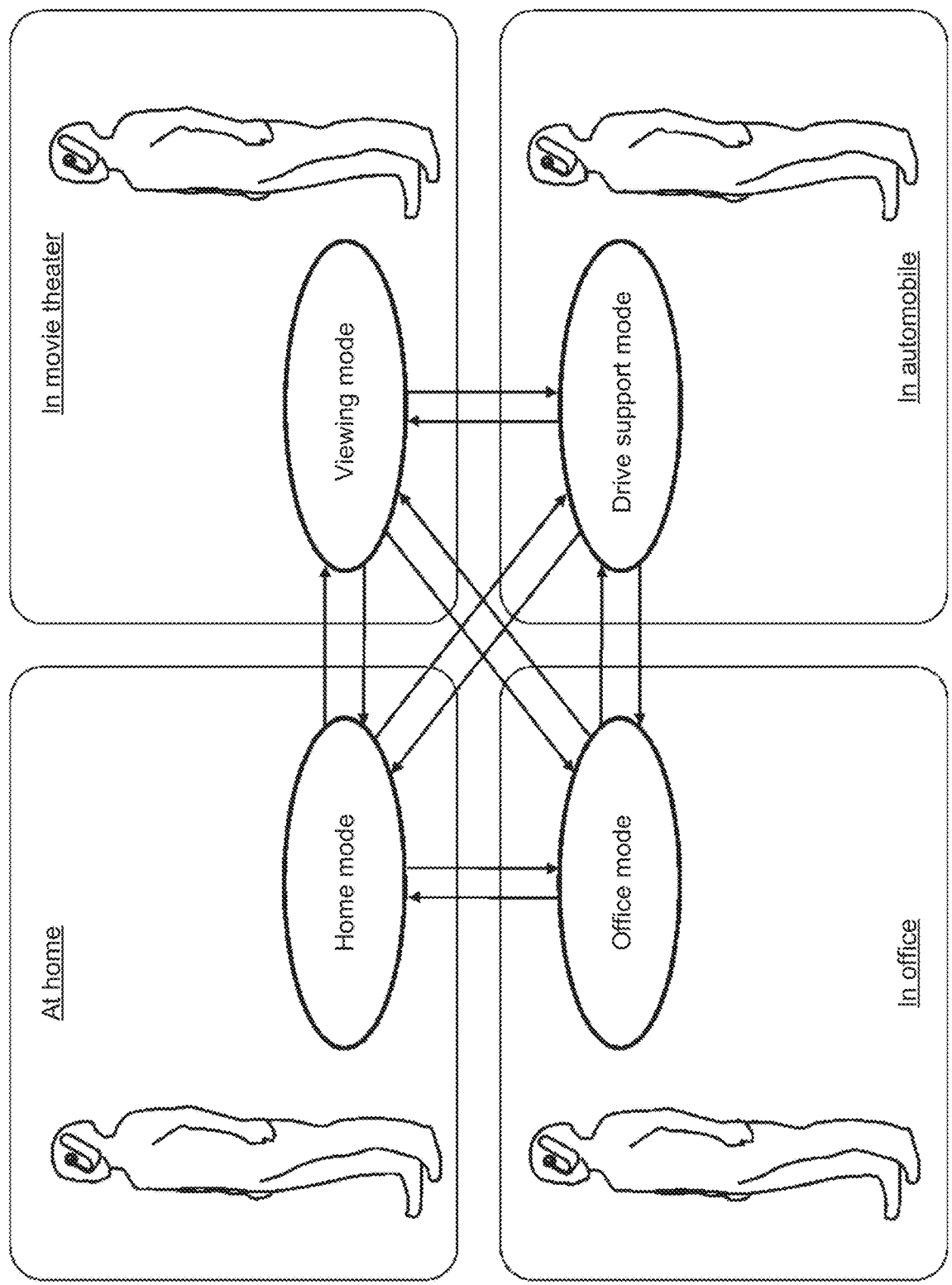
FIG. 56 is a diagram showing mode transitions of the information processing device 100.

When the personal agent is automatically selected, the profile selection mode also may be automatically selected. FIG. 56 shows mode transitions of the information processing device 100 in the profile selection mode. The personal agents also switch to each other in accordance with the mode switching of the information processing device 100. Specifically, the audible-ability enhancement system may be set such that a home personal agent functions and selects the home mode when the listener is at home, an office personal agent selects the office mode when the listener is in his/her office, a movie-theater-dedicated personal agent selects the viewing mode when the listener goes to movie theater, and an automobile-dedicated personal agent selects the drive support mode when the listener is in his/her automobile.

3. Programs

The computer programs for implementing the above-described audible-ability enhancement function include instructions that are executed by the processors such as the audio codec unit 530 and the controller 551 (more specifically, CPU, MPU, DSP, GPU, GPGPU, or a program processing device provided in a form of the neural network accelerator 555). The computer programs are stored and maintained in the memory 552 (ROM, SRAM, DRAM, flash memory, or SSD) that is readable by the controller 551. The memory 552, which is combined with circuit chips constituting the controller 551 such as the GPU and the neural network accelerator 555, may be implemented as a shared memory for allowing the large number of PEs included in each of the processing units to shear data in their respective processing units. In such a way, processes of calculations of acoustic spaces, calculations of neural networks, and the like can be executed at high speed and with high efficiency independently of an external memory or external processing units.

The programs are recorded on removable storage media such as a portable semiconductor memory and a DVD (Digital Versatile Disc), and are provided as what is called package media software.

Alternatively, the programs may be recorded in a storage device in a server device which is connected to the Internet and from which the programs can be downloaded. (The server device is accessible by specifying a location, for example, with a URL (Uniform Resource Locator), and is sometimes also called a Site.) The programs may be downloaded to the information processing device 100 via the Internet or a LAN (Local Area Network), specifically, via wireless communication such as Bluetooth (trademark) or Wi-Fi (trademark), or wired communication such as Ethernet (trademark) or USB (Universal Serial Bus).

Regardless of the acquisition methods, by recording the acquired program in the memory 552 and then installing this program as a program to be managed by an OS, the functions of the information processing device 100 according to this embodiment can be implemented, for example, by a general-purpose information terminal.

In short, the form of the computer program allows widespread use of the information processing device 100 according to this embodiment. As a result, various people including visually impaired persons can easily enjoy the audible-ability enhancement function to be provided by the information processing device 100.

4. Modifications

With regard to the description of the embodiment of the technology disclosed hereinabove, various other modifications are conceivable.

(1) Personal Agent

A character of the personal agent can be selected by the listener via the user interfaces. Data of the character includes items as follows. Although some of the items have been predefined, other ones of the items can be customized and set by the listener.

Type: Selectable from human (standard), registered special characters (specifically, characters in video games and animations), animals (cats and dogs), birds, and the like.

Gender: Selectable when the character type is human.

Age: Selectable when the character type is human.

Preference: Preferences of, for example, hobbies can be selected and input.

Temper: Selectable from gentle, active, and the like.

(Virtual) Audio Data: Data for generating virtual sounds to be used when the voice mode has been selected.

(a) Characteristics data of an average voice generated from a voice database when the human (standard) is selected as the character type, the voice database having accumulated the genders, the ages, and the preferences as the input items. (Characteristics data is data sufficient for reading out texts on the basis of data.)

(b) Characteristics data of voices of a real voice actor/actress who plays the character when the character type is the special character. Voices of a virtual voice actor/actress are generated on the basis of the characteristics data.

(c) Data that is not used by default when the character type is the animal. Refer to Data of Virtual Sounds.

(d) Automatically-generated data: a characteristics data of voices extracted as a result of analyses on given voice samples. Voices are virtually generated on the basis of the characteristics data. Voices are virtually generated on the basis of the characteristics data.

Virtual Sound data (except Virtual Voices): Data each including a frequency, a duration, a time-series data of sound-pressure sample values, or a virtual sound ID. The virtual sound ID is an identifier associated with virtual-sound information registered with a virtual sound database. The virtual sound is used, when the virtual-sound mode has been selected, as a basic virtual sound to be emitted by the personal agent for notifying of presence of the personal agent. When unnecessary, the virtual sound may be stopped by an input from the listener or may be prevented to be generated from the beginning.

(a) Data that is not generated by default when the character type is the human (standard).

(b) Data that is not generated by default when the character type is the special character. Sound effects of animations and the like may be registered respectively for situations, and a mode in which the sound effects are generated as appropriate in accordance with recognized situations may be selected.

(c) Virtual sounds to be generated in accordance with the recognized situations may be defined when the character type is the animal or the bird. When the character type is the dog, a virtual sound such as that to be generated by a sound source of a dog dancing around the listener can be generated as a sound to be generated when the function of the character of the personal agent is implemented in the white-cane mode.

The data of the virtual sounds (including voices) are registered in association with character IDs. Thus, when a specific character ID is selected, services can be provided by using a specific virtual sound (including voice).

(2) Attributes of Virtual Sound Sources in Accordance with Characteristics of Objects The virtual sound source may be switched in accordance with properties and attributes of objects to possess. For example, when the listener takes the elevator, a virtual sound "swoosh" emitted from the foot in a direction to the elevator may be switched to a "ting" like an arrival sound of the elevator at a time point when the virtual sound source possesses the elevator. Such characteristics may be provided as a preset profile in advance or may be provided as a profile that can be changed by the listener via the user interface such as that of the smartphone.

(3) Control of Number of Virtual Sound Sources

In the embodiment described hereinabove, the function to control the number of the voice messages of the personal agent is described. Meanwhile, the virtual sound sources may be generated in accordance with the number and types of the objects identified on the basis of the results of the detection by the sensors 510 in an environment, and the sound images thereof may be localized. It is possible to provide a control function to allow the listener to manually (for example, by gestures) or automatically control the number of these sound sources in accordance, for example, with his/her preference and usability when the objects that can be identified in the environment are large in number and various in type, and at the same time when the number of the virtual sound sources is excessively large. As a method of thinning out the number of the virtual sound sources, the following functions can be provided.

Allow the listener to manually and explicitly turn off a specific virtual-sound source. For this control, the listener only needs to make a gesture of touching and pushing away a position of a sound presented by the virtual sound source. When the position of the hand of the user, which is recognized with use of the TOF sensor or a stereo camera, substantially overlaps with a direction to the virtual sound source, a predetermined one of the virtual sound sources may be turned off.

Turn on a virtual sound source relating to an object approaching the listener and turn off a virtual sound source relating to an object moving away from the listener.

Turn on virtual sound sources in a place to which the listener has never been or in a place that the listener scarcely knows and turn off virtual sound sources in a place to which the listener has ever been or in a place that the listener knows well.

Turn on virtual sound sources relating to the objects that the personal agent is interested in or wants to recommend to the listener and turn off virtual sound sources relating to objects that the personal agent is not interested in or need not recommend to the listener.

(4) Autonomous Mobile System as Application of White-Cane Mode

The white-cane mode of the information processing device 100 may be combined with the external devices. Specifically, an audible-ability enhancement system in which an autonomous mobile device such as an autonomously movable robot or an unmanned aerial vehicle (drone) capable of autonomous flight, which corresponds to the sensors 510 or the situation-recognition processing unit 4703, is combined with the information processing device 100 can be established.

In this case, other external devices that cooperate with the white-cane mode when the white-cane mode is selected as the sensing mode of the information processing device 100 may be additionally selectable. Specifically, external devices that cooperate with the information processing device 100 to be operated in the white-cane mode are registered. More specifically, via a white-cane-mode setting screen to be provided by the user interface of the crisis provided with a display, such as the smartphone, external devices that are connectable via short-range wireless communication such as Bluetooth (registered trademark) can be selected as the devices that cooperate in the white-cane mode. The external devices set to cooperate with the information processing device 100 in the white-cane mode need not necessarily cooperate therewith when the information processing device 100 is operated in the normal mode. The following devices can be exemplified as the external devices that can cooperate in the white-cane mode.

General-purpose and personal devices such as the smartphone

Head-mounted devices such as the eyewear (smart glasses, VR glasses, and AR glasses) (The function enhancement portion 1402 in FIG. 16 also belongs to this type.)

Devices to be worn on parts other than the head, such as the smartwatch and the shoulder wear Special-purpose handheld devices such as a cane-type device Autonomous mobile devices such as the mobile robot and the drone (operated on the ground, underground, in the air, and underwater)

Of the above-mentioned devices, the autonomous mobile devices such as the mobile robot and the drone are different from the devices of the other types, for example, in drive system of moving means (such as motors, wheels, legs, and propellers) and in housing structure. However, other parts such as the sensors, the hardware, and the software that processes, for example, the results of the detection by the sensors are substantially the same as those of the above-described information processing device 100. Thus, the autonomous mobile devices such as the mobile robot and the drone can be caused to cooperate with the information processing device 100 as external devices that assist listeners to collect information or achieve other purposes.

By causing the external devices to cooperate with the information processing device 100, at least the following two main advantages can be obtained.

Reduce battery consumption of the information processing device 100.

Reduce processing load of the information processing device 100.

Figure 51:
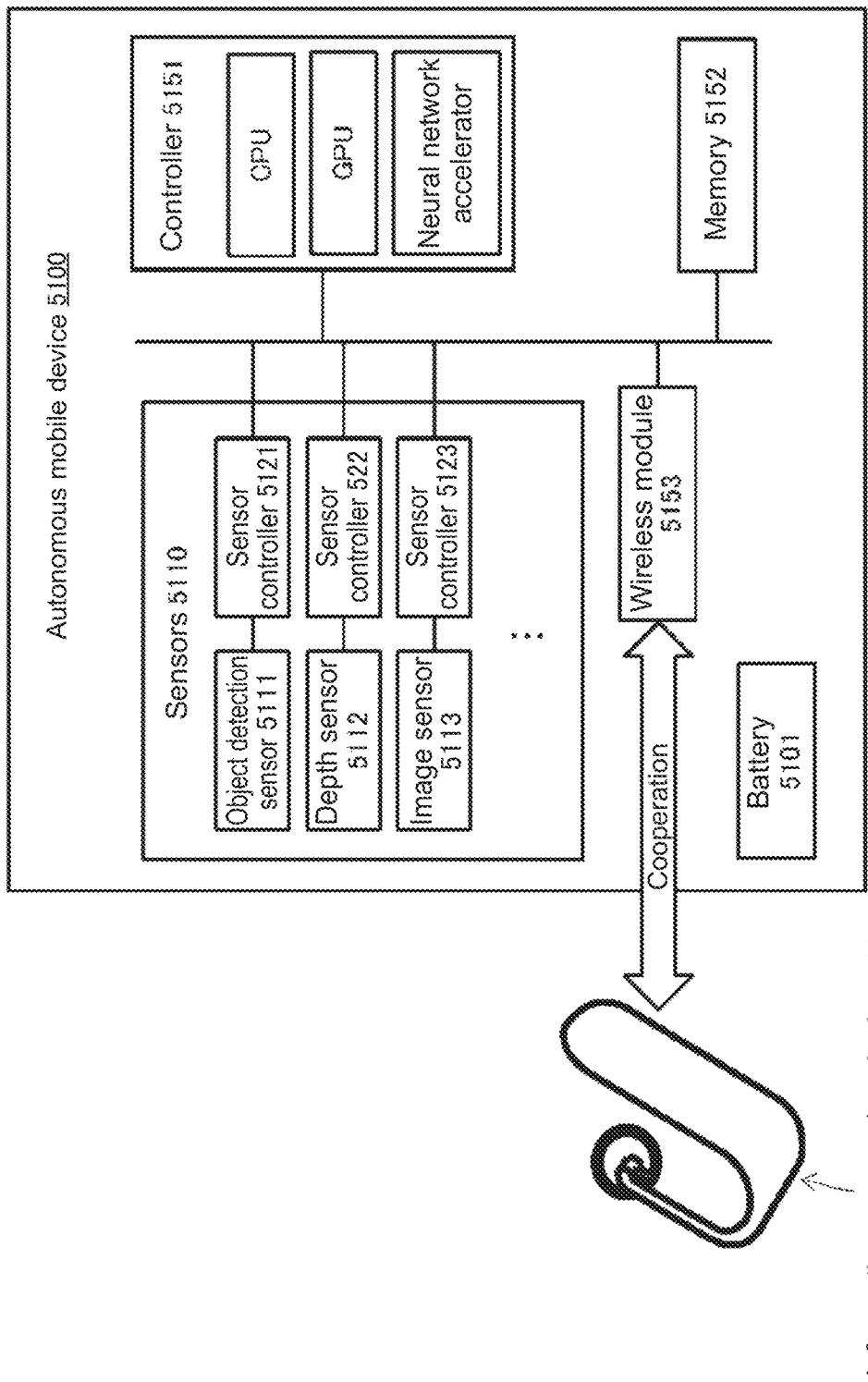
FIG. 51 is a diagram showing a functional configuration example of an autonomous mobile device 5100 that cooperates with the information processing device 100.

FIG. 51 shows a functional configuration example of an autonomous mobile device 5100 that cooperates with the information processing device 100. In the example shown in FIG. 51, many of sensor elements and sensor controllers being ones of sensors 5110 are installed in the autonomous mobile device 5100, and recognition process based on results of detection by the sensors 5110 are executed on the autonomous mobile device 5100 side. (Although not shown, the sensors 5110 include the microphone 541 (described above).) In addition, results of the recognition are provided to the information processing device 100 via pairing communication with the autonomous mobile device 5100. Thus, the battery consumption and the processing load of the information processing device 100 can be regarded as being reduced lower than those in the configuration example of the information processing device 100 shown in FIG. 7.

The controller 5151, which is a processor to execute computer programs, collectively controls operations of an entirety of the autonomous mobile device 5100. The controller 5151 includes, as appropriate, the processor such as the CPU, the GPU, or the neural network accelerator.

A battery 5101, which is controlled by a battery controller (not shown), supplies power to all hardware modules in the autonomous mobile device 5100.

A wireless module 5153, which includes the communication RF (Radio Frequency) circuit according to the communication standards such as Bluetooth (trademark) and Wi-Fi (trademark), is connectable, in accordance with such communication standards, to the information processing device 100 that cooperates (or is paired) therewith. With this, control instructions and data can be exchanged.

A memory 5152 includes the ROM, the SRAM, the DRAM, the flash memory, the SSD, and the like. The memory 5152 stores therein computer programs (software) to be executed by the controller 5151, and various data to be used at the time of the execution of the programs.

For example, the memory 5152 stores therein information necessary for wireless connection (address information for making an access to the information processing device 100, such as the MAC address), and information about the pairing with the information processing device 100 to be connected via Bluetooth (trademark) communication. The autonomous mobile device 5100 is capable of being connected to the information processing device 100 in the earpiece shape with use of the connection information, and of providing the functions of the sensors, and the functions of the situation recognition, the object recognition, and the like for the audible-ability enhancement of the listener to the information processing device 100.

The sensors 5110 include various sensor elements such as an object detection sensor 5111, a depth sensor 5112, and an image sensor 5113. Although not shown, the sensors 510 may also include at least one of the GPS that acquires position information, the acceleration sensor or the gyroscopic sensor that detects movements of the autonomous mobile device 5100, the temperature sensor that detects an ambient temperature, or the like. Respective detection signals from the sensors 5111, 5112, 5113, . . . are subjected to signal processes respectively by corresponding ones of sensor controllers 5121, 5122, 5123, . . . and then output as digital detection signals.

Figure 52:
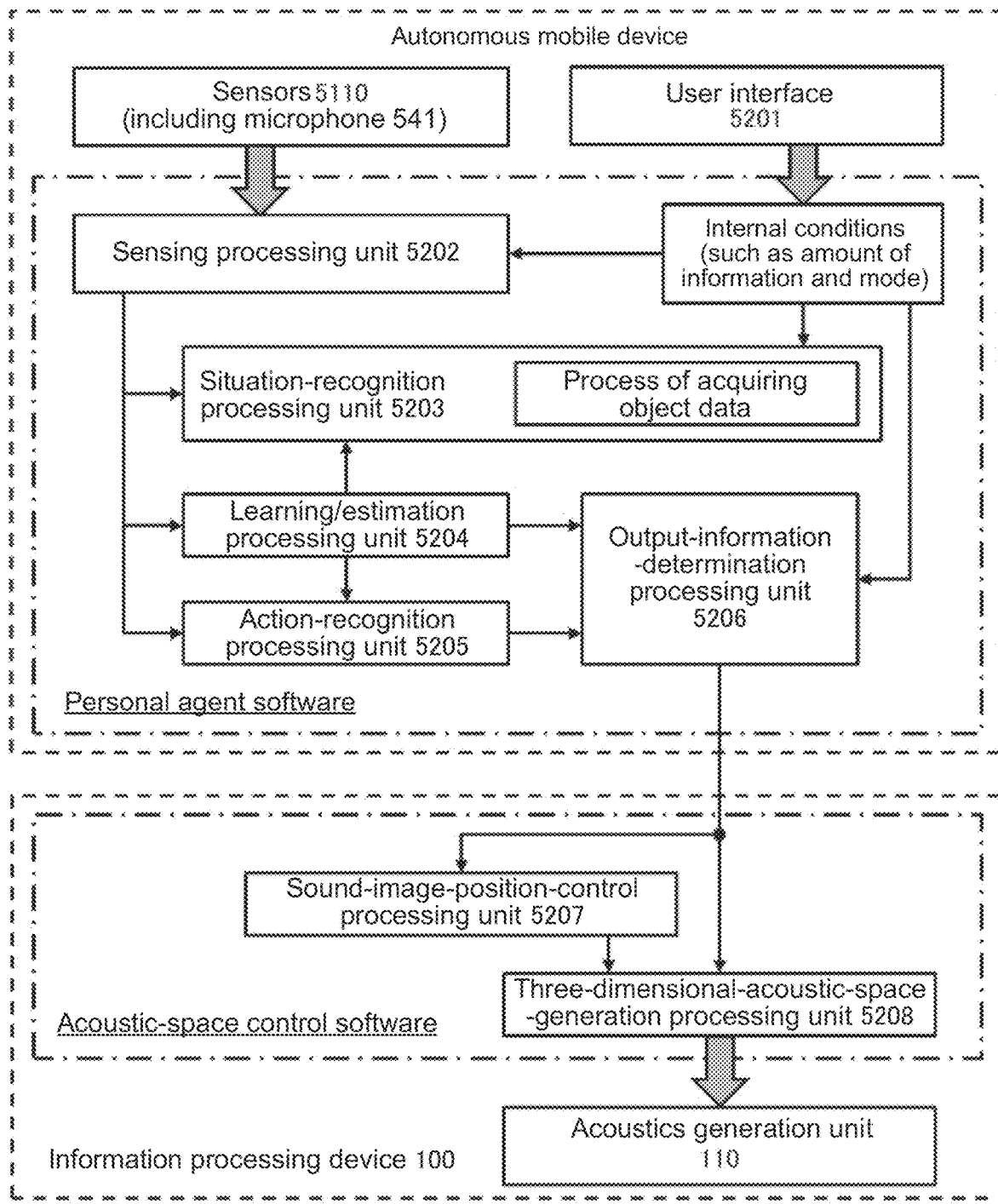
FIG. 52 is a diagram showing an example of a cooperation procedure by software of the autonomous mobile device 5100 and software of the information processing device 100.

In addition, FIG. 52 shows an example of a cooperation procedure by software of the autonomous mobile device 5100 and software of the information processing device 100. In the example shown in FIG. 52, the personal agent software runs on the autonomous mobile device 5100, and the acoustic-space control software runs on the information processing device 100. Thus, the processing load of the information processing device 100 can be regarded as being reduced lower than that in the software processing example shown in FIG. 47, in which both the personal agent software and the acoustic-space control software run on the information processing device 100.

When the personal agent acquires input via the sensors 5110 including the microphone 541, the personal agent transmits data of the input to a situation-recognition processing unit 5203, an action-recognition processing unit 5205, and a learning/estimation processing unit 5204. Note that, the learning/estimation processing unit 5204 may be optional, or its process may be executed only when necessary. The situation-recognition processing unit 5203 acquires, in its process, information about detected objects from a database (not shown). Note that, when the database is managed by the server device on the network such as the Internet (or cloud), the situation-recognition processing unit 5203 communicates with the server device via a communication interface such as the wireless module 5153, thereby acquiring the information about the detected objects. The data of the objects and data of a recognized situation, which are acquired by the situation-recognition processing unit 5203, and data of the actions of the listener, which are recognized by the action-recognition processing unit 5205, are transmitted to an output-information-determination processing unit 5206. Note that, the situation-recognition processing unit 5203 and the action-recognition processing unit 5205 may perform the recognition, for example, by the estimation (inference) process with use of the learnt neural network.

In the output-information-determination processing unit 5206, for example, the estimation (inference) process with use of the neural network that the learning/estimation processing unit 5204 has learnt is executed as appropriate on the data transmitted thereto, the data including the internal-condition data such as the mode selected via the information processing device 100 and the amount of the information. With this, data necessary for the three-dimensional acoustic space is selected. For example, sound-source data of an object, which has determined to be output in the output-information-determination processing unit 5206, is transmitted to a sound-image-position-control processing unit 5207 of the acoustic-space control software. The sound-image-position-control processing unit 5207 calculates, for example, the effect of the movement of the position of the sound source by the acoustic-space rendering, and executes the process of localizing the sound image by setting the filter of the DSP 533 on the basis of the data of the HRTF. Then, a sound in the three-dimensional acoustic space, which is finally generated by a three-dimensional-acoustic-space-generation processing unit 5208, is transmitted to the acoustics generation unit 110 being the audio output driver, and then is output as sound data to the ear of the listener through the tubular sound-guide portion 120.

When the cooperation of the information processing device 100 in the white-cane mode and the mobile robot is selected, a character type of the personal agent for the mobile robot is set. When the selected mobile robot is a dog-type robot, the character type of this personal agent is set to the "dog" at the time of starting the cooperation with the mobile robot.

The mobile robot is configured to check the position of the listener on the basis of the results of the detection by the GPS and the sensors 510, and to move ahead the listener while keeping predetermined positions from the listener and in accordance with the movement of the listener. As understood from FIG. 52, the personal agent of the mobile robot executes a sensing procedure, a situation recognition procedure, and an object recognition procedure. The sensing procedure and the situation recognition procedure are similar to the procedures to be executed by the personal agent of the information processing device 100 (refer to FIG. 47).

Figure 53:
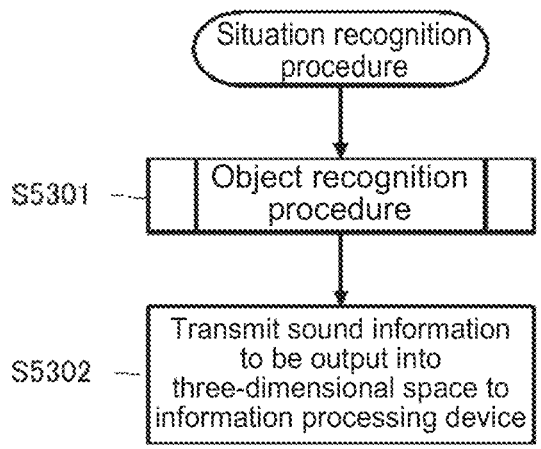
FIG. 53 is a flowchart showing a situation recognition procedure to be executed by a personal agent of the autonomous mobile device.

FIG. 53 shows, as a flowchart, the situation recognition procedure to be executed by the personal agent of the autonomous mobile device. The personal agent executes the object recognition procedure (Step S5301), and then transmits, to the information processing device 100 via, for example, wireless communication, object sound information (such as data of a sound source and data of a position of the sound source) to be output into the three-dimensional acoustic space to be reproduced by the cooperating information-processing device 100 (Step S5302).

Figure 54:
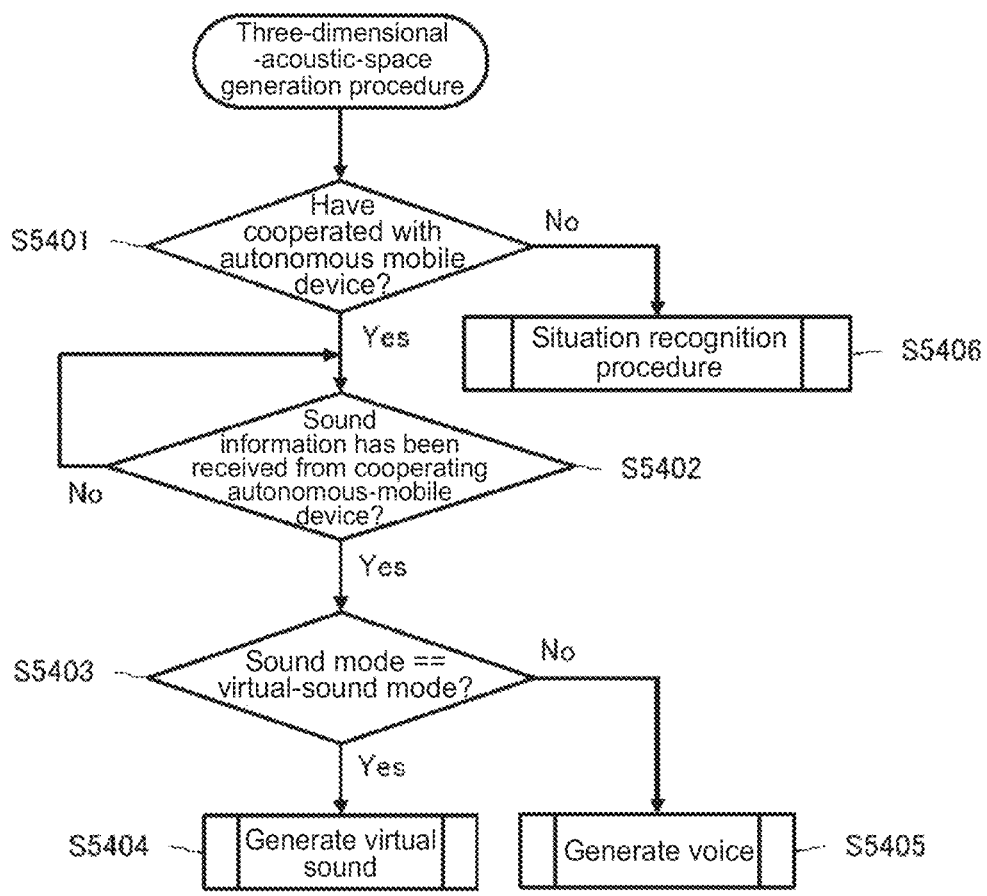
FIG. 54 is a flowchart showing a three-dimensional-acoustic-space generation procedure.

FIG. 54 shows, as a flowchart, a three-dimensional-acoustic-space generation procedure to be executed by the personal agent on the information processing device 100 side.

First, the personal agent checks whether the information processing device 100 has cooperated with the autonomous mobile device (Step S5401). Then, when the information processing device 100 has not yet cooperated with the autonomous mobile device (No in Step S5401), the information processing device 100 executes the situation recognition procedure on the basis of the results of the detection by the sensors 510 (Step S5406).

Meanwhile, when the information processing device 100 has cooperated with the autonomous mobile device (Yes in Step S5401), the personal agent waits for the sound information from the cooperating autonomous-mobile device (No in Step S5402).

Next, when the information processing device 100 receives the sound information from the autonomous mobile device (Yes in Step S5402), the personal agent additionally checks whether the sound mode of the information processing device 100 is the virtual-sound mode (Step S5403). When the information processing device 100 is in the virtual-sound mode (Yes in S5403), the acoustic-space control software generates a virtual sound (Step S5404). When the information processing device 100 is in the voice mode (No in Step S5403), a certain information is provided as a virtually generated voice.

(5) Other Modifications

When the listener encounters a queue, the information processing device 100 generates a virtual sound from the foot of the listener, and moves and localizes a sound image of this virtual sound such that the sound image possesses a tail end of the queue.

Generate a virtual sound with a sound source that emphasizes something that the personal agent is interested in, or something that the personal agent wants to recommend to the listener, and moves and localizes a sound image such that the sound image, for example, turns around the body of the listener, and then possesses something.

In the travel mode, when the listener is at a place somewhat away (for example, approximately 1 km) from a destination (for example, high-rise building), a virtual sound is generated, and its sound image is moved and localized in a manner that the sound image flies toward the high-rise building being the destination and disappears into the sky. The listener is allowed to proceed while grasping an approximate direction to the destination from the direction in which the virtual sound has headed. In addition, by gradually lowering an altitude of the flying virtual sound when the listener has approached the destination, an impression that the listener has approached the destination can be given to the listener.

When a determination that the listener has visited a place for the first time is made on the basis of a history of the listener, which has been recorded, for example, by the GPS, the guidance mode of the information processing device 100 is automatically turned on such that, for example, an explanation of the place is made.

When the listener goes to a vending machine, the information processing device 100 generates a virtual sound, and moves and localizes a sound image of this virtual sound such that the virtual sound possess a button for a product that is recommendable to the listener. When a plurality of options (such as coffee, tea, and orange juice) that has already been learnt for the vending machine is available, the virtual sound is caused to possess a candidate button that has been randomly selected by using roulette or the like.

Turn on the learning function of the personal agent at a place where the listener visits for the first time, or when the listener experiences the sound-image localization for the first time.

Even when the amount of the sound information is significantly limited, the server device may manage a list of all the recognized objects in a database in association with recognized places and information about time points. In this case, a "voice reproduction" function may be provided such that, when the listener has time, the listener can receive voice information services about the objects recognized by the sensors on that day. In this case, the user interfaces may provide, for example, a "voice reproduction" button (including not only a hardware button but also a button to be provided via the GUI by software) such that the listener can receive, by pressing the "voice reproduction" button, the information about the objects recognized by the sensors on that day. In addition, also in this case, when the listener feels that the amount of the information is large, the listener can control, via user interfaces for the "information amount control," the amount of the sound information (information to be provided as virtual sounds (including voices)).

Note that, with regard to the terms such as the "sound ID," the "virtual sound ID," the "character ID," and the "object ID" used herein, there are no problems as long as these IDs are the UUIDs, and as long as the "sound," the "virtual sound," the "character," the "object," and the like are regarded as types of data structures to which the UUIDs are assigned. For example, an object of the elevator described above is defined as shown in FIG. 55. In the example shown in FIG. 55, not only definitions that the identifier of the elevator switch is "EVSW0340," the elevator is a subclass of "object," and the identifier of the basic sound source of the elevator is "OS9470," but also definitions that the identifier of the basic sound source of the elevator is "OS9470" and the PCM sound source is a subclass of "sound source," and definitions of a data size of the sound-source data, and a data block of the PCM sound-source data are made.

INDUSTRIAL APPLICABILITY

Hereinabove, the technology disclosed herein has been described in detail with reference to the specific embodiments. However, it is clear that persons skilled in the art may modify or substitute the embodiment within the gist of the technology disclosed herein.

The information processing device to which the technology disclosed herein is applied is a voice-information processing device or a voice-information processing system mainly having a function to present sound information (information to be provided as voices or virtual sounds). However, from a viewpoint of having the function to enhance an audible ability of a listener in a three-dimensional acoustic space as described below, in another aspect, the information processing device is also an "audible-ability enhancement device." Further, in still another aspect, the information processing device has a function of a hearing aid. Still further, herein, the advantages unique to the invention are described in association with description of underlying technologies, and the technology disclosed herein is not limited to the invention described in Claims.

In short, the technology disclosed herein has been described by way of exemplification, and interpretation of the content described herein should not be limited. In order to determine the gist of the technology disclosed herein, Claims should be referred to.

Note that, the technology disclosed herein may also adopt the configurations as follows.

(1) An information processing device, including:
  a sensor that detects an object;
  an open ear style earpiece that is worn on an ear of a listener, and includes
    an acoustics generation unit, and
    a sound guide portion that transmits a sound generated by the acoustics generation unit into an earhole; and
  a processing unit that processes sound information of a sound source, the sound information being generated by the acoustics generation unit,
    the processing unit
      acquiring the sound information of the sound source corresponding to the object detected by the sensor, and
      a process of localizing a sound image of the acquired sound source while varying a position of the sound image in accordance with a position in a three-dimensional acoustic space, the position in the three-dimensional acoustic space corresponding to a position of the detected object.

(2) The information processing device according to (1), in which the sound source generates a virtual sound, and the processing unit executes, with respect to a sound image of the sound source that generates the virtual sound, the process of localizing the sound image of the sound source while varying the position of the sound image.

(3) The information processing device according to (2), in which the virtual sound that is processed by the processing unit has characteristics that are distinguishable from characteristics of a sound that reaches an eardrum through an opening portion of the open ear style earpiece.

(4) The information processing device according to any of (1) to (3), in which the sensor has detection areas in accordance with sensing modes.

(5) The information processing device according to (4), in which the sensing modes include a normal mode in which the sensor performs the detection in a normal detection area of the sensor, and a white-cane mode in which the sensor performs the detection in a detection area smaller than the normal detection area in the normal mode.

(6) The information processing device according to (5), in which in the white-cane mode, the processing unit executes the process of localizing the sound image of the sound source while varying the position of the sound image when the sensor detects the object in a region in a predetermined range around the listener.

(7) The information processing device according to (5) or (6), further including an LED having a function to emit light beams in a plurality of colors, in which in the white-cane mode, the LED emits a light beam in a predetermined one of the plurality of colors.

(8) An information processing device, including:

a sensor that detects an object;

an open ear style earpiece that is worn on an ear of a listener, and includes an acoustics generation unit, and a sound guide portion that transmits a sound generated by the acoustics generation unit into an earhole; and a processing unit that processes sound information of a sound source, the sound information being generated by the acoustics generation unit, the processing unit acquiring the sound information of the sound source corresponding to information that relates to the object detected by the sensor and that are provided by an information providing unit, and a process of localizing a sound image of the acquired sound source while selecting a type of the sound information and while controlling an amount of the sound information.

(9) The information processing device according to (8), in which the type of the sound information is voice data or sound-source data.

(10) The information processing device according to (8) or (9), in which the processing unit controls the amount of the sound information in accordance with how frequently the sound of the sound-source data is generated.

(11) The information processing device according to (9) or (10), in which, in a case where the type of the sound information is the voice data, the sound information includes a character ID, and information about characteristics of a voice to be specified by the character ID.

(12) The information processing device according to (9) or (10), in which in a case where the type of the sound information is the sound-source data, the sound information includes at least one of a frequency, a duration, time-series data of sound-pressure sample values, or a sound ID.

(13) The information processing device according to (8), in which the information providing unit acquires, from a database, information to be specified from the object, and provides the information to be specified from the object.

(14) The information processing device according to (8), in which the information providing unit communicates with software than runs on a server device connected to Internet, and acquires and provides information that the server has specified from the object.

(15) The information processing device according to (8), in which the processing unit includes a personal agent.

(16) The information processing device according to (15), in which the personal agent provides a function of artificial intelligence.

(17) The information processing device according to (16), in which the function of the artificial intelligence is a calculation for learning or estimation (inference).

(18) The information processing device according to (8), further including a neural-network processing unit.

(19) The information processing device according to (18), in which the neural-network processing unit executes a process of a function of artificial intelligence.

(20) The information processing device according to any of (8) to (19), in which the processing unit further executes a process by the information providing unit under control by a personal agent.

(21) The information processing device according to (20), further including a memory that stores the information that relate to the object, in which the information providing unit reads out and provides the information that relates to the object from the memory.

(22) The information processing device according to (20) or (21), further including
a communication unit, in which
the information providing unit
queries a server device connected via the communication unit about the information that relates to the object, and
receives and provides the information that relate to the object from the server device.
(23) The information processing device according to (20) or (21), further including:
a communication unit; and
a microphone, in which
the information providing unit
queries a server device connected via the communication unit about the information that relates to the object by transmitting a voice of the listener, the voice being acquired via the microphone, and
receives and provides the information that relates to the object from the server device.
(24) The information processing device according to (23), in which
the information providing unit further receives, from the server device, relevant information corresponding to the voice, and
the processing unit
acquires the sound information of the sound source, the sound information being included in the relevant information, and
executes the process of localizing the sound image of the sound source.
(25) An information processing device, including:
an open ear style earpiece including
an acoustics generation unit that is arranged in a rear of an ear of a listener, and
a sound guide portion
that has a structure folded back from a rear of an auricle of the ear to a front of the auricle of the ear via a vicinity of an earlobe, and
that transmits a sound generated by the acoustics generation unit into an earhole;
a sensor that acquires external information; and
a processor, the information processing device being operated under a state in which any of a plurality of modes has been selected,
the processor
reproducing an external three-dimensional space on a basis of the external information acquired via the sensor,
generating virtual-sound information for causing the acoustics generation unit to generate the sound in accordance with the mode selected from the plurality of modes, and
localizing a sound image of a sound source that varies in position over time in the three-dimensional space.
(26) An information processing method, including:
a step of detecting an object;
a step of acquiring sound information of a sound source corresponding to the detected object;
a step of executing a process of localizing a sound image of the acquired sound source while varying a position of the sound image in accordance with a position in a three-dimensional acoustic space, the position in the three-dimensional acoustic space corresponding to a position of the detected object; and
a step of outputting a sound of the sound image from an open ear style earpiece including
an acoustics generation unit, and
a sound guide portion that transmits a sound generated by the acoustics generation unit into an earhole.
(27) An information processing method, including:
a step of detecting an object;
a step of acquiring sound information of a sound source corresponding to information that are provided in relation to the detected object;
a step of executing a process of localizing a sound image of the acquired sound source while selecting a type of the sound information and while controlling an amount of the sound information; and
a step of outputting a sound of the sound image from an open ear style earpiece including
an acoustics generation unit, and
a sound guide portion that transmits a sound generated by the acoustics generation unit into an earhole.

REFERENCE SIGNS LIST 100 information processing device
110 acoustics generation unit
120 sound guide portion
130 holding portion
501 battery
511 object detection sensor
521 sensor controller
512 depth sensor
522 sensor controller
513 image sensor
523 sensor controller
514 touch sensor
530 audio codec unit
531 ADC
532 DAC
533 DSP
534 interface controller
541 microphone
542 error microphone
543 microphone amplifier
544 speaker
545 speaker amplifier
551 controller
552 memory
553 wireless module
554 LED
555 neural network accelerator
1301 convolutional neural network (CNN)
1302 bus interface
1303 weight processing unit
1304 adder
1305 neural network post-processing unit
1306 shared buffer
1307 output processing unit
1400 audible-ability enhancement system
1401 body portion
1402 function enhancement portion
1411, 1412 connection terminal
1601 controller
1602 memory
1611, 1612 IC interface
1715 filter (HRTF)
1718 filter (acoustic-environment transfer function)
1720 sound-image-position-based HRTF database
1721 ambient acoustic-environment database
1722 user interface
1724 sound-image-position control unit
1725 acoustic-environment control unit 1726 microphone
1727 controller
1728 selection unit
1730 wireless communication unit
1750 server device
4701 user interface
4702 sensing processing unit
4703 situation-recognition processing unit
4704 learning/estimation processing unit
4705 action-recognition processing unit
4706 output-information-determination processing unit
4707 sound-image-position-control processing unit
4708 three-dimensional-acoustic-space-generation processing unit
5201 user interface
5202 sensing processing unit
5203 situation-recognition processing unit
5204 learning/estimation processing unit
5205 action-recognition processing unit
5206 output-information-determination processing unit
5207 sound-image-position-control processing unit
5208 three-dimensional-acoustic-space-generation processing unit

The invention claimed is:

1. An information processing device, comprising:
an open ear style earpiece that is worn on an ear of a listener;
an acoustics generation unit;
a sound output unit that transmits a sound generated by the acoustics generation unit into an earhole;
a communication unit configured to receive sound information of a sound source from a cooperating mobile device with a sensor; and
a processing unit configured to:
process the received sound information of the sound source, the sound information corresponding to an object detected by the sensor of the cooperating mobile device, and
localize a sound image of the sound source while varying a position of the localized sound image relative to a position of the detected object so that the listener can distinguish between real ambient sound and virtual sound.

2. The information processing device according to claim 1, wherein
the sound source generates a virtual sound, and
the processing unit is configured to execute, with respect to a sound image of the sound source that generates the virtual sound, the process of localizing the sound image of the sound source while varying the position of the sound image.

3. The information processing device according to claim 2, wherein
the virtual sound that is processed by the processing unit has characteristics that are distinguishable from characteristics of a sound that reaches an eardrum through an opening portion of the open ear style earpiece.

4. The information processing device according to claim 1, wherein
the sensor of the cooperating mobile device has detection areas in accordance with sensing modes.

5. The information processing device according to claim 4, wherein
the sensing modes include
a normal mode in which the sensor performs the detection in a normal detection area of the sensor, and
a white-cane mode in which the sensor performs the detection in a detection area smaller than the normal detection area in the normal mode.

6. The information processing device according to claim 5, wherein
in the white-cane mode, the processing unit is configured to execute the process of localizing the sound image of the sound source while varying the position of the sound image when the sensor detects the object in a region in a predetermined range around the listener.

7. The information processing device according to claim 5, further comprising
an LED having a function to emit light beams in a plurality of colors, wherein
in the white-cane mode, the LED emits a light beam in a predetermined one of the plurality of colors.

8. An information processing device, comprising:
an open ear style earpiece that is worn on an ear of a listener;
an acoustics generation unit;
a sound output unit that transmits a sound generated by the acoustics generation unit into an earhole;
a communication unit configured to receive sound information of a sound source from a cooperating mobile device with a sensor; and
a processing unit configured to:
process the received sound information of the sound source, the sound information corresponding to information that relates to an object detected by the sensor of the cooperating mobile device and provided by the cooperating mobile device, and
localize a sound image of the sound source while selecting a type of the sound information, while controlling an amount of the sound information and while varying a position of the localized sound source relative to a position of the detected object.

9. The information processing device according to claim 8, wherein
a type of the sound information is voice data or sound-source data.

10. The information processing device according to claim 9, wherein
the processing unit is configured to control the amount of the sound information in accordance with how frequently the sound of the sound-source data is generated.

11. The information processing device according to claim 9, wherein,
in a case where the type of the sound information is the voice data, the sound information includes
a character ID, and
information about characteristics of a voice to be specified by the character ID.

12. The information processing device according to claim 9, wherein
in a case where the type of the sound information is the sound-source data, the sound information includes at least one of
a frequency,
a duration,
time-series data of sound-pressure sample values, or
a sound ID.

13. The information processing device according to claim 8, wherein
the cooperating mobile device is configured to
acquire, from a database, information relating to the detected object, and provide the information relating to the detected object to the processing unit.

14. The information processing device according to claim 8, wherein
the cooperating mobile device is configured to
communicate with a server device connected to the Internet, and
acquire and provide to the processing device information relating to the detected object that the server device has specified.

15. The information processing device according to claim 8, wherein
the cooperating mobile device is configured to run a personal agent, wherein the personal agent is a computer program stored in a memory.

16. The information processing device according to claim 15, wherein
the personal agent provides a function of artificial intelligence.

17. The information processing device according to claim 16, wherein
the function of the artificial intelligence is a calculation for learning or estimation.

18. The information processing device according to claim 8, wherein the cooperating mobile device further comprises a neural-network processing unit.

19. The information processing device according to claim 18, wherein
the neural-network processing unit executes a process of a function of artificial intelligence.

20. The information processing device according to claim 8, wherein
the processing unit further executes a process under control of a personal agent on the cooperating mobile device.

21. The information processing device according to claim 20, further comprising
a memory that stores the information that relates to the object, wherein
the cooperating mobile device is configured to
read out and provide the information that relates to the object from the memory to the processing unit.

22. The information processing device according to claim 20, wherein
the cooperating mobile device is configured to
query a server device about the information that relates to the object, and
receive and provide the information that relates to the object from the server device to the processing unit.

23. The information processing device according to claim 20, wherein the cooperating mobile device further comprises a microphone, and wherein
the cooperating mobile device is configured to
query a server device about the information that relates to the object by transmitting a voice of the listener, the voice being acquired via the microphone, and
receive and provide the information that relates to the object from the server device to the processing unit.

24. The information processing device according to claim 23, wherein
the cooperating mobile device is configured to receive, from the server device, relevant information corresponding to the voice, and the processing unit is configured to
acquire the sound information of the sound source, the sound information being included in the relevant information, and
execute the process of localizing the sound image of the sound source.

25. An information processing device, comprising:
an open ear style earpiece;
an acoustics generation unit that is arranged in a rear of an ear of a listener;
a sound output unit that transmits a sound generated by the acoustics generation unit into an earhole;
a communication unit configured to receive sound information of a sound source from a cooperating mobile device with a sensor; and
a processing device operable under a state in which any of a plurality of modes has been selected, the processing device configured to:
reproduce an external three-dimensional space on a basis of external information acquired via the sensor,
generate virtual-sound information for causing the acoustics generation unit to generate the sound in accordance with the mode selected from the plurality of modes, and
localize a sound image of a sound source that varies in position over time in the three-dimensional space and vary a position of the localized sound image relative to a position of a detected object.

26. An information processing method, comprising:
receiving sound information of a sound source from a cooperating mobile device with a sensor;
acquiring the received sound information of the sound source corresponding to an object detected by the sensor of the cooperating mobile device;
localizing a sound image of the acquired sound source while varying a position of the localized sound image relative to a position of the detected object so that the listener can distinguish between real ambient sound and virtual sound; and
outputting a sound of the sound image from an information processing device comprising:
an open ear style earpiece,
an acoustics generation unit, and
a sound guide portion that transmits the sound into an earhole.

27. An information processing method, comprising:
receiving sound information of a sound source from a cooperating mobile device with a sensor;
acquiring the received sound information of the sound source corresponding to information that is provided in relation to an object detected by the sensor of the cooperating mobile device;
localizing a sound image of the acquired sound source while selecting a type of the sound information, while controlling an amount of the sound information and while varying a position of the localized sound source relative to a position of the detected object; and
outputting a sound of the sound image from an information processing device comprising:
an open ear style earpiece,
an acoustics generation unit, and
a sound guide portion that transmits the sound into an earhole.

* * * * *